United States Patent
Gavade et al.

(10) Patent No.: US 12,459,930 B2
(45) Date of Patent: *Nov. 4, 2025

(54) COMPOUNDS FOR THE INHIBITION OF UNREGULATED CELL GROWTH

(71) Applicant: GODAVARI BIOREFINERIES LIMITED, Maharashtra (IN)

(72) Inventors: Sandip Gavade, Maharashtra (IN); Maithili Athavale, Maharashtra (IN); Sangeeta Srivastava, Maharashtra (IN); Prashant Kharkar, Maharashtra (IN)

(73) Assignee: GODAVARI BIOREFINERIES LIMITED, Maharashtra (IN)

( * ) Notice: Subject to any disclaimer, the term of this patent is extended or adjusted under 35 U.S.C. 154(b) by 941 days.

This patent is subject to a terminal disclaimer.

(21) Appl. No.: 17/415,676

(22) PCT Filed: Dec. 16, 2019

(86) PCT No.: PCT/IN2019/050926
§ 371 (c)(1),
(2) Date: Jun. 17, 2021

(87) PCT Pub. No.: WO2020/129082
PCT Pub. Date: Jun. 25, 2020

(65) Prior Publication Data
US 2022/0073501 A1    Mar. 10, 2022

(30) Foreign Application Priority Data
Dec. 17, 2018   (IN) .............................. 201821047582

(51) Int. Cl.
*C07D 407/04*   (2006.01)
*A61P 35/00*   (2006.01)
(Continued)

(52) U.S. Cl.
CPC ............ *C07D 407/04* (2013.01); *A61P 35/00* (2018.01); *C07D 295/088* (2013.01);
(Continued)

(58) Field of Classification Search
CPC ... A61P 35/00; C07D 407/04; C07D 295/088; C07D 317/54; C07D 405/04; C07D 493/04
See application file for complete search history.

(56) References Cited

FOREIGN PATENT DOCUMENTS

| CN | 103467463 A | 12/2013 |
|---|---|---|
| WO | WO 2013001352 A2 | 1/2013 |

(Continued)

OTHER PUBLICATIONS

Berge et al. Pharmaceutical salts. J Pharm Sci. 1977;66(1):1-19. (Year: 1977).*

(Continued)

*Primary Examiner* — Joseph K Mckane
*Assistant Examiner* — Ashli Ariana Chicks
(74) *Attorney, Agent, or Firm* — Intellectual Property Law Group LLP

(57) ABSTRACT

The present invention discloses compounds for inhibition of uncontrolled cell proliferation particularly cancer stem cells. Particularly, the invention relates to compounds of Formula I to XXII for the treatment of cancer.

21 Claims, 35 Drawing Sheets

(51) Int. Cl.
*C07D 295/088* (2006.01)
*C07D 317/54* (2006.01)
*C07D 405/04* (2006.01)
*C07D 493/04* (2006.01)

(52) U.S. Cl.
CPC ......... *C07D 317/54* (2013.01); *C07D 405/04* (2013.01); *C07D 493/04* (2013.01)

(56) References Cited

FOREIGN PATENT DOCUMENTS

| WO | WO 2018193476 A2 | 10/2018 | |
|---|---|---|---|
| WO | WO-2019182947 A1 * | 9/2019 | ............... A61K 9/14 |

OTHER PUBLICATIONS

Patani et al. Chem. Rev. 1996, 96, 3147-3176. (Year: 1996).*
Sheridan, R.P. J. Chem. Inf. Comput. Sci. 2002, 42, 103-108. (Year: 2002).*
Lindstrom et al. ChemMedChem 2018, 13, 2664. (Year: 2018).*
Whitton et al. Vacuolar ATPase as a potential therapeutic target and mediator of treatment resistance in cancer. Cancer Med. 2018; 7(8):3800-3811. (Year: 2018).*
International Search Report, dated Mar. 12, 2020 for corresponding International Application No. PCT/IN2019/050926 (5 pages).
Written Opinion of the ISA, mailing date Mar. 12, 2020 for corresponding International Application No. PCT/IN2019/050926 (7 pages).
Aaron Lindstrom et al., "Phenotypic Prioritization of Diphyllin Derivatives that Block Filo-viral Cell Entry by Vacuolar (H+)-ATPase Inhibition", ChemMedChem. Dec. 20, 2018; 13(24): 2664-2676 (30 pages).

* cited by examiner

COMPOUNDS FOR THE INHIBITION OF UNREGULATED CELL GROWTH

CROSS-REFERENCE TO RELATED APPLICATIONS

This application is a U.S. National Phase application, under 35 U.S.C. § 371, of International Application no. PCT/IN2019/050926, with an international filing date of Dec. 16, 2019, and claims benefit of India Application no. 201821047582 filed on Dec. 17, 2018, each of which is hereby incorporated by reference for all purposes.

FIELD OF THE INVENTION

The present invention relates to compounds for the inhibition of uncontrolled cell proliferation, particularly cancer stem cells.

Background of the Invention

Cancer is characterized by abnormal cells that grow and invade healthy cells in the body. It is a direct result of accumulated somatic and gene alteration effects leading to improper protein functions. The earlier 'oncogene', 'tumor suppressor gene' and 'clonal evolution model' concepts related to cancer development and progression are now being compared with a relatively newer concept of tumor-initiating 'cancer stem cells' (CSCs). All CSCs display several important characteristics such as tumorigenic (cells capable of giving rise to a tumor), self-renewal (able to maintain the population of tumorigenic cells) and pluripotency (able to give rise to the heterogeneous cells composing the entire tumor). Due to these and other characteristics, CSCs are inherently resistant to conventional cytotoxic agents. These drugs end up killing cancer cells sparing the CSCs, which, after a while, can give rise to a full-blown tumor with high metastatic potential.

While molecularly-targeted therapies are available for treatment of cancer for a high price, majority of the world population rely on standard chemotherapy. The standard anticancer regiment targets most of the dividing cancer cells and not quiescent or slow-dividing cancer stem cells (CSCs). Even though, CSCs have been identified a while ago, scientists around the globe are still looking to find CSC-targeted agents and unfortunately, until today, there is none available in the market to specifically target CSCs. There is an urgent need of agents which can kill the CSCs and other heterogeneous cell population of tumor cells. Such an agent, ideally, should be able to completely eradicate the tumor alone or in combination with other cytotoxic agents, leading to the success of chemotherapy.

SUMMARY OF THE INVENTION

The present invention discloses compound of Formula I for use in the treatment or inhibition of unregulated cell growth. Compound of Formula I is represented as:

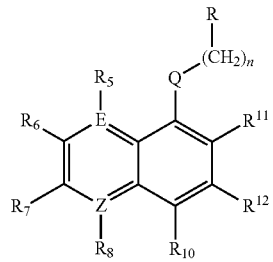

Formula I wherein,

E and Z is selected from C, O, N, S, salts of N such as N. HCl;

Q is O, S, —$CH_2$O—, —NY', wherein Y' is selected from —H, alkyl, —$SOOCH_3$;

$R^5$ is —H, —Cl;

$R^6$ and $R^7$ each independently is selected from —H, alkoxy, alkyl, substituted or unsubstituted aromatic group, —$NH_2$, —$NO_2$, —$NHCOCH_3$, —CN, —O—, halogen, —$OCF_3$ or $R^6$ and $R^7$ together form a heterocyclic ring;

$R^8$ is —H, —Cl;

$R^{10}$ is selected from

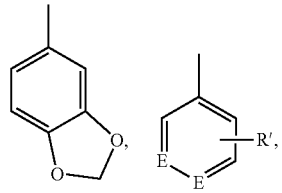

R' is selected from —H, —OH, —$CH_2$—O—$CH_2$, —COOH, X, (where X is F, Cl, Br), alkyl such as —$CH_3$, alkoxy, —$NHCOCH_3$, —H, —OR, —NR, —$CF3$,
—O—$CH_2$—O—;

$R^{11}$ and $R^{12}$ each independently is selected from —H, or $R^{11}$ and $R^{12}$ can be substituted or unsubstituted 5- or 6-membered ring such as lactone, —C(O)O-alkyl such as —C(O)O$C_2H_5$;

R is selected from —$NR^{13}R^{14}$, $NR^{13}CO(CH_2)nNR^{13}R^{14}$, —$NR^{13}R^{14}$·HCl or acid salt, —O—$R^{13}R^{14}$, —CO—$R^{13}$, —$NR^{13}CO$—$NR^{13}R^{14}$, —$NR^{13}R^{14}SOO$—$NR^{13}R^{14}$, substituted or unsubstituted cycloalkane optionally having at least one heteroatom, sulphonamide, —$(CH_2)_nNH_2$, —$(CH_2)_nOH$, —$NR^{13}CO$—$R^{15}$, wherein $R^{15}$ is substituted or unsubstituted 5 or 6 membered ring optionally having at least one heteroatom, —CH—$R^{16}R^{17}$, $R^{16}$, $R^{17}$ each independently is selected from cycloalkane or aryl, —O—$(CH_2)_nR^{18}$, wherein $R^{18}$ is —OH, —NH2, substituted or unsubstituted aryl, substituted or unsubstituted heterocyclic group, substituted or unsubstituted cycloalkane, wherein $R^{13}$ or $R^{14}$ is each independently selected from —H, substituted or unsubstituted alkyl, alkene, alkoxy, substituted or unsubstituted aryl, heteroaryl group, substituted or unsubstituted heterocyclic group, alkyl amine and substituted aryl amine, amide, sulphonamide, —OH, —$(CH_2)_n$—O—

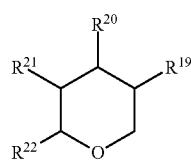

wherein, $R^{19}$ is selected from —OH, —NH$_2$, —NHCOCH$_3$, X=F, Cl, Br, alkyl, acetyl, C$_3$-C$_8$ acyl group;

$R^{20}$ is selected from alkoxy, —OMe, —OH, NH$_2$, —NHCOCH$_3$, X=F, Cl, Br, alkyl, acetyl, C$_3$-C$_8$ acyl group;

$R^{21}$ is selected from alkoxy, —OMe, —OH, —H, Br, NH$_2$, X=F, Cl, Br, alkyl, acetyl, C$_3$-C$_8$ acyl group;

$R^{22}$ is selected from —H, —CH$_2$OH, —OH, alkyl, alkoxy; and n is 1-10.

An aspect of the present invention discloses compound of Formula Ia:

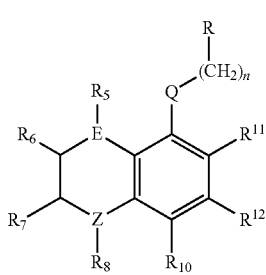

Formula Ia wherein,

E and Z is selected from C, O, N, S, salts of N such as N.HCl;

Q is O, S, —CH$_2$O—, —NY', wherein Y' is selected from —H, alkyl, —SOOCH$_3$;

$R^5$ is —H, —Cl;

$R^6$ and $R^7$ each independently is selected from —H, alkoxy, alkyl, substituted or unsubstituted aromatic group, —NH$_2$, —NO$_2$, —NHCOCH$_3$, —CN, —O—, halogen, —OCF$_3$ or $R^6$ and $R^7$ together form a heterocyclic ring;

$R^8$ is —H, —Cl;

$R^{10}$ is selected from

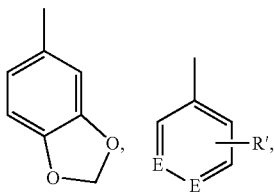

R' is selected from —H, —OH, —CH$_2$—O—CH$_2$, —COOH, X, (where X is F, Cl, Br), alkyl such as —CH$_3$, alkoxy, —NHCOCH$_3$, —H, —OR, —NR, —CF3, —O—CH$_2$—O—;

$R^{11}$ and $R^{12}$ each independently is selected from —H, or $R^{11}$ and $R^{12}$ can be substituted or unsubstituted 5- or 6-membered ring such as lactone, —C(O)O-alkyl such as —C(O)OC$_2$H$_5$;

R is selected from —NR$^{13}$R$^{14}$, NR$^{13}$CO(CH$_2$)nNR$^{13}$R$^{14}$, —NR$^{13}$R$^{14}$·HCl or acid salt, —O—R$^{13}$R$^{14}$, —CO—R$^{13}$, —NR$^{16}$CO—NR$^{13}$R$^{14}$, —NR$^{13}$R$^{14}$SOO—NR$^{13}$R$^{14}$, substituted or unsubstituted cycloalkane optionally having at least one heteroatom, sulphonamide, —(CH$_2$)$_n$NH$_2$, —(CH$_2$)$_n$OH, —NR$^{13}$CO—R$^{15}$, wherein R$^{15}$ is substituted or unsubstituted 5 or 6 membered ring optionally having at least one heteroatom, —CH—R$^{16}$R$^{17}$, R$^{16}$, R$^{17}$ each independently is selected from cycloalkane or aryl, —O—(CH$_2$)$_n$R$^{18}$, wherein R$^{18}$ is —OH, —NH2, substituted or unsubstituted aryl, substituted or unsubstituted heterocyclic group, substituted or unsubstituted cycloalkane, wherein R$^{13}$ or R$^{14}$ is each independently selected from —H, substituted or unsubstituted alkyl, alkene, alkoxy, substituted or unsubstituted aryl, heteroaryl group, substituted or unsubstituted heterocyclic group, alkyl amine and substituted aryl amine, amide, sulphonamide, —OH, —(CH$_2$)$_n$—

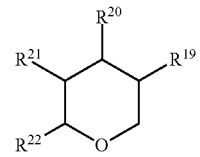

wherein, $R^{19}$ is selected from —OH, —NH$_2$, —NHCOCH$_3$, X=F, Cl, Br, alkyl, acetyl, C$_3$-C$_8$ acyl group;

$R^{20}$ is selected from alkoxy, —OMe, —OH, NH$_2$, —NHCOCH$_3$, X=F, Cl, Br, alkyl, acetyl, C$_3$-C$_8$ acyl group;

$R^{21}$ is selected from alkoxy, —OMe, —OH, —H, Br, NH$_2$, X=F, Cl, Br, alkyl, acetyl, C$_3$-C$_8$ acyl group;

$R^{22}$ is selected from —H, —CH$_2$OH, —OH, alkyl, alkoxy; and n is 1-10.

Another aspect of the invention discloses compounds of Formula II to Formula XXII for use in the treatment or inhibition of unregulated cell growth. The compounds are represented as:

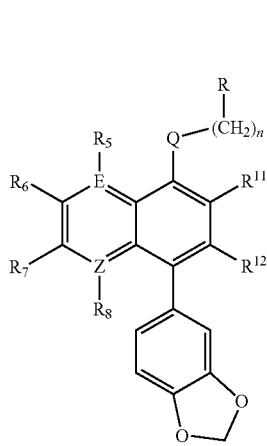

Formula II

Formula III
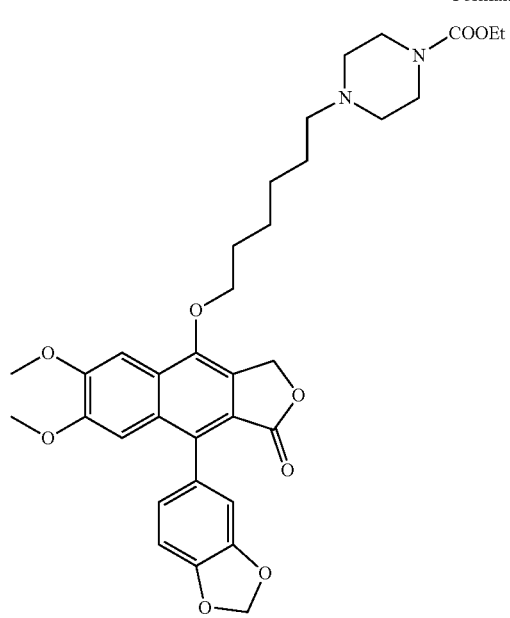
Formula IV
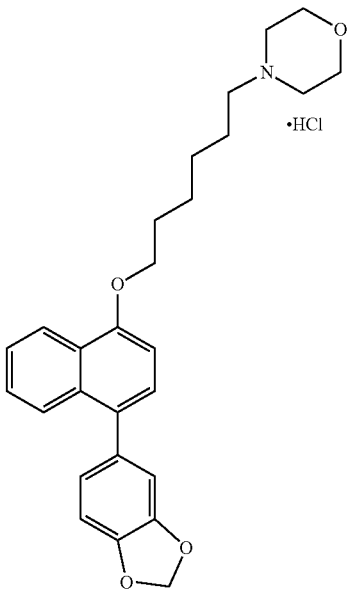
Formula V
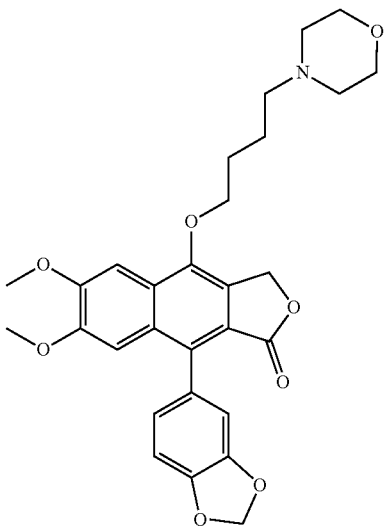
Formula VI
Formula VII
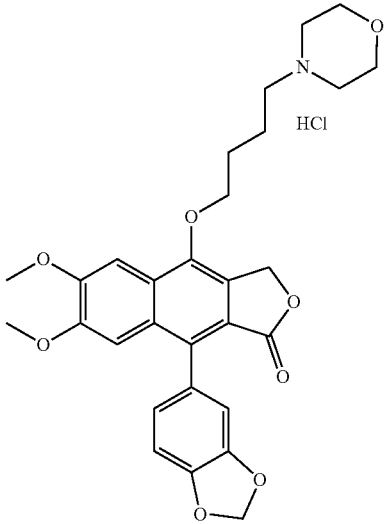

Formula VIII
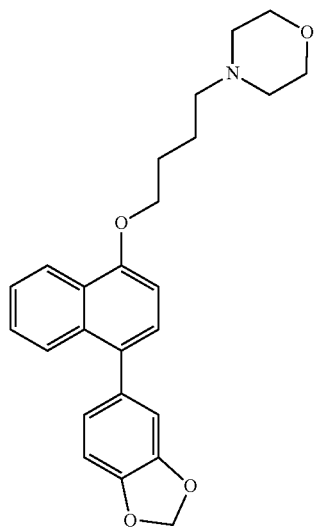
Formula IX
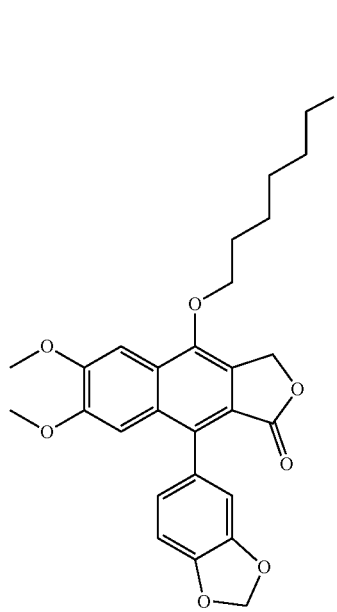
Formula X
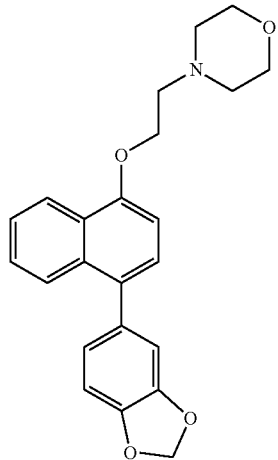
Formula XI
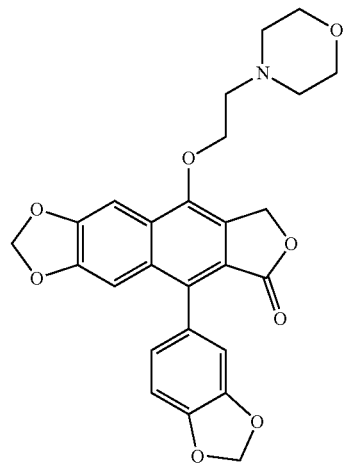
Formula XII
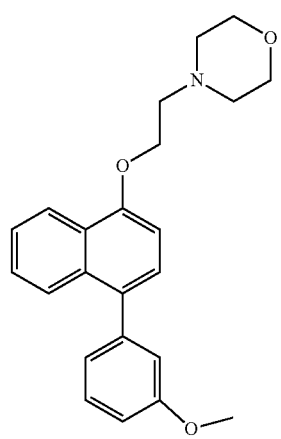
Formula XIII
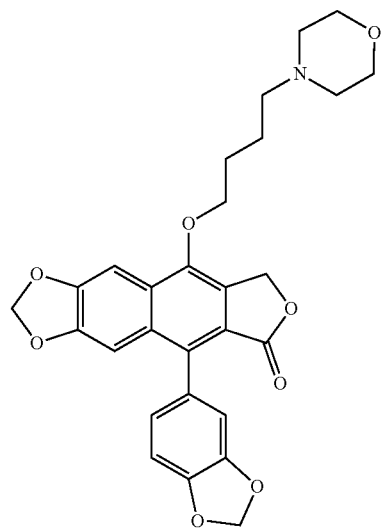

Formula XIV
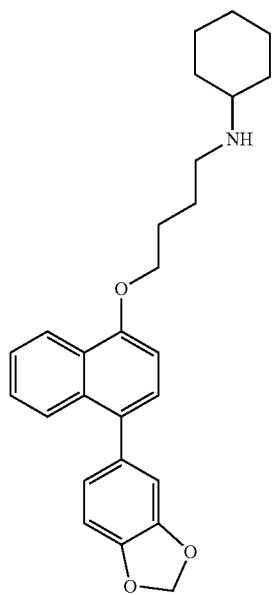
Formula XV
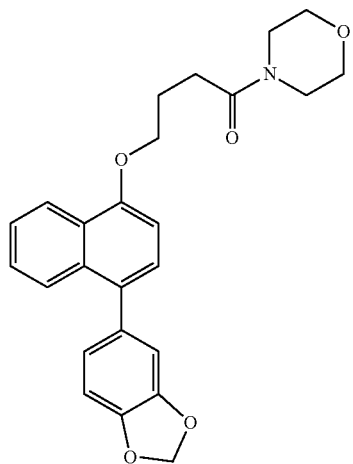
Formula XVI
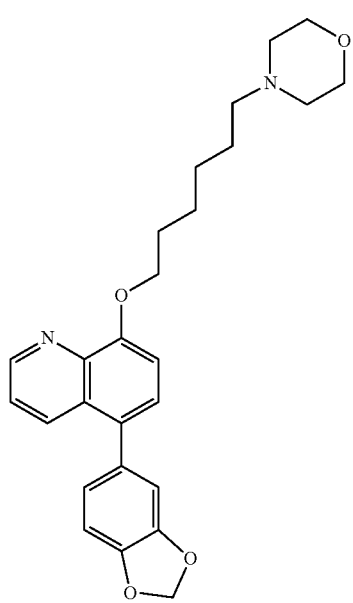
Formula XVII
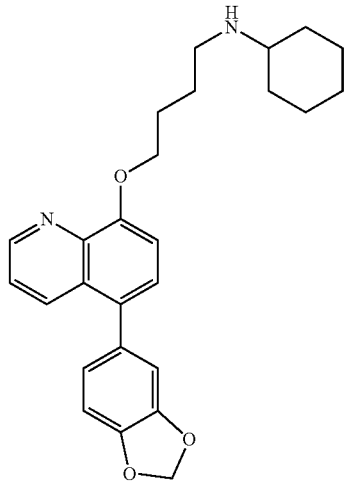
Formula XVIII
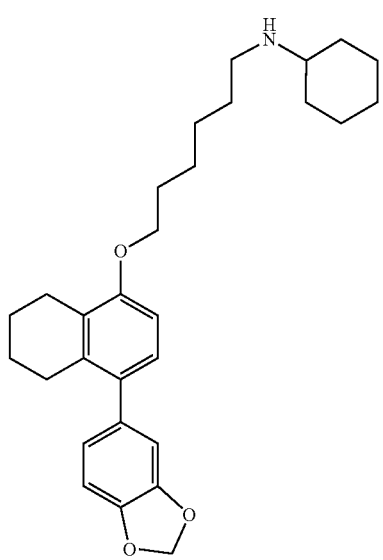
Formula XIX
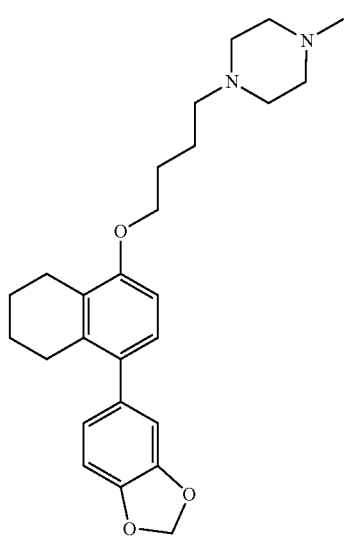

Formula XX

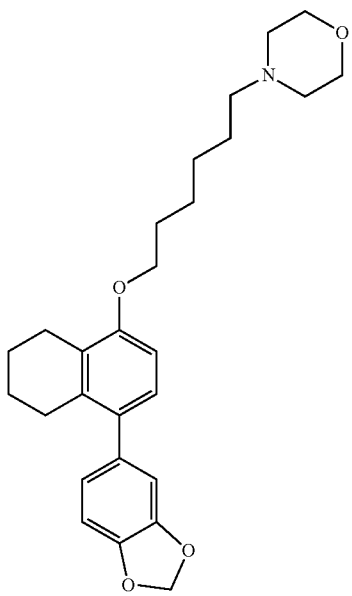

Formula XXI

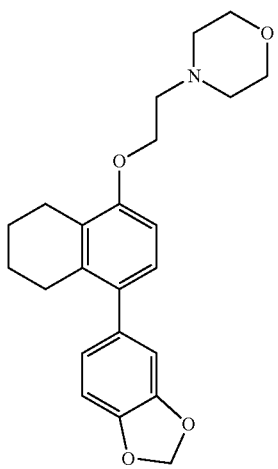

Formula XXII

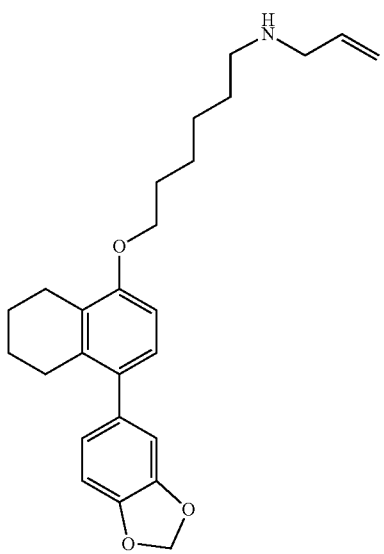

An aspect of the invention relates to a pharmaceutical composition comprising compound of Formula I to XXII, at least one pharmaceutically acceptable excipient and optionally at least one active agent.

An aspect of the present invention relates to compounds of Formula I to XXII for use in the treatment or inhibition of uncontrolled cell growth such as cancer including use in targeting cancer cells such as cancer stem cells.

Another aspect of the invention discloses a method of treating or inhibiting uncontrolled cell growth. The method comprises of administering an effective amount of compound of Formula I to XXII or a pharmaceutical composition of Formula I to XXII to a patient.

DETAILED DESCRIPTION OF THE INVENTION

Figure 1:
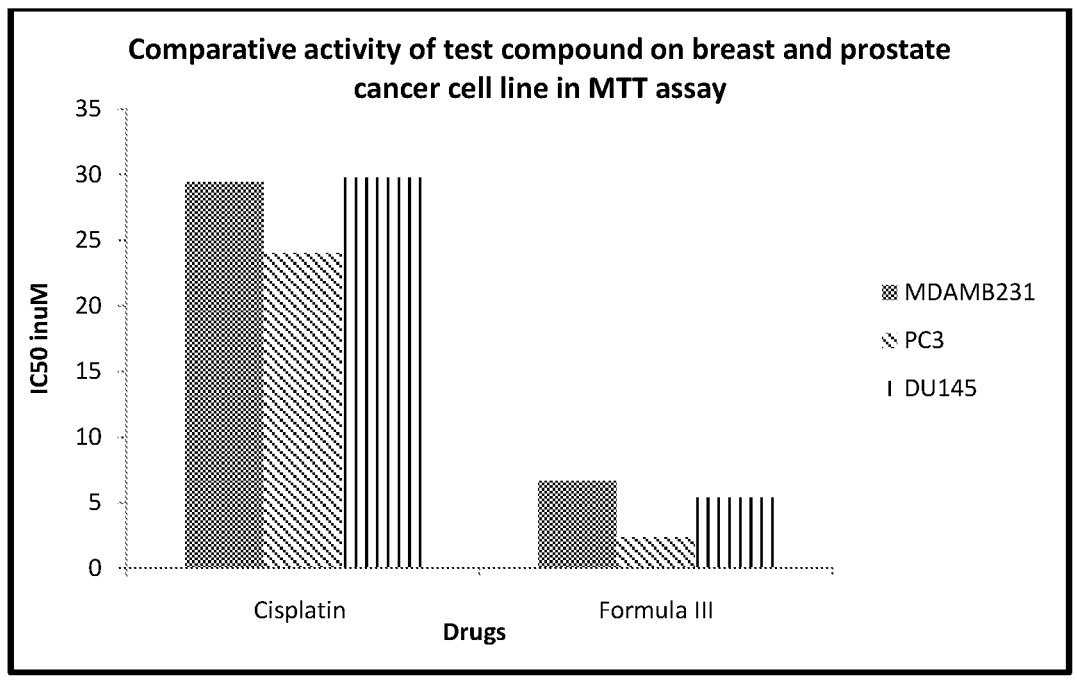
FIG. 1 illustrates the activity of compound of Formula III compared to cisplatin on breast cancer (MDAMB231) and prostate cancer (PC3 and DU145) cell lines in MTT assay.

The present invention relates to compounds of Formula I for treating various conditions, particularly for inhibition of uncontrolled cell growth or proliferation. Particularly, the compounds are effective against cancer stem cells. The structure of compound of Formula I is:

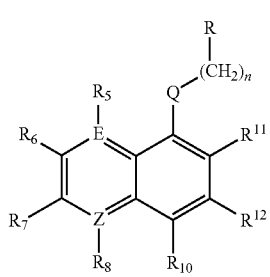

Formula I wherein,

E and Z is selected from C, O, N, S, salts of N such as N.HCl;

Q is O, S, —CH$_2$O—, —NY', wherein Y' is selected from —H, alkyl, —SOOCH$_3$;

$R^5$ is —H, —Cl;

$R^6$ and $R^7$ each independently is selected from —H, alkoxy, alkyl, substituted or unsubstituted aromatic group, —NH$_2$, —NO$_2$, —NHCOCH$_3$, —CN, —O—, halogen, —OCF$_3$ or $R^6$ and $R^7$ together form a heterocyclic ring;

$R^8$ is —H, —Cl;

$R^{10}$ is selected from

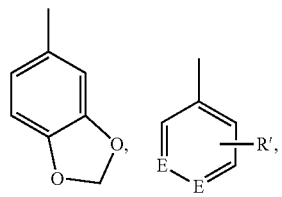

R' is selected from —H, —OH, —CH$_2$—O—CH$_2$, —COOH, X, (where X is F, Cl, Br), alkyl such as —CH$_3$, alkoxy, —NHCOCH$_3$, —H, —OR, —NR, —CF3, —O—CH$_2$—O—;

$R^{11}$ and $R^{12}$ each independently is selected from —H, or $R^{11}$ and $R^{12}$ can be substituted or unsubstituted 5- or 6-membered ring such as lactone, —C(O)O-alkyl such as —C(O)OC$_2$H$_5$;

R is selected from —NR$^{13}$R$^{14}$, NR$^{13}$CO(CH$_2$)nNR$^{13}$R$^{14}$, —NR$^{13}$R$^{14}$·HCl or acid salt, —O—R$^{13}$R$^{14}$, —CO—R$^{13}$, —NR$^{13}$CO—NR$^{13}$R$^{14}$, —NR$^{13}$R$^{14}$SOO—NR$^{13}$R$^{14}$, substituted or unsubstituted cycloalkane optionally having at least one heteroatom, sulphonamide, —(CH$_2$)$_n$NH$_2$, —(CH$_2$)$_n$OH, —NR$^{13}$CO—R$^{15}$, wherein R$^{15}$ is substituted or unsubstituted 5 or 6 membered ring optionally having at least one heteroatom, —CH—R$^{16}$R$^{17}$, R$^{16}$, R$^{17}$ each independently is selected from cycloalkane or aryl, —O—(CH$_2$)$_n$R$^{18}$, wherein R$^{18}$ is —OH, —NH2, substituted or unsubstituted aryl, substituted or unsubstituted heterocyclic group, substituted or unsubstituted cycloalkane, wherein R$^{13}$ or R$^{14}$ is each independently selected from —H, substituted or unsubstituted alkyl, alkene, alkoxy, substituted or unsubstituted aryl, heteroaryl group, substituted or unsubstituted heterocyclic group, alkyl amine and substituted aryl amine, amide, sulphonamide, —OH, —(CH$_2$)$_n$—O—

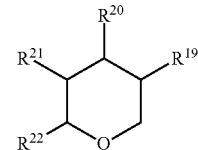

wherein, R$^{19}$ is selected from —OH, —NH$_2$, —NHCOCH$_3$, X=F, Cl, Br, alkyl, acetyl, C$_3$-C$_8$ acyl group;

R$^{20}$ is selected from alkoxy, —OMe, —OH, NH$_2$, —NHCOCH$_3$, X=F, Cl, Br, alkyl, acetyl, C$_3$-C$_8$ acyl group;

R$^{21}$ is selected from alkoxy, —OMe, —OH, —H, Br, NH$_2$, X=F, Cl, Br, alkyl, acetyl, C$_3$-C$_8$ acyl group;

R$^2$ is selected from —H, —CH$_2$OH, —OH, alkyl, alkoxy; and n is 1-10.

It can be understood by a skilled person that the presence of O, N, S at E and/or Z positions will determine the absence or presence of double bonds and certain groups.

An embodiment of the present invention discloses compounds of Formula Ia represented as:

Formula Ia

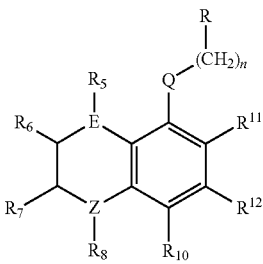

wherein,

E and Z is selected from C, O, N, S, salts of N such as N·HCl;

Q is O, S, —CH$_2$O—, —NY', wherein Y' is selected from —H, alkyl, —SOOCH$_3$;

R$^5$ is —H, —Cl;

R$^6$ and R$^7$ each independently is selected from —H, alkoxy, alkyl, substituted or unsubstituted aromatic group, —NH$_2$, —NO$_2$, —NHCOCH$_3$, —CN, —O—, halogen, —OCF$_3$ or R$^6$ and R$^7$ together form a heterocyclic ring;

R$^8$ is —H, —Cl;

R$^{10}$ is selected from

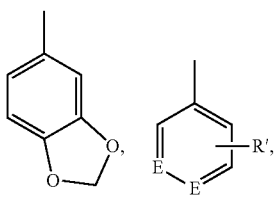

R' is selected from —H, —OH, —CH$_2$—O—CH$_2$, —COOH, X, (where X is F, Cl, Br), alkyl such as —CH$_3$, alkoxy, —NHCOCH$_3$, —H, —OR, —NR, —CF3,

—O—CH$_2$—O—;

R$^{11}$ and R$^{12}$ each independently is selected from —H, or R$^{11}$ and R$^{12}$ can be substituted or unsubstituted 5- or 6-membered ring such as lactone, —C(O)O-alkyl such as —C(O)OC$_2$H$_5$;

R is selected from —NR$^{13}$R$^{14}$, NR$^{13}$CO(CH$_2$)nNR$^{13}$R$^{14}$, —NR$^{13}$R$^{14}$·HCl or acid salt, —O—R$^{13}$R$^{14}$, —CO—R$^{16}$, —NR$^{13}$CO—NR$^{13}$R$^{14}$, —NR$^{13}$R$^{14}$SOO—NR$^{13}$R$^{14}$, substituted or unsubstituted cycloalkane optionally having at least one heteroatom, sulphonamide, —(CH$_2$)$_n$NH$_2$, —(CH$_2$)$_n$OH, —NR$^{13}$CO—R$^{15}$, wherein R$^{15}$ is substituted or unsubstituted 5 or 6 membered ring optionally having at least one heteroatom, —CH—R$^{16}$R$^{17}$, R$^{16}$, R$^{17}$ each independently is selected from cycloalkane or aryl, —O—(CH$_2$)$_n$R$^{18}$, wherein R$^{18}$ is —OH, —NH2, substituted or unsubstituted aryl, substituted or unsubstituted heterocyclic group, substituted or unsubstituted cycloalkane, wherein R$^{13}$ or R$^{14}$ is each independently selected from —H, substituted or unsubstituted alkyl, alkene, alkoxy, substituted or unsubstituted aryl, heteroaryl group, substituted or unsubstituted heterocyclic group, alkyl amine and substituted aryl amine, amide, sulphonamide, —OH, —(CH$_2$)$_n$—O—

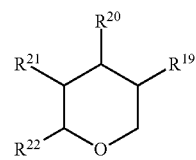

wherein, R$^{19}$ is selected from —OH, —NH$_2$, —NHCOCH$_3$, X═F, Cl, Br, alkyl, acetyl, C$_3$-C$_8$ acyl group;

R$^{20}$ is selected from alkoxy, —OMe, —OH, NH$_2$, —NHCOCH$_3$, X═F, Cl, Br, alkyl, acetyl, C$_3$-C$_8$ acyl group;

R$^{21}$ is selected from alkoxy, —OMe, —OH, —H, Br, NH$_2$, X═F, Cl, Br, alkyl, acetyl, C$_3$-C$_8$ acyl group;

R$^{22}$ is selected from —H, —CH$_2$OH, —OH, alkyl, alkoxy; and n is 1-10.

In an embodiment of the present invention, R is selected from the group comprising

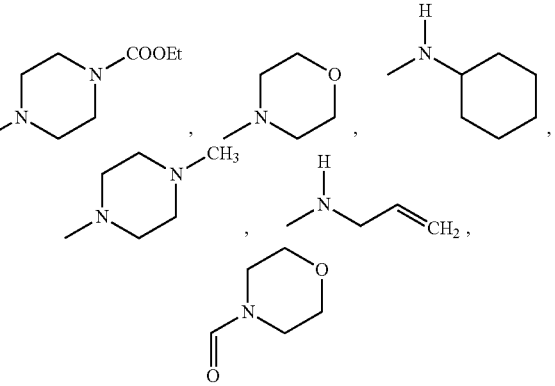

N indicates point of connection with —(CH$_2$)$_n$ group of Formula I or Ia.

Further, salts such as HCl salts of the compounds are also within the scope of the present invention.

In an embodiment of the present invention, compound of Formula II is represented as:

Formula II

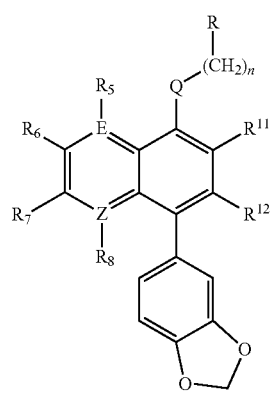

In an embodiment of the present invention, the compounds of Formula I or II are represented as:

Formula III
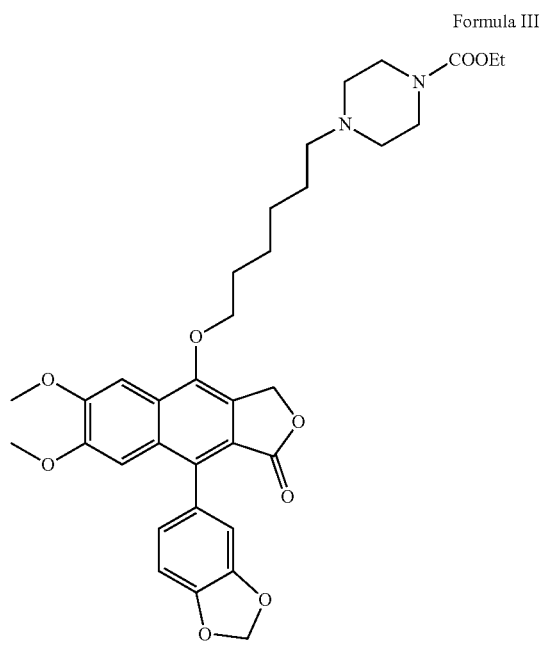
Formula V
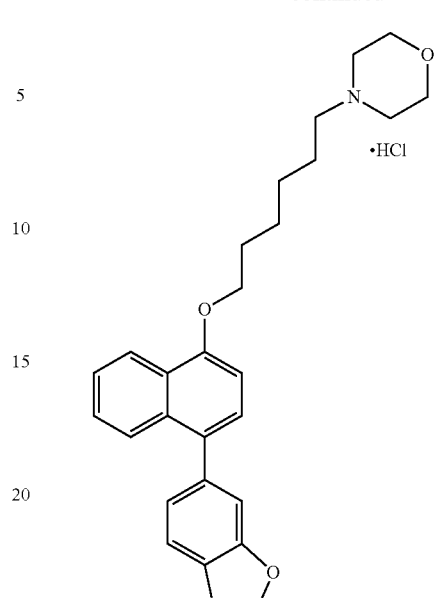
Formula VI
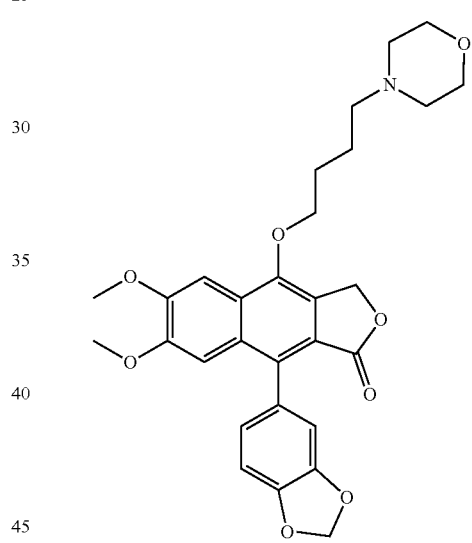
Formula IV
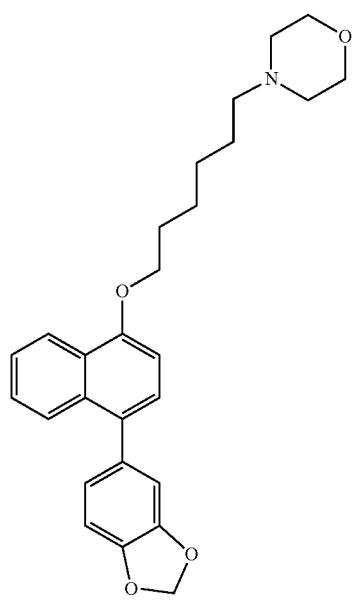
Formula VII
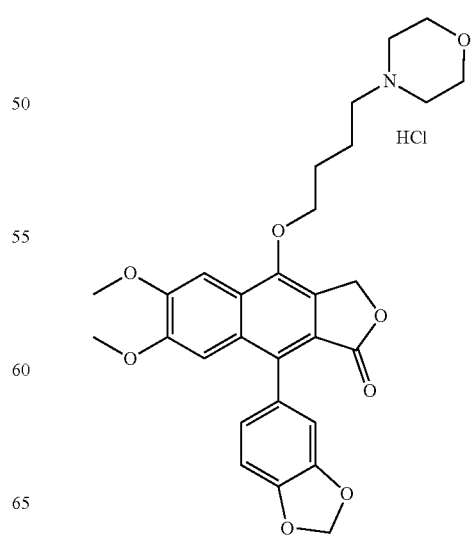

Formula VIII
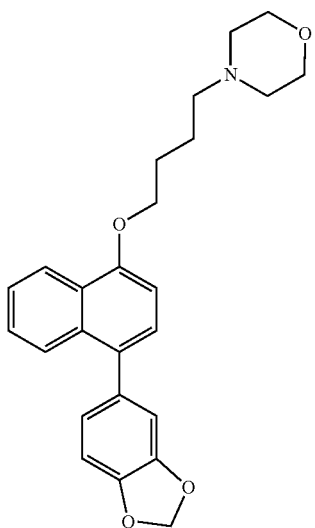
Formula IX
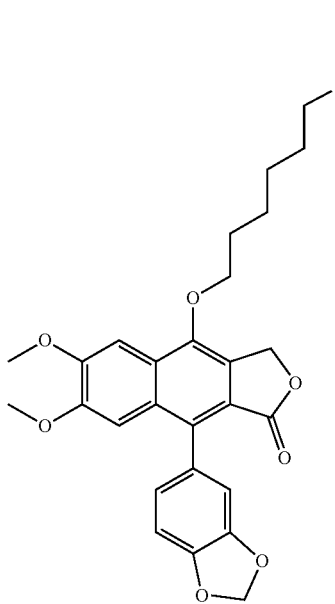
Formula X
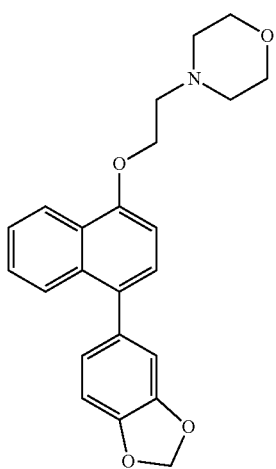
Formula XI
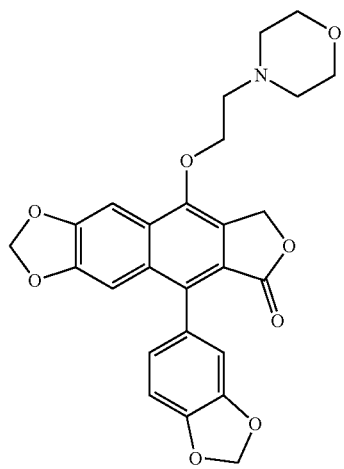
Formula XII
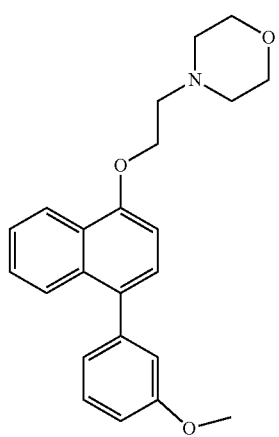
Formula XIII
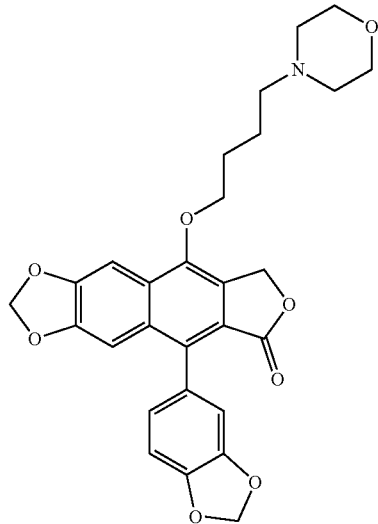

Formula XIV
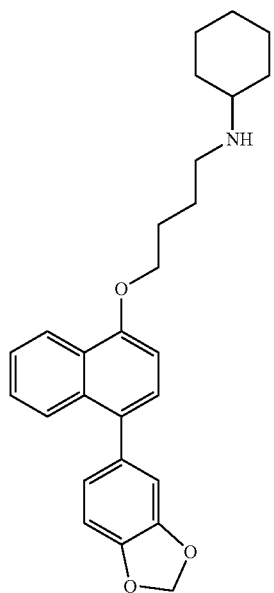
Formula XV
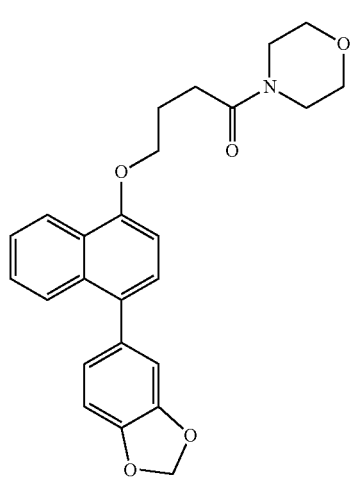
Formula XVI
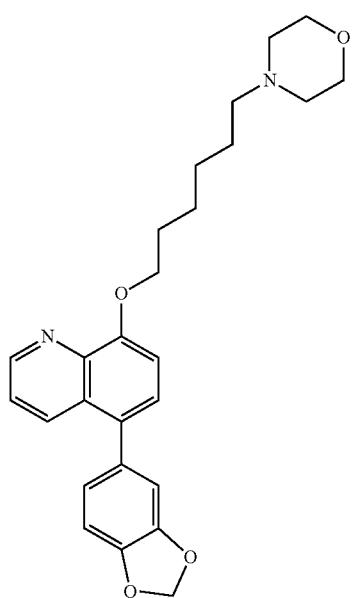
Formula XVII
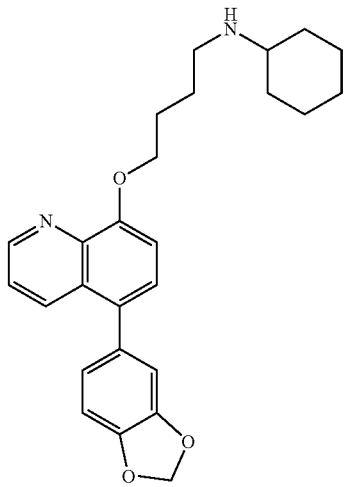
Formula XVIII
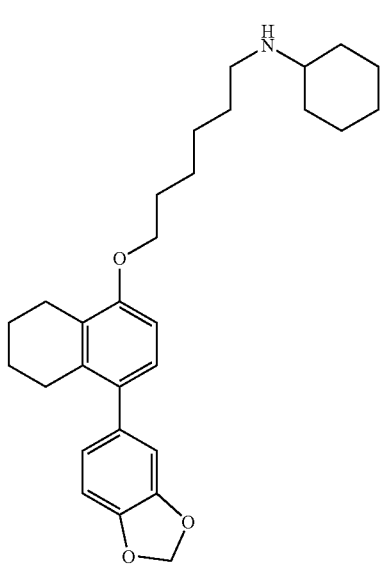
Formula XIX
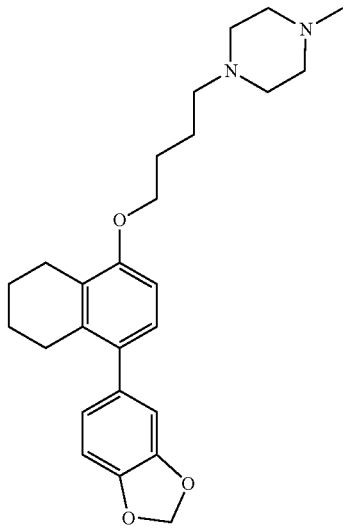

Formula XX

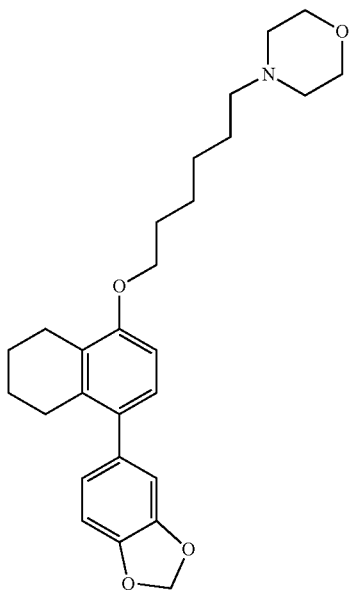

Formula XXI

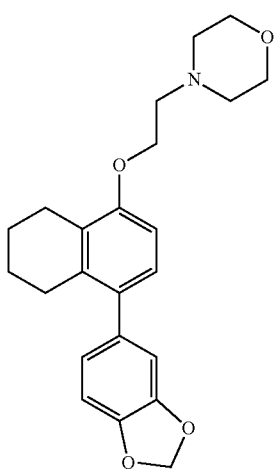

Formula XXII

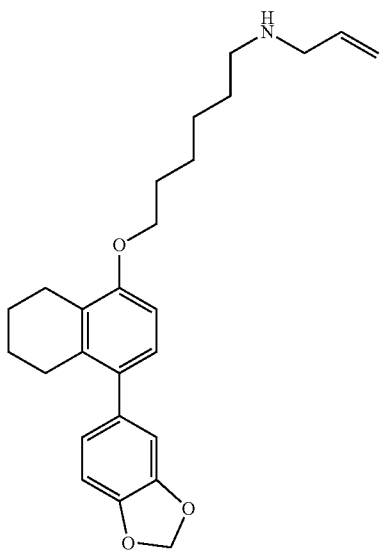

The present invention also encompasses a pharmaceutical composition comprising compound of Formula I to XXII, at least one pharmaceutically acceptable excipient and optionally at least one active agent.

The active agent is selected from but not limited to imatinib, nilotinib, gefitinib, sunitinib, carfilzomib, salinosporamide A, retinoic acid, cisplatin, carboplatin, oxaliplatin, mechlorethamine, cyclophosphamide, chlorambucil, ifosfamide, azathioprine, mercaptopurine, doxifluridine, fluorouracil, gemcitabine, methotrexate, tioguanine, vincristine, vinblastine, vinorelbine, vindesine, podophyllotoxin, etoposide, teniposide, tafluposide, paclitaxel, docetaxel, irinotecan, topotecan, amsacrine, actinomycin, doxorubicin, daunorubicin, valrubicin, idarubicin, epirubicin, plicamycin, mitomycin, mitoxantrone, melphalan, busulfan, capecitabine, pemetrexed, epothilones, 13-cis-Retinoic Acid, 2-CdA, 2-Chlorodeoxyadenosine, 5-Azacitidine, 5-Fluorouracil, 5-FU, 6-Mercaptopurine, 6-MP, 6-TG, 6-Thioguanine, Abraxane, Accutane®, Actinomycin-D, Adriamycin®, Adrucil®, Afinitor®, Agrylin®, Ala-Cort®, Aldesleukin, Alemtuzumab, ALIMTA, Alitretinoin, Alkaban-AQ®, Alkeran®, All-transretinoic Acid, Alpha Interferon, Altretamine, Amethopterin, Amifostine, Aminoglutethimide, Anagrelide, Anandron®, Anastrozole, Arabinosylcytosine, Ara-C, Aranesp®, Aredia®, Arimidex®, Aromasin®, Arranon®, Arsenic Trioxide, Arzerra™, Asparaginase, ATRA, Avastin®, Azacitidine, BCG, BCNU, Bendamustine, Bevacizumab, Bexarotene, BEXXAR®, Bicalutamide, BiCNU, Blenoxane®, Bleomycin, Bortezomib, Busulfan, Busulfex®, C225, Calcium Leucovorin, Campath®, Camptosar®, Camptothecin-11, Capecitabine, Carac™ Carboplatin, Carmustine, Carmustine Wafer, Casodex®, CC-5013, CCI-779, CCNU, CDDP, CeeNU, Cerubidine®, Cetuximab, Chlorambucil, Citrovorum Factor, Cladribine, Cortisone, Cosmegen®, CPT-11, Cytadren®, Cytosar-U®, Cytoxan®, Dacarbazine, Dacogen, Dactinomycin, Darbepoetin Alfa, Dasatinib, Daunomycin, Daunorubicin Hydrochloride, Daunorubicin Liposomal, DaunoXome®, Decadron, Decitabine, Delta-Cortef®, Deltasone®, Denileukin, Diftitox, DepoCyt™ Dexamethasone, Dexamethasone Acetate, Dexamethasone Sodium Phosphate, Dexasone, Dexrazoxane, DHAD, DIC, Diodex, Docetaxel, Doxil®, Doxorubicin, Doxorubicin Liposomal, Droxia™, DTIC, DTIC-Dome®, Duralone®, Efudex®, Eligard™, Ellence™, Eloxatin™ Elspar®, Emcyt®, Epirubicin, Epoetin Alfa, Erbitux, Erlotinib, Erwinia L-asparaginase, Estramustine, Ethyol, Etopophos®, Etoposide, Etoposide Phosphate, Eulexin®, Everolimus, Evista®, Exemestane, Fareston®, Faslodex®, Femara®, Filgrastim, Floxuridine, Fludara®, Fludarabine, Fluoroplex®, Fluorouracil, Fluorouracil (cream), Fluoxymesterone, Flutamide, Folinic Acid, FUDR®, Fulvestrant, G-CSF, Gefitinib, Gemcitabine, Gemtuzumab, ozogamicin, Gemzar Gleevec™, Gliadel® Wafer, GM-CSF, Goserelin, Granulocyte—Colony Stimulating Factor, Granulocyte Macrophage Colony Stimulating Factor, Halotestin®, Herceptin®, Hexadrol, Hexalen®, Hexamethylmelamine, HMM, Hycamtin®, Hydrea®, Hydrocort Acetate®, Hydrocortisone, Hydrocortisone Sodium Phosphate, Hydrocortisone Sodium Succinate, Hydrocortone Phosphate, Hydroxyurea, Ibritumomab, Ibritumomab, Tiuxetan, Idamycin®, Idarubicin Ifex®, IFN-alpha, Ifosfamide, IL-11, IL-2, Imatinib mesylate, Imidazole Carboxamide, Interferon alfa, Interferon Alfa-2b (PEG Conjugate), Interleukin-2, Interleukin-11, Intron A® (interferon alfa-2b), Iressa®, Irinotecan, Isotretinoin, Ixabepilone, Ixempra™ Kidrolase®, Lanacort®, Lapatinib, L-asparaginase, LCR, Lenalidomide, Letrozole, Leucovorin, Leukeran, Leukine™, Leuprolide, Leurocristine, Leustatin™, Liposomal Ara-C, Liquid Pred®, Lomustine, L-PAM, L-Sarcolysin, Lupron®, Lupron Depot®, Matulane®, Maxidex, Mechlorethamine, Mechlorethamine Hydrochloride, Medralone®, Medrol®, Megace®, Megestrol, Megestrol Acetate, Melphalan, Mercaptopurine, Mesna, Mesnex™, Methotrexate, Methotrexate Sodium, Methylprednisolone, Meticorten®, Mitomycin, Mitomycin-C, Mitoxantrone, M-Prednisol®, MTC, MTX, Mustargen®, Mustine, Mutamycin®, Myleran®, Mylocel™, Mylotarg®, Navelbine®, Nelarabine, Neosar®, Neulasta™, Neumega®, Neupogen®, Nexavar®, Nilandron®, Nilotinib, Nilutamide, Nipent®, Nitrogen Mustard, Novaldex®, Novantrone®, Nplate, Octreotide, Octreotide acetate, Ofatumumab, Oncospar®, Oncovin®, Ontak®, Onxal™, Oprelvekin, Orapred®, Orasone®, Oxaliplatin, Paclitaxel, Paclitaxel Protein-bound, Pamidronate, Panitumumab, Panretin®, Paraplatin®, Pazopanib, Pediapred®, PEG Interferon, Pegaspargase, Pegfilgrastim, PEG-INTRON™, PEG-L-asparaginase, PEMETREXED, Pentostatin, Phenylalanine Mustard, Platinol®, Platinol-AQ®, Prednisolone, Prednisone, Prelone®, Procarbazine, PROCRIT®, Proleukin®, Prolifeprospan 20 with Carmustine Implant, Purinethol®, Raloxifene, Revlimid®, Rheumatrex®, Rituxan®, Rituximab, Roferon-A® (Interferon Alfa-2a), Romiplostim, Rubex®, Rubidomycin hydrochloride, Sandostatin®, Sandostatin LAR®, Sargramostim, Solu-Cortef®, Solu-Medrol®, Sorafenib, SPRYCEL™, STI-571, Streptozocin, SU11248, Sunitinib, Sutent®, Tamoxifen, Tarceva®, Targretin®, Tasigna®, Taxol®, Taxotere®, Temodar®, Temozolomide, Temsirolimus, Teniposide, TESPA, Thalidomide, Thalomid®, TheraCys®, Thioguanine, Thioguanine Tabloid®, Thiophosphoamide, Thioplex®, Thiotepa, TICE®, Toposar®, Topotecan, Toremifene, Torisel®, Tositumomab, Trastuzumab, Treanda®, Tretinoin, Trexall™ Trisenox®, TSPA, TYKERB®, VCR, Vectibix™, Velban®, Velcade®, VePesid®, Vesanoid®, Viadur™, Vidaza®, Vinblastine, Vinblastine Sulfate, Vincasar Pfs®, Vincristine, Vinorelbine, Vinorelbine tartrate, VLB, VM-26, Vorinostat, Votrient, VP-16, Vumon®, Xeloda®, Zanosar®, Zevalin™, Zinecard®, Zoladex®, Zoledronic acid, Zolinza, Zometa®, or combinations of any of the above.

The pharmaceutically acceptable excipient includes carrier, adjuvant, vehicle or mixtures thereof.

The compounds of the present invention are used in the treatment or inhibition of uncontrolled cell growth such as cancer. The compounds effectively target cancer cells including cancer stem cells.

The present invention also relates to a method of treatment or inhibition of uncontrolled cell growth such as cancer. The compounds have been found to target cancer cells including cancer stem cells. The method comprises administering an effective amount of compound of Formula I, Ia, II to XXII to a patient.

The invention also relates to a method of treatment or inhibition of uncontrolled cell growth such as cancer by administering an effective amount of a pharmaceutical composition comprising compound of Formula I to XXII to a patient.

The compounds of the present invention can also be provided along with standard therapies available for the treatment of cancer.

The compounds of the present invention are used for the treatment or inhibition of breast, prostate, brain, blood, bone marrow, liver, pancreas, skin, kidney, colon, ovary, lung, testicle, penis, thyroid, parathyroid, pituitary, thymus, retina, uvea, conjunctiva, spleen, head, neck, trachea, gall bladder, rectum, salivary gland, adrenal gland, throat, esophagus, lymph nodes, sweat glands, sebaceous glands, muscle, heart, and stomach cancer, particularly the compounds are used for the treatment of breast and prostate cancer.

In an embodiment, the compounds can be used in the treatment of malaria, dengue.

The examples illustrated herein below define the invention but are not limiting thereof.

A. Synthesis of Compound of Formula X, XIV, VIII, IV and V

Scheme 1 depicts the synthesis of compounds of Formula X, VIII, XIV, IV and V represented by 5a, 5b$_1$, 5b$_2$, 5c and 6c respectively in the below scheme.

Scheme 1

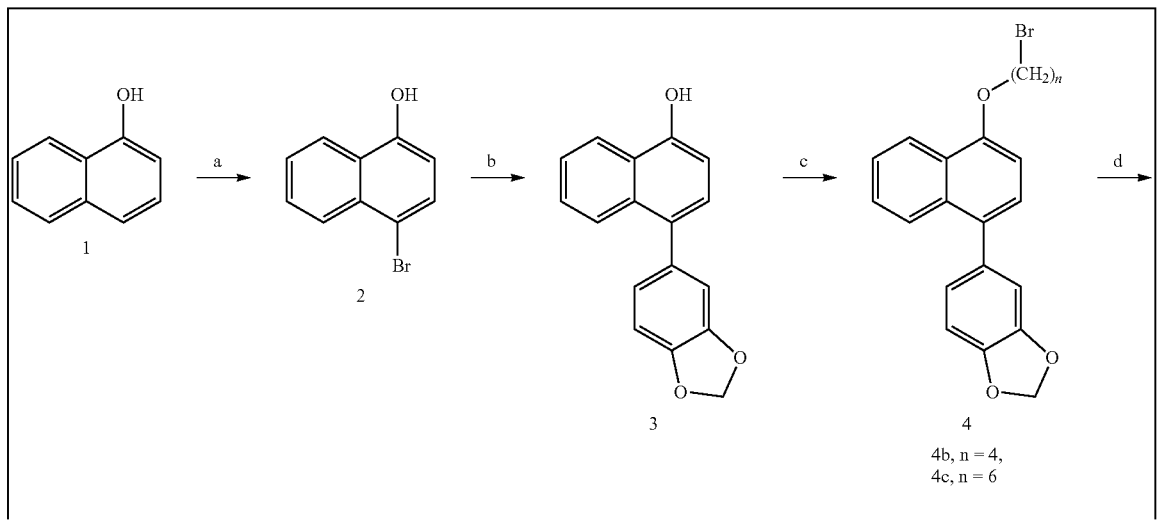

-continued

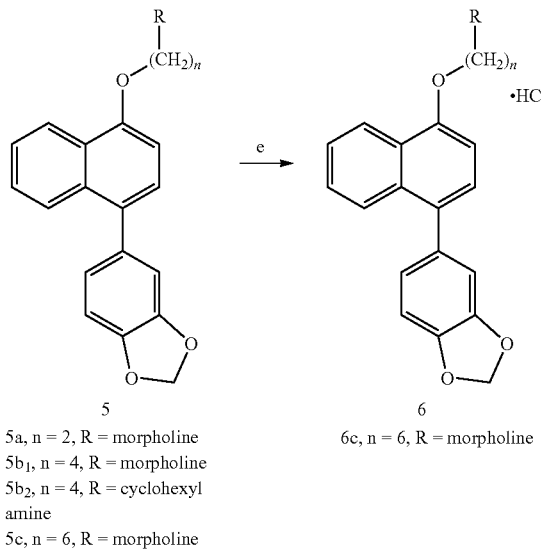

5a, n = 2, R = morpholine
5b₁, n = 4, R = morpholine
5b₂, n = 4, R = cyclohexyl amine
5c, n = 6, R = morpholine 6c, n = 6, R = morpholine Reagents and conditions: a) NBS (N-Bromosuccinimide), ACN (Acetonitrile), room temperature (RT), 1.5 hours; b) Pd(PPh$_3$)$_4$, 3,4-(methylenedioxy)phenylboronic acid, NaOH, Toluene, H$_2$O, 110° C., 8 hrs; c) Dibromo butane or Dibromo hexane, NaOH, Tetra-n-butylammonium bromide (TBAB), water, 50° C., 4 hours; d) Morpholine, Na$_2$CO$_3$, DMF, RT, 12 hrs; e) HCl in MeOH, 0° C. to room temperature, 2 hours.

Synthesis of 2: 4-bromonaphthalen-1-ol

To a solution of naphthol (1) (10 g, 69.4 mmol) in 180 mL of ACN (200 ml), NBS (12.36 g, 69.4 mmol) was added over a period of 1 hr at RT. The reaction mixture was stirred at RT for additional 30 minutes and monitored using TLC. After completion of the reaction, the reaction mixture was poured in ice cold water (100 ml). The reaction mixture was extracted with ethyl acetate (100 ml*3 times). The organic layer was dried over anhydrous sodium sulfate and concentrated under reduced pressure. Crude compound was purified with column chromatography using 2% ethyl acetate in pet ether and 100-200 mesh size of silica gel to afford 4-bromonaphthalen-1-ol (2) as a white solid.

Pure compound=8.83 gm. % Yield=57%.

Synthesis of 3: 4-(benzo[d][1,3]dioxol-5-yl)naphthalen-1-ol

Compound 2 (2.0 g, 8.96 mmol) was dissolved in Toluene (40 ml). Solution of NaOH (0.717 gm, 17.93 mmol) in water (7.0 ml) and 3,4-(methylenedioxy) phenylboronic acid (2.23 g, 13.45 mmol) was added in a reaction mixture at RT under N$_2$ condition. After 15 minutes, Pd(PPh$_3$)$_4$ (0.517 g, 0.44 mmol) was added at RT under N$_2$ condition. The reaction mixture was refluxed at 110° C. for 8 hrs, and monitored using TLC. After completion, the reaction mixture was cooled to RT and the reaction mixture was poured in water (100 ml) and extracted with ethyl acetate (50 ml*3 times). Organic layer was washed with water (50 ml). The combined organic layer was dried over anhydrous sodium sulfate and concentrated under reduced pressure. The obtained crude compound was purified by column chromatography (Hexane:Ethyl acetate—90:10) to afford 4-(benzo[d][1,3]dioxol-5-yl)naphthalen-1-ol (3) as a white solid.

Pure compound=1.5 gm. % Yield=70%.

$^1$H-NMR (400 MHz, CDCl3): δ=8.25 (d, 1H, J=8 Hz), 8.23 (d, 1H, J=8 Hz), 7.91-7.46 (m, 2H), 7.25 (m, 1H), 6.94 (m, 3H), 6.85 (m, 1H), 6.03 (s, 2H), 5.25 (s, 1H).

Synthesis of 4b: 5-(1-(4-bromobutoxy)naphthalen-4-yl)benzo[d][1,3]dioxole

Dibromobutane (16.35 gm, 75.75 mol) was added dropwise to a solution of Compound 3 (2.0 g, 7.57 mol), NaOH (0.606 g, 15.15 mol), TBAB (0.244 g, 0.75 mol) and water (40 ml). Reaction mixture was stirred at 60° C. for 5 hrs. Reaction was monitored with TLC. After completion of the reaction, the reaction mixture was poured in ice cold water and extracted with ethyl acetate (100 ml*3 times). Organic layer was washed with water (100 ml). The combined organic layer was dried over anhydrous sodium sulfate and concentrated under reduced pressure. The obtained crude compound was purified by column chromatography (Hexane:Ethyl acetate—90:10) to afford 5-(1-(4-bromobutoxy) naphthalen-4-yl)benzo[d][1,3]dioxole (4b) as a white solid.

Pure compound=1.49 gm. % Yield=50%.

Synthesis of 4c: 5-(1-(6-bromohexyloxy) naphthalen-4-yl) benzo[d][1,3]dioxole

Dibromohexane (27.72 g, 113.6 mol) was added dropwise to a solution of Compound 3 (5.0 g, 18.9 mol), NaOH (1.512 g, 37.8 mol), TBAB (0.60 g, 1.89 mol) and water (250 ml). Reaction mixture was stirred at 50° C. for 5 hrs. Reaction was monitored with TLC. After completion of the reaction, the reaction mixture was poured in ice cold water and extracted with ethyl acetate (100 ml*3 times). Organic layer was washed with water (100 ml). The combined organic layer was dried over anhydrous sodium sulfate and concentrated under reduced pressure. The obtained crude compound was purified by column chromatography (Hexane:

Ethyl acetate—90:10) to afford 5-(1-(6-bromohexyloxy) naphthalen-4-yl) benzo[d][1,3]dioxole (4c) as a white solid.

Pure compound=6.035 gm. % Yield=75%.

Synthesis of Compound of Formula X (5a): 4-(2-(1-(benzo[d][1,3]dioxol-5-yl)naphthalen-4-yloxy)ethyl)morpholine 4-(benzo[d][1,3]dioxol-5-yl)naphthalen-1-ol (3) (0.5 g, 1.89 mmol) was dissolved in dry DMF (10 ml) at room temperature. Potassium carbonate (0.654 g, 4.73 mmol) and potassium iodide (0.314 g, 1.89 mmol) was added in reaction mixture. Reaction mixture was stirred at RT for 15 min. 4-(2-chloroethyl)morpholine (0.528 g, 2.84 mmol) was added in reaction mixture. Reaction mixture was heated at 100° C. for 8 hrs. Reaction was monitored with TLC. After completion of the reaction, the reaction mixture was poured in ice cold water and extracted with ethyl acetate (100 ml*3 times). Organic layer was washed with water (100 ml*3 times). The combined organic layer was dried over anhydrous sodium sulfate and concentrated under reduced pressure. The obtained crude compound was purified by column chromatography (Methanol:Ethyl acetate—5:95) to afford 4-(2-(1-(benzo[d][1,3]dioxol-5-yl)naphthalen-4-yloxy)ethyl)morpholine (5a) as a white solid.

Pure compound=0.120 gm. % Yield=17%.

$^1$H-NMR (400 MHz, CDCl3): δ=8.32 (d, 1H, J=8 Hz), 7.89 (d, 1H, J=8 Hz), 7.49 (m, 2H), 7.29 (m, 1H), 6.94 (m, 3H), 6.84 (m, 1H), 6.03 (s, 2H), 4.36 (t, 2H, J=8 Hz), 3.78 (m, 4H), 3.02 (m, 2H), 2.70 (m, 4H).

Synthesis of Compound of Formula VIII (5b$_1$): 4-(4-(1-(benzo[d][1,3]dioxol-5-yl)naphthalen-4-yloxy)butyl)morpholine 5-(1-(4-bromobutoxy) naphthalen-4-yl) benzo[d][1,3]dioxole (4b) (0.5 g, 1.25 mmol) was dissolved in dry DMF (10 ml) at room temperature. Potassium carbonate (1.732 g, 12.5 mmol) was added in reaction mixture. Reaction mixture was stirred at RT for 15 min. Morpholine (1.09 g, 12.5 mmol) was added in reaction mixture. Reaction mixture was stirred at RT for 16 hrs. Reaction was monitored with TLC. After completion of the reaction, the reaction mixture was poured in ice cold water and extracted with ethyl acetate (100 ml*3 times). Organic layer was washed with water (100 ml*3 times). The combined organic layer was dried over anhydrous sodium sulfate and concentrated under reduced pressure. The obtained crude compound was purified by column chromatography (Methanol:Ethyl acetate—5:95) to afford 4-(4-(1-(benzo[d][1,3]dioxol-5-yl)naphthalen-4-yloxy)butyl)morpholine (5b$_1$) as a white solid.

Pure compound=0.190 gm. % Yield=37%.

$^1$H-NMR (400 MHz, CDCl3): δ=8.35 (d, 1H, J=8 Hz), 7.88 (d, 1H, J=8 Hz), 7.46 (m, 2H), 7.25 (m, 1H), 6.94 (m, 3H), 6.84 (m, 1H), 6.03 (s, 2H), 4.22 (t, 2H, J=8 Hz), 3.74 (m, 4H), 2.50 (m, 6H), 2.01 (m, 2H), 1.82 (m, 2H).

Synthesis of Compound of Formula XIV (5b$_2$): N-(4-(1-(benzo[d][1,3]dioxol-5-yl)naphthalen-4-yloxy)butyl)cyclohexan amine 5-(1-(4-bromobutoxy) naphthalen-4-yl) benzo[d][1,3]dioxole (4b) (0.45 g, 1.13 mmol) was dissolved in dry DMF (10 ml) at room temperature. Potassium carbonate (1.565 g, 11.3 mmol) was added in reaction mixture. Reaction mixture was stirred at RT for 15 min. Cyclohexyl amine (1.12 g, 11.3 mmol) was added in reaction mixture. Reaction mixture was stirred at RT for 16 hrs. Reaction was monitored with TLC. After completion of the reaction, the reaction mixture was poured in ice cold water and extract with ethyl acetate (100 ml*3 times). Organic layer was washed with water (100 ml*3 times). The combined organic layer was dried over anhydrous sodium sulfate and concentrated under reduced pressure. The obtained crude compound was purified by column chromatography (Methanol:Ethyl acetate—5:95) to afford N-(4-(1-(benzo[d][1,3]dioxol-5-yl)naphthalen-4-yloxy)butyl)cyclohexan amine (5b$_2$) as off white solid.

Pure compound=0.135 gm. % Yield=32%.

$^1$H-NMR (400 MHz, CDCl3): δ=9.24 (s, 1H), 8.32 (d, 1H, J=8 Hz), 7.88 (d, 1H, J=8 Hz), 7.46 (m, 2H), 7.25 (m, 1H), 6.94 (m, 3H), 6.84 (m, 1H), 6.03 (s, 2H), 4.07 (M, 2H), 3.09 (m, 3H), 2.20 (m, 3H), 2.17 (m, 2H), 1.98 (m, 3H), 1.72 (m, 6H).

Synthesis of Compound of Formula IV (5c): 4-(6-(1-(benzo[d][1,3]dioxol-5-yl)naphthalen-4-yloxy)hexyl)morpholine 5-(1-(6-bromohexyloxy) naphthalen-4-yl) benzo[d][1,3]dioxole (4c) (0.4 gm, 0.936 mmol) was dissolved in dry DMF (10 ml) at room temperature. Potassium carbonate (2.58 g, 18.7 mmol) was added in reaction mixture. Reaction mixture was stirred at RT for 15 min. Morpholine (1.0 g, 9.36 mmol) was added in reaction mixture. Reaction mixture was stirred at RT for 16 hrs. Reaction was monitored with TLC. After completion of the reaction, the reaction mixture was poured in ice cold water and extracted with ethyl acetate (100 ml*3 times). Organic layer was washed with water (100 ml*3 times). The combined organic layer was dried over anhydrous sodium sulfate and concentrated under reduced pressure. The obtained crude compound was purified by column chromatography (Methanol:Ethyl acetate—5:95) to afford 4-(6-(1-(benzo[d][1,3]dioxol-5-yl)naphthalen-4-yloxy)hexyl)morpholine (5c) as a white solid.

Pure compound=0.172 gm. % Yield=43%.

$^1$H-NMR (400 MHz, CDCl3): δ=8.35 (d, 1H, J=8 Hz), 7.89 (d, 1H, J=8 Hz), 7.46 (m, 2H), 7.25 (m, 1H), 6.94 (m, 3H), 6.85 (m, 1H), 6.03 (s, 2H), 4.19 (t, 2H, J=8 Hz), 3.73 (m, 4H), 2.44 (m, 4H), 2.36 (m, 2H), 1.98 (m, 2H). 1.62 (m, 6H).

Synthesis of Compound of Formula V (6c): 4-(6-(1-(benzo[d][1,3]dioxol-5-yl)naphthalen-4-yloxy)hexyl)morpholine hydrochloride 4-(6-(1-(benzo[d][1,3]dioxol-5-yl)naphthalen-4-yloxy)hexyl)morpholine (5c) (100 mg) was dissolved in dichloromethane (10 ml). HCl in Methanol (2 ml) was added in reaction mixture at 0° C. Reaction mixture was stirred at RT for 2 hrs. Reaction was monitored with TLC. After completion of the reaction, the reaction mixture was evaporated on rota evaporator and dried with high vacuum. Compound was crystallized with ethyl acetate.

Pure compound=85 mg, % Yield=75%.

$^1$H-NMR (400 MHz, DMSO): δ=10.5 (s, 1H), 8.26 (d, 1H, J=8 Hz), 7.81 (d, 1H, J=8 Hz), 7.53 (m, 2H), 7.32 (m, 1H), 6.97 (m, 3H), 6.85 (m, 1H), 6.03 (s, 2H), 4.22 (t, 2H, J=8 Hz), 3.96 (m, 4H), 2.44 (m, 4H), 2.36 (m, 2H), 1.98 (m, 2H), 1.62 (m, 6H).

B. Synthesis of Compound of Formula VI, III, VII and IX

Scheme 2 depicts the synthesis of compounds of Formula VI, III, VII and IX represented by 15a, 15b, 16a and 16b respectively in the below scheme.

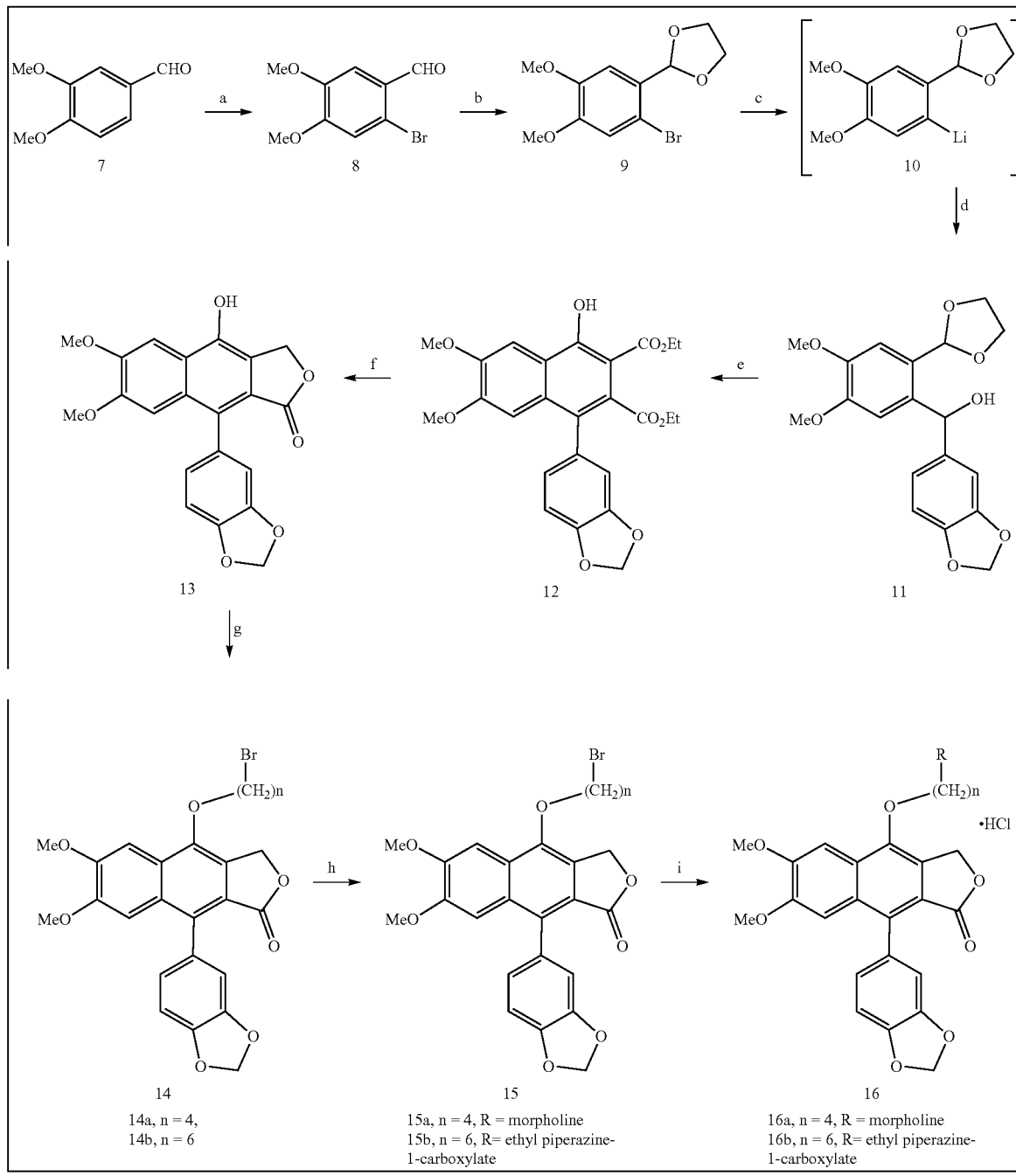

Scheme 2

14a, n = 4,
14b, n = 6

15a, n = 4, R = morpholine
15b, n = 6, R = ethyl piperazine-1-carboxylate 16a, n = 4, R = morpholine
16b, n = 6, R = ethyl piperazine-1-carboxylate Reagents and conditions: a) $Br_2$, AcOH, Room temperature (RT), 3 hrs; b) Ethylene glycol, p-TSA (toluene sulfonic acid), toluene, 100° C., 16 hrs; c) n-BuLi, THF (tetrahydrofuran), −20° C., 2 hrs; piperinal, THF, −20° C., 2 hrs; e) diethyl acetylinedicarboxylate, AcOH, DCM (dichloromethane), 140° C., 6 hrs; f) $LiAlH_4$, THF, 0° C., 4 hrs; g) Dibromobutane or dibromohexane, NaOH, DMSO, 40° C., 4 hrs; h) Morpholine or ethyl piperazine carboxylate, $K_2CO_3$, DMF, RT, 12 hrs; i) HCl in MeOH, 0° C. to RT, 2 hrs

Synthesis of 8: 2-Bromo-4,5-dimethoxybenzaldehyde

Three necked RBF (500 mL) equipped with dropping funnel, magnetic stirrer, and stopper was charged with veratraldehyde or 4,5-dimethoxybenzaldehyde (7) (15 g, 0.090 mol) and acetic acid (210 mL). To this solution was added bromine (9.67 mL) in acetic acid (60 mL) dropwise with constant stirring over half an hour and stirring was further continued for 3 hours at room temperature. During this time all the starting materials was consumed as confirmed by TLC (3:7, EtOAc:Hexane). Water (250 mL) was added to the reaction mixture and cooled to 0° C. The precipitated solid was filtered off, washed with cold water and dried under vacuum to get a white solid 2-Bromo-4,5-dimethoxybenzaldehyde (8).

$^1$H-NMR (CDCl3, 300 MHz): δ=10.19 (s, 1H), 7.43 (s, 1H), 7.07 (s, 1H), 3.97 (s, 3H), 3.93 (s, 3H).

Synthesis of 9: 2-(2-Bromo-4,5-dimethoxyphenyl)-1,3-dioxolane

Three necked RBF (250 mL) was equipped with Dean-Stark apparatus and reflux condenser, was charged with 8 (19.0 g, 0.07 mol), toluene (200 mL), ethylene glycol (1.8 mL, 0.21 mol) and catalytic amount of p-toluene sulphonic acid. The reaction flask was immersed in oil bath and heated (90-95° C.) under reflux for 9 h (till all the water removed). After completion of reaction as judged by TLC (2:8, EtOAc:Hexane), reaction mixture was allowed to cool to room temperature, neutralized by sodium bicarbonate solution and extracted with ethyl acetate (3×100 mL). All the organic layers were combined, dried over anhydrous sodium sulfate, filtered and concentrated under reduced pressure. The crude mass was purified by column chromatography over silica gel using ethyl acetate (5-10%) in hexane as eluent to afford 2-(2-Bromo-4,5-dimethoxyphenyl)-1,3-dioxolane (9) as a white solid.

$^1$H-NMR (300 MHz, CDCl3): δ=7.11 (s, 1H), 7.01 (s, 1H), 5.99 (s, 1H), 4.18 (t, 2H, J=6.9 Hz), 4.08 (t, 2H, J=6.9 Hz), 3.89 (s, 3H), 3.88 (s, 3H).

Synthesis of 11: (2-(1,3-Dioxolan-2-yl)-4,5-dimethoxyphenyl)(benzo[d][1,3]dioxol-5-yl)-methanol To a flame dried three necked RBF (100 mL) were added 9 (1.0 g, 0.0034 mol) and anhydrous THF (25 mL) under nitrogen atmosphere. The flask was cooling to −78° C. in dry ice-acetone bath, n-BuLi (5.3 mL, 0.005 mol) was added dropwise with stirring at −78° C. and stirred for 15 min. A separate flame dried flask was charged with piperonal (0.517 g, 0.0034 mol) and dry THF (6 mL). The piperonal solution was cannulated to the reaction mixture during 30 min and after the addition; reaction mixture was slowly warmed to room temperature and further stirred for 2.5 h. After the consumption of all bromo compound, as confirmed by TLC (5:5, EtOAc:Hexane), reaction mixture was quenched by the addition of saturated ammonium chloride solution and extracted with ethyl acetate (3×20 mL). All the organic layers were combined, dried over anhydrous sodium sulfate, filtered and concentrated. The crude product was purified by titration with heptane and (2-(1,3-Dioxolan-2-yl)-4,5-dimethoxyphenyl)(benzo[d][1,3]dioxol-5-yl)-methanol (11) was sufficiently pure to proceed to the next step.

$^1$H-NMR (300 MHz, CDCl3): δ=7.14 (s, 1H), 6.90-6.78 (m, 4H), 6.11 (s, 1H), 5.96 (s, 2H), 5.90 (s, 1H), 4.19 (t, 2H, J=6.6 Hz), 4.16 (t, 2H, J=6.8 Hz), 4.02 (s, 3H), 3.81 (s, 3H), 3.17 (s, 1H). 13C-NMR (300 MHz, CDCl3): δ=149.42, 148.11, 147.57, 146.58, 136.95, 135.43, 126.83, 121.04, 119.69, 111.48, 109.50, 107.92, 107.26, 101.65, 100.93, 71.34, 65.05, 55.94, 55.89.

Synthesis of 12: Diethyl 1-(3',4'-methylenedioxyphenyl)-4-hydroxy-6,7-dimethoxy-naphthalene-2,3-dicarboxylate Sealed tube was charged with 11 (0.30 g, 0.833 mmol), diethyl acetylinedicarboxylate (0.141 g, 0.833 mol), dichloromethane (0.4 mL) and glacial acetic acid (0.242 mL) and mixture was heated at 140° C. for 1 h. After completion of reaction as judged by TLC (5:5, EtOAc:Hexane), reaction mixture was cooled to room temperature, diluted with dichloromethane (10 mL), washed with 5% sodium bicarbonate solution (3×10 mL), organic layer was dried over anhydrous sodium sulfate, filtered and concentrated. The crude reaction mass was purified by flash column chromatography over silica gel using EtOAc:Hexane (15:85) to afford Diethyl 1-(3',4'-methylenedioxyphenyl)-4-hydroxy-6,7-dimethoxy-naphthalene-2,3-dicarboxylate (12) as white solid.

$^1$H-NMR (300 MHz, CDCl3): δ=7.73 (s, 1H), 6.89 (d, 1H, J=7.8 Hz), 6.81-6.75 (m, 3H), 6.05 (d, 2H, J=14.4 Hz), 4.44 (q, 2H, J=7.2 Hz), 4.07 (q, 2H, J=6.9 Hz), 4.05 (s, 3H), 3.77 (s, 3H), 1.38 (t, 3H, J=7.2 Hz), 1.08 (t, 3H, J=6.9 Hz). 13C-NMR (300 MHz, CDCl3): δ=170.30, 168.74, 159.62, 152.37, 149.68, 147.22, 147.06, 132.21, 130.60, 128.99, 127.48, 124.37, 119.81, 111.42, 107.97, 105.73, 102.76, 101.09, 61.95, 60.81, 56.08, 55.79, 13.87, 13.82.

Synthesis of 13: 9-(3',4'-Methylenedioxyphenyl)-4-hydroxy-6,7-dimethoxynaphtho[2,3-c]furan-1(3H)-one Two necked RBF (25 mL) was charged with LAH (0.032 g, 0.852 mmol) and anhydrous THF (4 mL) and the mixture was cooled to 0° C. with stirring. To this suspension, a solution of 12 (0.200 g, 0.426 mmol) in THF (4 mL) was added dropwise at 0° C. and stirring was continued for 2 hr at same temperature. After completion of reaction as judged by TLC (1:9, MeOH:DCM), reaction mixture was quenched with saturated sodium sulfate solution and extracted with t-butanol (4×20 mL). Organic layer was dried over anhydrous sodium sulfate, filtered and concentrated under reduced pressure. The crude residue was purified by flash column chromatography over silica gel to give yellow solid 9-(3',4'-Methylenedioxyphenyl)-4-hydroxy-6,7-dimethoxynaphtho[2,3-c]furan-1(3H)-one (13).

$^1$H-NMR (300 MHz, DMSOd6) δ=10.39 (s, 1H), 7.61 (s, 1H), 7.00 (d, 1H, J=8.1 Hz), 6.94 (s, 1H), 6.85 (d, 1H, J=1.5 Hz), 6.75 (dd, 1H J=1.5, 8.4 Hz), 6.10 (s, 2H), 5.35 (s, 2H), 3.93 (s, 3H), 3.64 (s, 3H). 13C-NMR (300 MHz, DMSOd6): δ=169.81, 150.66, 149.89, 147.01, 146.76, 145.05, 129.71, 129.65, 128.95, 123.94, 123.45, 121.85, 118.86, 111.22, 108.02, 105.63, 101.19, 100.92, 66.71, 55.78, 55.29.

LC-MS (ESI) m/z: 381 [M+H]+

Synthesis of 14a: 4-(4-bromobutoxy)-9-(benzo[d][1,3]dioxol-5-yl)-6,7-dimethoxynaphtho[2,3-c]furan-1(3H)-one Dibromobutane (11.36 g, 52.63 mol) was added dropwise to a solution of Compound 13 (2.0 g, 5.26 mol), NaOH (1.26 gm, 31.57 mol) in DMSO (50 ml). Reaction mixture was stirred at 40° C. for 5 hrs. Reaction was monitored with TLC. After completion of reaction, the reaction mixture was poured in ice cold water and extracted with ethyl acetate (100 ml*3 times). Organic layer was washed with water (100 ml). The combined organic layer was dried over anhydrous sodium sulfate and concentrated under reduced pressure. The obtained crude compound was purified by column chromatography (Hexane:Ethyl acetate—90:10) to afford 4-(4-bromobutoxy)-9-(benzo[d][1,3]dioxol-5-yl)-6,7-dimethoxynaphtho[2,3-c]furan-1(3H)-one (14a) as a white solid.

Pure compound=1.2 gm. % Yield=45%.

Synthesis of 14b: 4-(6-bromohexyloxy)-9-(benzo[d][1,3]dioxol-5-yl)-6,7-dimethoxynaphtho [2,3-c]furan-1(3H)-one Dibromohexane (38.52 g, 157.8 mol) was added dropwise to a solution of Compound 13 (6.0 g, 15.78 mol), NaOH (3.8 gm, 95.4 mol) in DMSO (100 ml). Reaction mixture was stirred at 40° C. for 5 hrs. Reaction was monitored with TLC. After completion of the reaction, the reaction mixture was poured in ice cold water and extracted with ethyl acetate (150 ml*3 times). Organic layer was washed with water (150 ml). The combined organic layer was dried over anhydrous sodium sulfate and concentrated under reduced pressure. The obtained crude compound was purified by column chromatography (Hexane:Ethyl acetate—90:10) to afford 4-(6-bromohexyloxy)-9-(benzo[d][1,3]dioxol-5-yl)-6,7-dimethoxynaphtho [2,3-c]furan-1(3H)-one (14b) as a white solid.

Pure compound=5.0 gm. % Yield=58%.

Synthesis of Compound of Formula VI (15a): 4-(4-morpholinobutoxy)-9-(benzo[d][1,3]dioxol-5-yl)-6,7-dimethoxynaphtho[2,3-c]furan-1(3H)-one 4-(4-bromobutoxy)-9-(benzo[d][1,3]dioxol-5-yl)-6,7-dimethoxynaphtho[2,3-c]furan-1(3H)-one (14a) (0.5 g, 0.970 mmol) was dissolved in dry DMF (10 ml) at room temperature. Potassium carbonate (1.341 g, 9.70 mmol) was added in reaction mixture. Reaction mixture was stirred at RT for 15 min. Morpholine (0.844 g, 9.70 mmol) was added in reaction mixture. Reaction mixture was stirred at RT for 16 hrs. Reaction was monitored with TLC. After completion of the reaction, the reaction mixture was poured in ice cold water and extracted with ethyl acetate (100 ml*3 times). Organic layer was washed with water (100 ml*3 times). The combined organic layer was dried over anhydrous sodium sulfate and concentrated under reduced pressure. The obtained crude compound was purified by column chromatography (Methanol:Ethyl acetate—5:95) to afford 4-(4-morpholinobutoxy)-9-(benzo[d][1,3]dioxol-5-yl)-6,7-dimethoxynaphtho[2,3-c]furan-1(3H)-one (15a) as a white solid.

Pure compound=0.335 gm. % Yield=66%.

$^1$H-NMR (400 MHz, DMSOd6) δ=7.54 (s, 1H), 7.06 (d, 1H, J=8.1 Hz), 6.96 (s, 1H), 6.80 (d, 1H, J=1.5 Hz), 6.75 (dd, 1H J=1.5, 8.4 Hz), 6.10 (s, 2H), 5.63 (s, 2H), 4.32 (t, 2H, J=6.4 Hz), 3.95 (s, 3H), 3.66 (s, 3H), 3.57 (m, 4H), 2.37 (m, 4H), 1.90 (m, 2H), 1.85 (m, 2H).

Synthesis of Compound of Formula III (15b): ethyl 4-(6-(9-(benzo[d][1,3]dioxol-5-yl)-1,3-dihydro-6,7-dimethoxy-1-oxonaphtho[2,3-c]furan-4-yloxy)hexyl)piperazine-1-carboxylate 4-(6-bromohexyloxy)-9-(benzo[d][1,3]dioxol-5-yl)-6,7-dimethoxynaphtho [2,3-c]furan-1(3H)-one (14b) (0.3 g, 0.553 mmol) was dissolved in dry DMF (10 ml) at room temperature. Potassium carbonate (1.43 g, 5.53 mmol) was added in reaction mixture. Reaction mixture was stirred at RT for 15 min. Ethyl piperazine-1-carboxylate (0.874 g, 5.53 mmol) was added in reaction mixture. Reaction mixture was stirred at RT for 16 hrs. Reaction was monitored with TLC. After completion of the reaction, the reaction mixture was poured in ice cold water and extracted with ethyl acetate (100 ml*3 times). Organic layer was washed with water (100 ml*3 times). The combined organic layer was dried over anhydrous sodium sulfate and concentrated under reduced pressure. The obtained crude compound was purified by column chromatography (Methanol:Ethyl acetate—5:95) to afford ethyl 4-(6-(9-(benzo[d][1,3]dioxol-5-yl)-1,3-dihydro-6,7-dimethoxy-1-oxonaphtho[2,3-c]furan-4-yloxy)hexyl)piperazine-1-carboxylate (15b) as a white solid.

Pure compound=0.120 gm. % Yield=47%.

$^1$H-NMR (400 MHz, DMSOd6) δ=7.53 (s, 1H), 7.04 (d, 1H, J=8.1 Hz), 6.96 (s, 1H), 6.80 (d, 1H, J=1.5 Hz), 6.75 (dd, 1H J=1.5, 8.4 Hz), 6.12 (s, 2H), 5.62 (s, 2H), 4.29 (t, 2H, J=6.4 Hz), 3.94 (s, 3H), 3.66 (s, 3H), 3.53 (m, 4H), 2.30 (m, 6H), 1.96 (t, J=7.6 Hz, 2H), 1.48 (m, 2H), 1.38 (m, 4H).

Synthesis of Compound of Formula VII (16a): 4-(4-morpholinobutoxy)-9-(benzo[d][1,3]dioxol-5-yl)-6,7-dimethoxynaphtho[2,3-c]furan-1(3H)-one Hydrochloride 4-(4-morpholinobutoxy)-9-(benzo[d][1,3]dioxol-5-yl)-6,7-dimethoxynaphtho[2,3-c]furan-1(3H)-one (15a) (100 mg) was dissolved in dichloromethane (10 ml). HCl in Methanol (2 ml) was added in reaction mixture at 0° C. Reaction mixture was stirred at RT for 2 hrs. Reaction was monitored with TLC. After completion of the reaction, the reaction mixture was evaporated on rota evaporator and dried with high vacuum. Compound was crystallized with ethyl acetate.

Pure compound=98 mg, % Yield=91%.

$^1$H-NMR (400 MHz, DMSOd6) δ=7.54 (s, 1H), 7.06 (d, 1H, J=8.1 Hz), 6.96 (s, 1H), 6.80 (d, 1H, J=1.5 Hz), 6.75 (dd, 1H J=1.5, 8.4 Hz), 6.10 (s, 2H), 5.63 (s, 2H), 4.32 (t, 2H, J=6.4 Hz), 4.1 (m, 6H), 3.95 (s, 3H), 3.66 (s, 3H), 3.57 (m, 6H), 1.90 (m, 2H), 1.85 (m, 4H).

Synthesis of Compound of Formula IX (16b): ethyl 4-(6-(9-(benzo[d][1,3]dioxol-5-yl)-1,3-dihydro-6,7-dimethoxy-1-oxonaphtho[2,3-c]furan-4-yloxy)hexyl)piperazine-1-carboxylate Hydrochloride Ethyl 4-(6-(9-(benzo[d][1,3]dioxol-5-yl)-1,3-dihydro-6,7-dimethoxy-1-oxonaphtho[2,3-c]furan-4-yloxy)hexyl)piperazine-1-carboxylate (15b) (73 mg) was dissolved in dichloromethane (10 ml). HCl in Methanol (2 ml) was added in reaction mixture at 0° C. Reaction mixture was stirred at RT for 2 hrs. Reaction was monitored with TLC. After completion of reaction, the reaction mixture was evaporated on rota evaporator and dried with high vacuum. Compound was crystallized with ethyl acetate.

Pure compound=56 mg, % Yield=80%.

$^1$H-NMR (400 MHz, DMSOd6) δ=10.65 (s, 1H), 7.61 (s, 1H), 7.06 (d, 1H, J=8.1 Hz), 6.96 (s, 1H), 6.80 (d, 1H, J=1.5 Hz), 6.75 (dd, 1H J=1.5, 8.4 Hz), 6.10 (s, 2H), 5.47 (s, 2H), 4.23 (t, 2H, J=6.4 Hz), 4.12 (m, 4H), 4.05 (s, 3H), 3.80 (s, 3H), 3.51 (m, 4H), 3.45 (m, 6H), 1.96 (t, J=7.6 Hz, 2H), 1.48 (m, 4H), 1.27 (m, 5H).

C. Synthesis of Compound of Formula XII

Scheme 3 depicts the synthesis of compound of Formula XII represented by 18a in the below scheme.

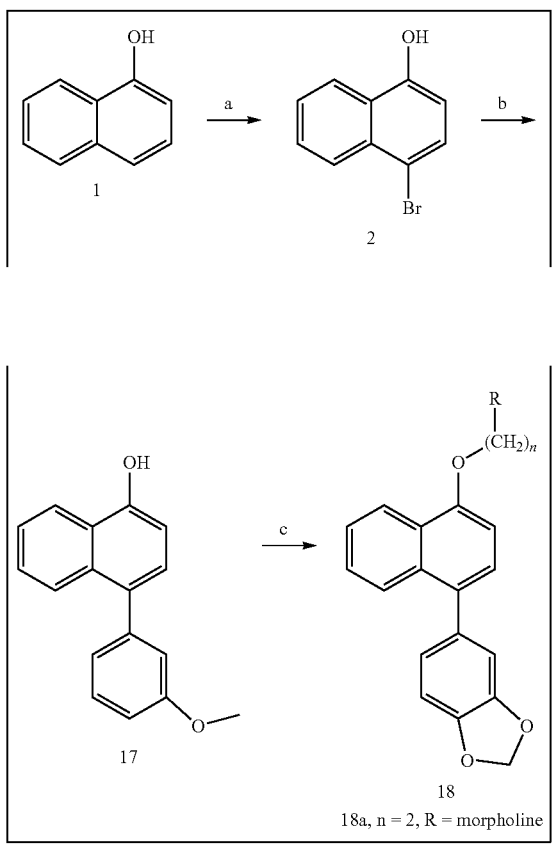

Scheme 3

Reagents and conditions: a) NBS (N-Bromosuccinimide), ACN (Acetonitrile), RT, 1.5 hr; b) Pd(PPh$_3$)$_4$, 3-Methoxyphenylboronic acid, NaOH, Toluene, H$_2$O, 110° C., 8 hrs; c) Chloroethyl morpholine, K$_2$CO$_3$, DMF (Dimethylformamide), 100° C., 12 hrs;

Synthesis of 2: 4-bromonaphthalen-1-ol

To a solution of naphthol (1) (10 g, 69.4 mmol) in 180 mL of ACN (200 ml), NBS (12.36 g, 69.4 mmol) was added over a period of 1 hr at RT. The reaction mixture was stirred at RT for additional 30 min and monitored using TLC. After completion of the reaction, the reaction mixture was poured in ice cold water (100 ml). The reaction mixture was extracted with ethyl acetate (100 ml*3 times). The organic layer was dried over anhydrous sodium sulfate and concentrated under reduced pressure. Crude compound was purified with column chromatography using 2% ethyl acetate in pet ether and 100-200 mesh size of silica gel to afford 4-bromonaphthalen-1-ol (2) as a white solid.

Pure compound=8.83 gm. % Yield=57%.

Synthesis of 17: 4-(3-methoxyphenyl)naphthalen-1-ol

Compound 2 (2.0 g, 8.96 mmol) was dissolved in Toluene (40 ml). Solution of NaOH (0.717 g, 17.93 mmol) in Water (7.0 ml) and 3-Methoxyphenylboronic acid (2.04 g, 13.45 mmol) was added in reaction mixture at RT under N$_2$ condition. After 15 min, Pd(PPh$_3$)$_4$ (0.517 g, 0.44 mmol) was added at RT under N$_2$ condition. The reaction mixture was refluxed at 110° C. for 8 hrs, and monitored using TLC. After completion, the reaction mixture was cooled to RT and reaction mixture was poured in water (100 ml) and extracted with ethyl acetate (50 ml*3 times). Organic layer was washed with water (50 ml). The combined organic layer was dried over anhydrous sodium sulfate and concentrated under reduced pressure. The obtained crude compound was purified by column chromatography (Hexane:Ethyl acetate—90:10) to afford 4-(3-methoxyphenyl)naphthalen-1-ol (17) as a white solid.

Pure comp.=1.3 gm. % Yield=55%.

Synthesis of Compound of Formula XII (18a): 4-(2-(1-(3-methoxyphenyl)naphthalen-4-yloxy)ethyl)morpholine 4-(3-methoxyphenyl)naphthalen-1-ol (17) (0.5 g, 2.0 mmol) was dissolved in dry DMF (20 ml) at room temperature. Potassium carbonate (0.691 g, 5.0 mmol) and potassium iodide (0.352 g, 2.0 mmol) was added in reaction mixture. Reaction mixture was stirred at RT for 15 min. 4-(2-chloroethyl)morpholine (0.55 g, 3.0 mmol) was added in reaction mixture. Reaction mixture was heated at 100° C. for 8 hrs. Reaction was monitored with TLC. After completion of the reaction, the reaction mixture was poured in ice cold water and extracted with ethyl acetate (100 ml*3 times). Organic layer was washed with water (100 ml*3 times). The combined organic layer was dried over anhydrous sodium sulfate and concentrated under reduced pressure. The obtained crude compound was purified by column chromatography (Methanol:Ethyl acetate—5:95) to afford 4-(2-(1-(3-methoxyphenyl)naphthalen-4-yloxy)ethyl)morpholine (18a) as a white solid.

Pure compound=0.70 gm. % Yield=96%.

$^1$H-NMR (400 MHz, CDCl3): δ=8.33 (d, 1H, J=8 Hz), 7.90 (d, 1H, J=8 Hz), 7.49 (m, 2H), 7.47 (m, 2H), 7.06 (m, 1H), 7.01 (m, 1H), 6.97 (m, 1H), 6.86 (m, 1H), 4.39 (t, 2H, J=8 Hz), 3.85 (s, 3H), 3.78 (m, 4H), 3.02 (m, 2H), 2.70 (in, 4H).

D. Synthesis of Compound of Formula XI and XIII

Scheme 4 depicts the synthesis of compound of Formula XI and XIII represented by 30a and 30b respectively in the below scheme.

Scheme 4

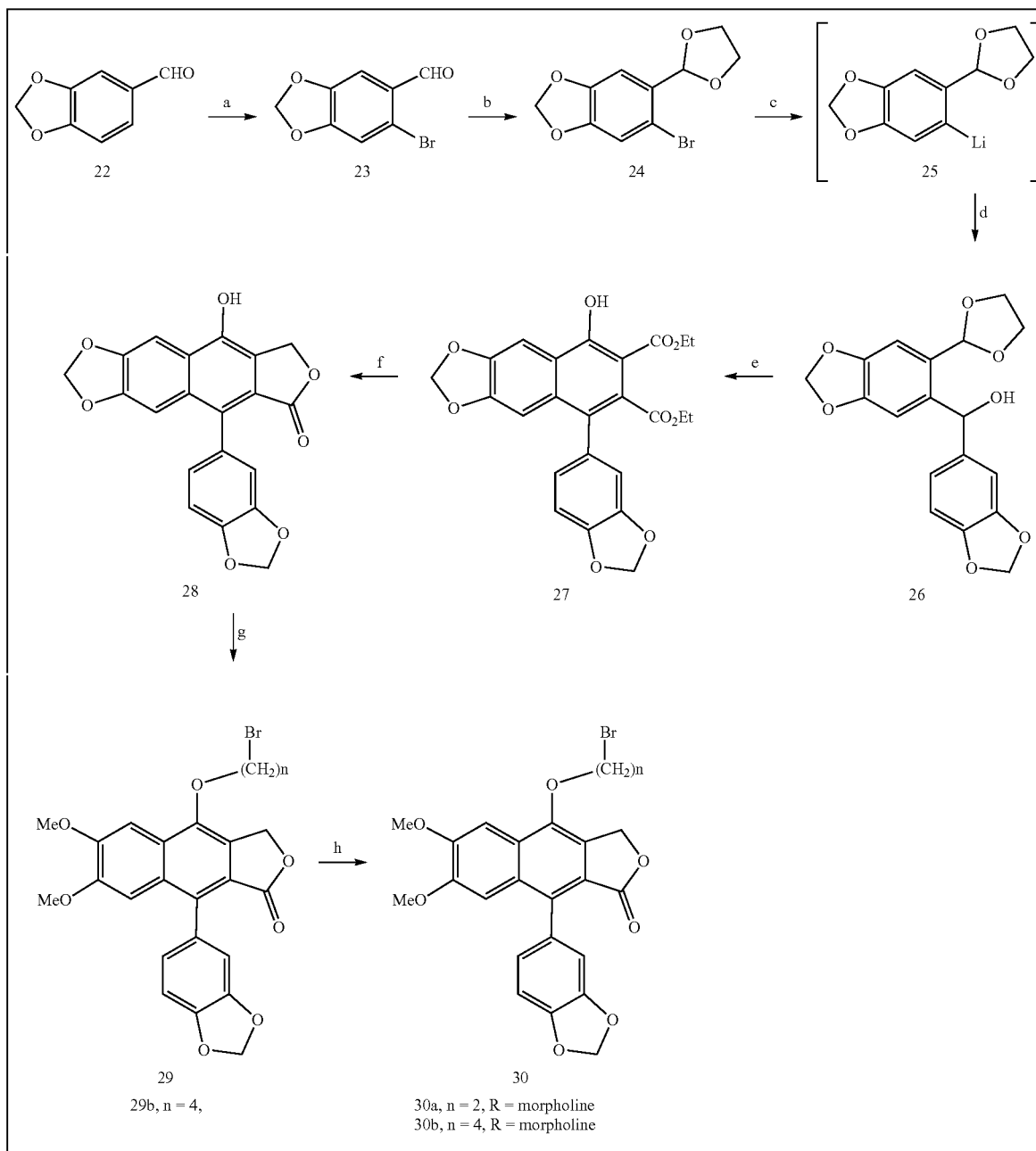

Reagents and conditions: a) Br$_2$, AcOH, room temperature (RT), 3 hrs; b) Ethylene glycol, p-TSA (toluene sulfonic acid), toluene, 100° C., 16 hrs; c) n-BuLi, THF (tetrahydrofuran), −20° C., 2 hrs; d) piperinal, THF, −20° C., 2 hrs; e) diethyl acetylinedicarboxylate, AcOH, DCM, 140° C., 6 hrs; f) LiAlH$_4$, THF, 0° C., 4 hrs; g) Dibromobutane, NaOH, DMSO, 40° C., 4 hrs; h) Morpholine, K$_2$CO$_3$, DMF, RT, 12 hrs;

Synthesis of 23: 6-bromobenzo[d][1,3]dioxole-5-carbaldehyde

Three necked RBF (500 mL) equipped with dropping funnel, magnetic stirrer, and stopper was charged with benzo[d][1,3]dioxole-5-carbaldehyde (22, 17 g, 0.12 mol) and acetic acid (130 mL). To this solution was added bromine (12.3 mL) in acetic acid (60 mL) dropwise with constant stirring over half an hour and stirring was further continued for 3 hours at room temperature. During this time all the starting materials was consumed as confirmed by TLC (3:7, EtOAc:Hexane). Water (250 mL) was added to the reaction mixture and cooled to 0° C. The precipitated solid was filtered off, washed with cold water and dried under vacuum to get a white solid 6-bromobenzo[d][1,3]dioxole-5-carbaldehyde (23).

Pure compound=18 gm. % Yield=70%.

Synthesis of 24: 5-bromo-6-(1,3-dioxolan-2-yl) benzo[d][1,3]dioxole

Three necked RBF (250 mL) was equipped with Dean-Stark apparatus and reflux condenser, was charged with 23 (15.0 g, 0.065 mol), toluene (150 mL), ethylene glycol (10.9 mL, 0.196 mol) and catalytic amount of p-toluene sulphonic acid. The reaction flask was immersed in oil bath and heated (90-95° C.) under reflux for 9 h (till all the water removed). After completion of the reaction as judged by TLC (2:8, EtOAc:Hexane), reaction mixture was allowed to cool to room temperature, neutralized by sodium bicarbonate solution and extracted with ethyl acetate (3×100 mL). All the organic layers were combined, dried over anhydrous sodium sulfate, filtered and concentrated under reduced pressure. The crude mass was purified by column chromatography over silica gel using ethyl acetate (5-10%) in hexane as eluent to afford 5-bromo-6-(1,3-dioxolan-2-yl)benzo[d][1,3]dioxole (24) as a white solid.

Pure compound=17 gm. % Yield=87%.

Synthesis of 26: (5-(1,3-dioxolan-2-yl)benzo[d][1,3]dioxol-6-yl)(benzo[d][1,3]dioxol-5-yl)methanol To a flame dried three necked RBF (100 mL) were added 24 (15 g, 0.0549 mole) and anhydrous THF (150 mL) under nitrogen atmosphere. The flask was cooled to −78° C. in dry ice-acetone bath, n-BuLi (52 mL, 0.082 mol) was added dropwise with stirring at −78° C. and stirred for 15 min. A separate flame dried flask was charged with piperonal (8.24 g, 0.054 mol) and dry THF (50 mL). The piperonal solution was cannulated to the reaction mixture during 30 min and after the addition; reaction mixture was slowly warmed to room temperature and further stirred for 2.5 h. After the consumption of all the bromo compound, as confirmed by TLC (5:5, EtOAc:Hexane), reaction mixture was quenched by the addition of saturated ammonium chloride solution and extracted with ethyl acetate (3×20 mL). All the organic layers were combined, dried over anhydrous sodium sulfate, filtered and concentrated. The crude product was purified by titration with heptane and (5-(1,3-dioxolan-2-yl)benzo[d][1,3]dioxol-6-yl)(benzo[d][1,3]dioxol-5-yl)methanol (26) was sufficiently pure to proceed to next step.

Pure compound=18 gm. % Yield=90%.

Synthesis of 27: diethyl 5-(benzo[d][1,3]dioxol-5-yl)-8-hydroxynaphtho[2,3-d][1,3]dioxole-6,7-dicarboxylate Sealed tube was charged with 26 (18 g, 0.052 mol), diethyl acetylinedicarboxylate (8.8 g, 0.052 mol), dichloromethane (500 mL) and glacial acetic acid (21 mL) and mixture was heated at 140° C. for 1 hour. After completion of reaction as judged by TLC (5:5, EtOAc:Hexane), the reaction mixture was cooled to room temperature, diluted with dichloromethane (500 mL), washed with 5% sodium bicarbonate solution (3×500 mL), organic layer was dried over anhydrous sodium sulfate, filtered and concentrated. The crude reaction mass was purified by flash column chromatography over silica gel using EtOAc:Hexane (15:85) to afford diethyl 5-(benzo[d][1,3]dioxol-5-yl)-8-hydroxynaphtho[2,3-d][1,3]dioxole-6,7-dicarboxylate (27) as white solid.

Pure compound=11.97 gm. % Yield=50.7%.

Synthesis of 28: 9-(3',4'-Methylenedioxyphenyl)-4-hydroxy-6,7-methylenedioxynaphtho[2,3-c]furan-1(3H)-one Two necked RBF (25 mL) was charged with LAH (2.52 g, 0.066 mol) and anhydrous THF (100 mL) and the mixture was cooled to 0° C. with stirring. To this suspension, a solution of 27 (12 g, 0.026 mol) in THF (100 mL) was added dropwise at 0° C. and stirring was continued for 2 hr at the same temperature. After completion of reaction as judged by TLC (1:9, MeOH:DCM), the reaction mixture was quenched with saturated sodium sulfate solution and extracted with ethyl acetate (4×200 mL). Organic layer was dried over anhydrous sodium sulfate, filtered and concentrated under reduced pressure. The crude residue was purified by flash column chromatography over silica gel to give yellow solid 9-(3',4'-Methylenedioxyphenyl)-4-hydroxy-6,7-methylenedioxynaphtho[2,3-c]furan-1(3H)-one (28).

Pure compound=2.1 gm. % Yield=17%.

Synthesis of 29b: 4-(4-bromobutoxy)-9-(benzo[d][1,3]dioxol-5-yl)-6,7-methylenedioxynaphtho[2,3-c]furan-1(3H)-one Dibromobutane (11.86 g, 0.0549 mol) was added dropwise to a solution of Compound 28 (2.0 g, 0.00549 mol), NaOH (0.439 g, 0.0109 mol), TBAB (0.177 g, 0.00054 mol) in water (40 ml). Reaction mixture was stirred at RT for 5 hrs. Reaction was monitored with TLC. After completion of reaction, reaction was poured in ice cold water and extract with ethyl acetate (100 ml*3 times). Organic layer was washed with water (100 ml). The combined organic layer was dried over anhydrous sodium sulfate and concentrated under reduced pressure. The obtained crude comp. was purified by column chromatography (Hexane:Ethyl acetate—90:10) to afford 4-(4-bromobutoxy)-9-(benzo[d][1,3]dioxol-5-yl)-6,7-methylenedioxynaphtho[2,3-c]furan-1(3H)-one (29b) as a white solid.

Pure comp.=1.09 gm. % Yield=26%.

Synthesis of Compound of Formula XI (30a): 4-(2-morpholinoethoxy)-9-(benzo[d][1,3]dioxol-5-yl)-6,7-methylenedioxynaphtho[2,3-c]furan-1(3H)-one Compound 28 (0.5 g, 1.37 mmol) was dissolved in dry DMF (10 ml) at room temperature. Potassium carbonate (0.227 g, 1.64 mmol) and potassium iodide (0.228 g, 1.37 mmol) was added in reaction mixture. Reaction mixture was stirred at RT for 15 min. 4-(2-chloroethyl)morpholine (0.383 g, 2.06 mmol) was added in reaction mixture. Reaction mixture was heated at 100° C. for 8 hrs. Reaction was monitored with TLC. After completion of the reaction, the reaction mixture was poured in ice cold water and extracted with ethyl acetate (100 ml*3 times). Organic layer was washed with water (100 ml*3 times). The combined organic layer was dried over anhydrous sodium sulfate and concentrated under reduced pressure. The obtained crude compound was purified by column chromatography (Methanol:Ethyl acetate—5:95) to afford 4-(2-morpholinoethoxy)-9-(benzo[d][1,3]dioxol-5-yl)-6,7-methylenedioxynaphtho[2,3-c]furan-1(3H)-one (30a) as a white solid.

Pure compound=0.08 gm. % Yield=13%.

$^1$H-NMR (400 MHz, CDCl3): δ=7.65 (s, 1H), 7.07 (s, 1H), 6.95 (m, 1H), 6.76 (m, 1H), 6.73 (m, 2H), 6.09 (m, 4H), 5.49 (s, 2H), 4.44 (m, 2H), 3.90 (m, 4H), 3.07 (m, 2H), 2.84 (m, 4H).

Synthesis of Compound of Formula XIII (30b): 4-(4-morpholinobutoxy)-9-(benzo[d][1,3]dioxol-5-yl)-6,7-methylenedioxynaphtho[2,3-c]furan-1(3H)-one 4-(4-bromobutoxy)-9-(benzo[d][1,3]dioxol-5-yl)-6,7-methylenedioxynaphtho[2,3-c]furan-1(3H)-one (29b) (0.3 g, 0.601 mmol) was dissolved in dry DMF (10 ml) at room temperature. Potassium carbonate (0.830 g, 6.01 mmol) was added in reaction mixture. Reaction mixture was stirred at RT for 15 min. Morpholine (0.523 g, 6.01 mmol) was added in reaction mixture. Reaction mixture was stirred at RT for 16 hrs. Reaction was monitored with TLC. After completion of the reaction, the reaction mixture was poured in ice cold water and extracted with ethyl acetate (100 ml*3 times). Organic layer was washed with water (100 ml*3 times). The combined organic layer was dried over anhydrous sodium sulfate and concentrated under reduced pressure. The obtained crude compound was purified by column chromatography (Methanol:Ethyl acetate—5:95) to afford 4-(4-morpholinobutoxy)-9-(benzo[d][1,3]dioxol-5-yl)-6,7-methylenedioxynaphtho[2,3-c]furan-1(3H)-one (30b) as a white solid.

Pure compound=0.3 gm. % Yield=95%.

$^1$H-NMR (400 MHz, DMSOd6) δ=7.54 (s, 1H), 7.05 (d, 1H, J=8.1 Hz), 6.94 (m, 1H), 6.73 (m, 2H), 6.07 (m, 4H), 5.45 (s, 2H), 4.44 (m, 2H), 3.90 (m, 4H), 3.07 (m, 2H), 2.84 (m, 4H). 1.30 (m, 4H).

E. Synthesis of Compound of Formula XI and XIII

Scheme 5 depicts the synthesis of compound of Formula XXI, XIX, XVIII, XX and XXII represented by 21a, 21b, 21c, 21c$_1$ and 21c$_2$ respectively in the below scheme.

Scheme 5

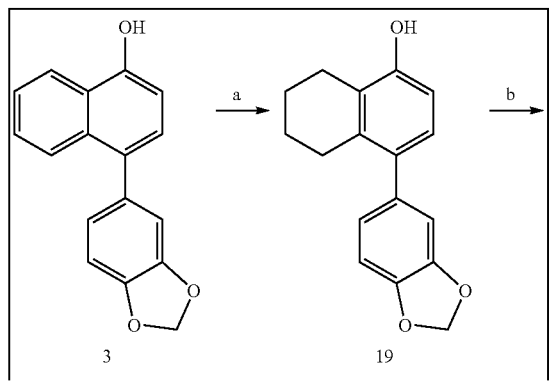

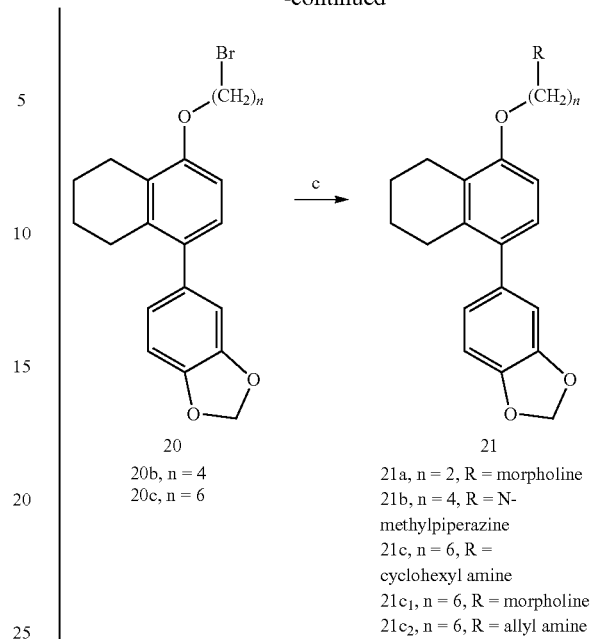

20
20b, n = 4
20c, n = 6

21
21a, n = 2, R = morpholine
21b, n = 4, R = N-methylpiperazine
21c, n = 6, R = cyclohexyl amine
21c$_1$, n = 6, R = morpholine
21c$_2$, n = 6, R = allyl amine Reagents and conditions: a) a) 10% Pd/C, H$_2$, Ethyl alcohol/Ethyl acetate, 50° C., 5 hrs; b) Dibromobutane or Dibromohexane, NaOH, TBAB (Tetra-n-butylammonium bromide), Water, 50° C., 4 hrs; c) morpholine or cyclohexylamine or allyl amine, Na$_2$CO$_3$, DMF, Room Temperature (RT), 12 hrs;

Synthesis of 19: 4-(benzo[d][1,3]dioxol-5-yl)-5,6,7,8-tetrahydronaphthalen-1-ol

A mixture of 3 (1 g, 3.78 mmol), 10% Pd/C in 50 mL of mixture of EtOH:EtOAc (1:1) was placed in shaker hydrogenation apparatus at 50° C. and 60-80 psi. The reaction was monitored using TLC. After completion, Pd/C was filtered off and the filtrate was evaporated. The obtained solid was purified by column chromatography (Hexane:Ethyl acetate, 95:5) to afford 4-(benzo[d][1,3]dioxol-5-yl)-5,6,7,8-tetrahydronaphthalen-1-ol (19) as a liquid.

Pure compound=0.5 gm. % Yield=51%.

$^1$H-NMR (400 MHz, CDCl3): δ=6.92 (d, 1H, J=8 Hz), 6.83 (d, 1H, J=8 Hz), 6.75 (d, 1H, J=1.6 Hz), 6.71 (dd, 1H, J=2 Hz & 8 Hz), 6.67 (d, 1H, J=8 Hz), 5.98 (s, 2H), 4.76 (s, 1H), 2.71 (t, 2H, J=6.8 Hz), 2.59 (t, 2H, J=6 Hz), 1.83 (m, 2H), 1.69 (m, 2H).

Synthesis of 20b: 5-(5-(4-bromobutoxy)-1,2,3,4-tetrahydronaphthalen-8-yl)benzo[d][1,3]dioxole Dibromobutane (8.05 g, 37.3 mmol) was added dropwise to a solution of Compound 19 (1.0 g, 3.73 mmol), NaOH (0.23 g, 7.46 mmol), TBAB (0.12 g, 0.37 mmol) and water (50 ml). Reaction mixture was stirred at 35° C. for 4 hrs. Reaction was monitored with TLC. After completion of the reaction, the reaction mixture was poured in ice cold water and extracted with ethyl acetate (100 ml*3 times). Organic layer was washed with water (100 ml*1 times). The combined organic layer was dried over anhydrous sodium sulfate and concentrated under reduced pressure. The obtained crude compound was purified by column chromatography (Hexane:Ethyl acetate—95:5) to afford 5-(5-(4-bromobutoxy)-1,2,3,4-tetrahydronaphthalen-8-yl)benzo[d][1,3]dioxole (20b) as a liquid.

Pure compound=1.0 gm. % Yield=67%.

Synthesis of 20c: 5-(5-(6-bromohexyloxy)-1,2,3,4-tetrahydronaphthalen-8-yl)benzo[d][1,3]dioxole Dibromohexane (5.45 g, 22.3 mmol) was added dropwise to a solution of Compound 19 (1.0 g, 3.72 mmol), NaOH (0.8 g, 22.3 mmol) and DMSO (50 ml). Reaction mixture was stirred at 40° C. for 2 hrs. Reaction was monitored with TLC. After completion of the reaction, the reaction mixture was poured in ice cold water and extracted with ethyl acetate (100 ml*3 times). Organic layer was washed with water (100 ml*3 times). The combined organic layer was dried over anhydrous sodium sulfate and concentrated under reduced pressure. The obtained crude compound was purified by column chromatography (Hexane:Ethyl acetate—95:5) to afford 5-(5-(6-bromohexyloxy)-1,2,3,4-tetrahydronaphthalen-8-yl)benzo[d][1,3]dioxole (20c) as a liquid.

Pure compound=2.1 gm. % Yield=87%.

Synthesis of Compound of Formula XXI (21a): 4-(2-(5-(benzo[d][1,3]dioxol-5-yl)-1,2,3,4-tetrahydronaphthalen-8-yloxy)ethyl) morpholine 4-(benzo[d][1,3]dioxol-5-yl)-5,6,7,8-tetrahydronaphthalen-1-ol (19) (0.5 g, 1.86 mmol) was dissolved in dry DMF (10 ml) at room temperature. Potassium carbonate (0.654 g, 4.73 mmol) and potassium iodide (0.309 g, 1.86 mmol) was added in reaction mixture. Reaction mixture was stirred at RT for 15 min. 4-(2-chloroethyl)morpholine (0.416 g, 2.23 mmol) was added in reaction mixture. Reaction mixture was heated at 100° C. for 8 hrs. Reaction was monitored with TLC. After completion of the reaction, the reaction mixture was poured in ice cold water and extracted with ethyl acetate (100 ml*3 times). Organic layer was washed with water (100 ml*3 times). The combined organic layer was dried over anhydrous sodium sulfate and concentrated under reduced pressure. The obtained crude comp. was purified by column chromatography (Methanol:Ethyl acetate—5:95) to afford 4-(2-(5-(benzo[d][1,3]dioxol-5-yl)-1,2,3,4-tetrahydronaphthalen-8-yloxy)ethyl) morpholine (21a) as liquid.

Pure compound=0.1 gm. % Yield=15%.

$^1$H-NMR (400 MHz, CDCl3): δ=7.00 (d, 1H, J=8 Hz), 6.89 (d, 1H, J=8 Hz), 6.74 (m, 3H), 5.98 (s, 2H), 4.41 (m, 2H), 4.00 (m, 4H), 3.24 (m, 2H), 3.08 (m, 3H), 2.58 (m, 5H), 1.70 (m, 4H).

Synthesis of Compound of Formula XIX (21b): 1-(4-(5-(benzo[d][1,3]dioxol-5-yl)-1,2,3,4-tetrahydronaphthalen-8-yloxy)butyl)-4-methylpiperazine 5-(5-(4-bromobutoxy)-1,2,3,4-tetrahydronaphthalen-8-yl)benzo[d][1,3]dioxole (20b) (1.0 g, 2.48 mmol) was dissolved in dry DMF (50 ml) at room temperature. Potassium carbonate (3.42 g, 24.8 mmol) was added in reaction mixture. Reaction mixture was stirred at RT for 15 min. N-methylpiperazine (2.48 g, 24.8 mmol) was added in reaction mixture. Reaction mixture was stirred at RT for 12 hrs. Reaction was monitored with TLC. After completion of the reaction, the reaction mixture was poured in ice cold water and extracted with ethyl acetate (100 ml*3 times). Organic layer was washed with water (100 ml*3 times). The combined organic layer was dried over anhydrous sodium sulfate and concentrated under reduced pressure. The obtained crude compound was purified by column chromatography (Hexane:Ethyl acetate—20:80).

Pure compound=0.4 gm. % Yield=38%.

$^1$H-NMR (400 MHz, CDCl3): δ=6.97 (d, 1H, J=8 Hz), 6.82 (d, 1H, J=8 Hz), 6.75 (m, 3H), 5.98 (s, 2H), 4.05 (m, 2H), 2.7 (m, 3H), 2.5 (m, 4H), 2.4 (m, 3H), 2.3 (m, 4H), 2.2 (m, 3H), 1.70 (m, 8H).

Synthesis of Compound of Formula XVIII (21c): N-(6-(5-(benzo[d][1,3]dioxol-5-yl)-1,2,3,4-tetrahydronaphthalen-8-yloxy)hexyl) cyclohexanamine 5-(5-(6-bromohexyloxy)-1,2,3,4-tetrahydronaphthalen-8-yl)benzo[d][1,3]dioxole (20c) (0.5 g, 1.15 mmol) was dissolved in dry DMF (30 ml) at room temperature. Potassium carbonate (1.6 g, 11.5 mmol) was added in reaction mixture. Reaction mixture was stirred at RT for 15 min. Cyclohexylamine (0.511 g, 6.27 mmol) was added in reaction mixture. Reaction mixture was stirred at RT for 12 hrs. Reaction was monitored with TLC. After completion of the reaction, the reaction mixture was poured in ice cold water and extracted with ethyl acetate (100 ml*3 times). Organic layer was washed with water (100 ml*3 times). The combined organic layer was dried over anhydrous sodium sulfate and concentrated under reduced pressure. The obtained crude compound was purified by column chromatography (Hexane:Ethyl acetate—50:50).

Pure compound=0.1 gm. % Yield=17%.

$^1$H-NMR (400 MHz, CDCl3): δ=6.95 (d, 1H, J=8 Hz), 6.83 (d, 1H, J=8 Hz), 6.75 (m, 3H), 5.98 (s, 2H), 3.96 (m, 2H), 3.4 (m, 1H), 2.7 (m, 3H), 2.5 (m, 4H), 1.70 (m, 12H), 1.50 (m, 10H).

Synthesis of Compound of Formula XX (21c$_1$): 4-(6-(5-(benzo[d][1,3]dioxol-5-yl)-1,2,3,4-tetrahydronaphthalen-8-yloxy)hexyl) morpholine 5-(5-(6-bromohexyloxy)-1,2,3,4-tetrahydronaphthalen-8-yl)benzo[d][1,3]dioxole (20c) (0.5 g, 1.15 mmol) was dissolved in dry DMF (30 ml) at room temperature. Potassium carbonate (0.16 g, 1.15 mmol) was added in reaction mixture. Reaction mixture was stirred at RT for 15 min. Morpholine (0.6 g, 6.95 mmol) was added in reaction mixture. Reaction mixture was stirred at RT for 12 hrs. Reaction was monitored with TLC. After completion of the reaction, the reaction mixture was poured in ice cold water and extracted with ethyl acetate (100 ml*3 times). Organic layer was washed with water (100 ml*3 times). The combined organic layer was dried over anhydrous sodium sulfate and concentrated under reduced pressure. The obtained crude compound was purified by column chromatography (Hexane:Ethyl acetate—30:70).

Pure compound=0.242 gm. % Yield=47%.

$^1$H-NMR (400 MHz, CDCl3): δ=6.98 (d, 1H, J=8 Hz), 6.83 (d, 1H, J=8 Hz), 6.76 (m, 3H), 5.98 (s, 2H), 3.99 (m, 2H), 3.74 (m, 4H), 2.62 (m, 2H), 2.55 (m, 2H), 2.48 (m, 4H), 2.32 (m, 2H), 1.80 (m, 2H), 1.52 (m, 6H), 1.40 (m, 2H), 1.36 (m, 2H).

Synthesis of Compound of Formula XXII (21c$_2$): 6-(5-(benzo[d][1,3]dioxol-5-yl)-1,2,3,4-tetrahydronaphthalen-8-yloxy)-N-allylhexan-1-amine 5-(5-(6-bromohexyloxy)-1,2,3,4-tetrahydronaphthalen-8-yl)benzo[d][1,3]dioxole (20c) (0.5 g, 1.15 mmol) was dissolved in dry DMF (30 ml) at room temperature. Potassium carbonate (1.6 g, 11.5 mmol) was added in reaction mixture.

Reaction mixture was stirred at RT for 15 min. Allyl amine (0.66 g, 11.5 mmol) was added in reaction mixture. Reaction mixture was stirred at RT for 12 hrs. Reaction was monitored with TLC. After completion of the reaction, the reaction mixture was poured in ice cold water and extracted with ethyl acetate (100 ml*3 times). Organic layer was washed with water (100 ml*3 times). The combined organic layer was dried over anhydrous sodium sulfate and concentrated under reduced pressure. The obtained crude compound was purified by column chromatography (Hexane:Ethyl acetate—10:90).

Pure compound=0.2 gm. % Yield=43%.

$^1$H-NMR (400 MHz, CDCl3): δ=6.98 (d, 1H, J=8 Hz), 6.83 (d, 1H, J=8 Hz), 6.76 (m, 3H), 5.98 (s, 2H), 5.97 (m, 1H), 5.22 (m, 2H), 3.99 (m, 2H), 3.42 (t, 1H), 3.25 (d, 2H), 2.72 (m, 4H), 2.62 (m, 2H), 1.98 (m, 4H), 1.74 (m, 4H), 1.66 (m, 4H).

F. Synthesis of Compound of Formula XI and XIII

Scheme 6 depicts the synthesis of compound of Formula XV represented as 33a in the below scheme.

Scheme 6

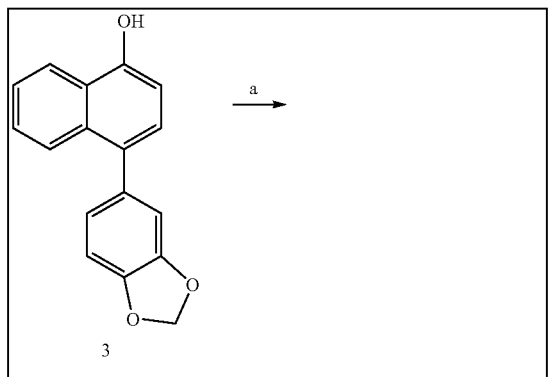

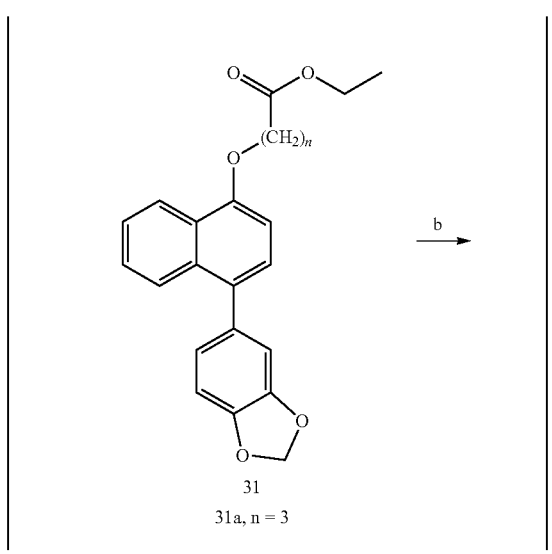

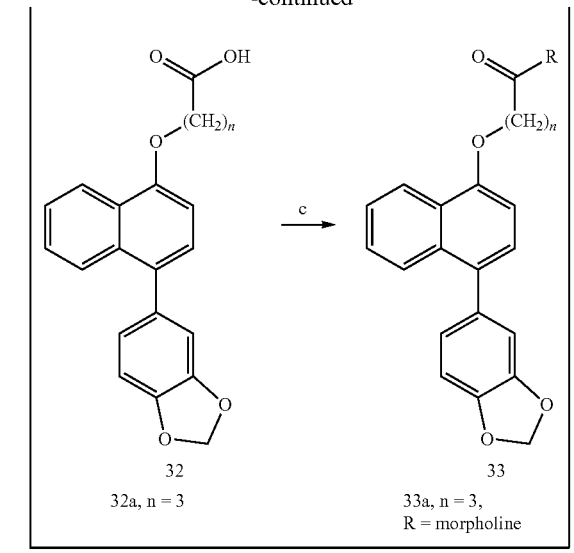

Reagents and conditions: a) Ethyl 4-bromobutanoate, K2CO3, DMF (Dimethylformamide), RT, 16 hrs; b) NaOH, THF, H₂O, Room Temperature (RT), 12 hrs; c) Morpholine, DIPEA (N,N-Diisopropylethylamine), HATU, DMF, RT, 12 hrs;

Synthesis of 31a: Ethyl 4-(1-(benzo[d][1,3]dioxol-5-yl)naphthalen-4-yloxy)butanoate 4-(benzo[d][1,3]dioxol-5-yl)naphthalen-1-ol (3) (4.1 gm, 15.5 mmol) was dissolved in dry DMF (150 ml) at room temperature. Potassium carbonate (4.29 gm, 31.1 mmol) was added in reaction mixture. Reaction mixture was stirred at RT for 15 min. Ethyl 4-bromobutanoate (6.06 gm, 31.06 mmol) was added in reaction mixture. Reaction mixture was stirred at RT for 16 hrs. Reaction was monitored with TLC. After completion of the reaction, the reaction mixture was poured in ice cold water and extracted with ethyl acetate (150 ml*3 times). Organic layer was washed with water (100 ml*3 times). The combined organic layer was dried over anhydrous sodium sulfate and concentrated under reduced pressure. The obtained crude compound was purified by column chromatography (Hexane:Ethyl acetate—95:5) to afford Ethyl 4-(1-(benzo[d][1,3]dioxol-5-yl)naphthalen-4-yloxy)butanoate (31a) as off white solid.

Pure compound=5.49 gm. % Yield=93%.

Synthesis of 32a: 4-(1-(benzo[d][1,3]dioxol-5-yl)naphthalen-4-yloxy)butanoic acid Ethyl 4-(1-(benzo[d][1,3]dioxol-5-yl)naphthalen-4-yloxy)butanoate (31a) (5.0 gm, 13.2 mmol) was dissolved in THF (100 ml) and water (100 ml) at RT. Sodium hydroxide (1.06 gm, 26.45 mmol) was added in reaction mixture at RT. Reaction mixture was stirred at RT for 12 hrs. Reaction was monitored with TLC. After completion, the reaction mixture was poured in ice cold water and acidify with dil. HCl. Reaction mixture was extract with ethyl acetate (150 ml*3 times). Organic layer was washed with water (100 ml*1 times). The combined organic layer was dried over anhydrous sodium sulfate and concentrated under reduced pressure. The obtained crude compound was purified by column chromatography (Hexane:Ethyl acetate—50:50) to afford 4-(1-(benzo[d][1,3]dioxol-5-yl)naphthalen-4-yloxy)butanoic acid (32a) as off white solid.
Pure compound=4.4 gm. % Yield=95%.

Synthesis of Compound of Formula XV (33a):
4-(1-(benzo[d][1,3]dioxol-5-yl)naphthalen-4-yloxy)-1-morpholinobutan-1-one 4-(1-(benzo[d][1,3]dioxol-5-yl)naphthalen-4-yloxy)butanoic acid (32a) (0.3 gm, 0.85 mmol) was dissolved in DIPEA (0.332 gm, 2.57 mmol) and DMF (20 ml). Morpholine (0.089 gm, 1.02 mmol) and HATU (0.448 gm, 1.28 mmol) was added in reaction mixture at RT. Reaction mixture was stirred at RT for 12 hrs. Reaction was monitored with TLC. After completion, the reaction mixture was poured in water and extracted with ethyl acetate (100 ml*3 times). Organic layer was washed with water (100 ml*3 times). The combined organic layer was dried over anhydrous sodium sulfate and concentrated under reduced pressure. The obtained crude compound was purified by column chromatography (Hexane:Ethyl acetate—30:70) to afford 4-(1-(benzo[d][1,3]dioxol-5-yl)naphthalen-4-yloxy)-1-morpholinobutan-1-one (33a) as off white solid.
Pure compound=0.330 gm. % Yield=92%.

$^1$H-NMR (400 MHz, CDCl3): δ=8.31 (d, 1H, J=8 Hz), 7.88 (d, 1H, J=8 Hz), 7.48 (m, 2H), 7.29 (m, 1H), 6.94 (m, 3H), 6.84 (m, 1H), 6.03 (s, 2H), 4.27 (t, 2H, J=8 Hz), 3.78 (m, 5H), 2.68 (m, 2H), 2.31 (m, 2H), 1.98 (m, 3H).

G. Synthesis of Compound of Formula XVII and XVI

Scheme 7 depicts the synthesis of compound of Formula XVII and XVI represented as 40b and 40c respectively in the below scheme.

Scheme 7

40b, n = 4, R = cyclohexyl amine
40c, n = 6, R = morpholine 39b, n = 4,
39c, n = 6

Reagents and conditions: a) Benzyl bromide, K$_2$CO$_3$, DMF (Dimethylformamide), RT, 16 hrs; b) NBS, DCM, 0° C., 1 hr; c) Tetrakis palladium (0), Na$_2$CO$_3$, H$_2$O, DME (Dimethoxyethane), reflux, 12 hrs; d) Ethylene Glycol, Conc. HCl, 100° C., 8 hrs; e) Dibromo butane or dibromohexane, NaOH, TBAB, Water, 50° C., 4 hrs; f) cyclohexylamine or morpholine, Na$_2$CO$_3$, DMF, RT, 12 hrs Synthesis of 35: 8-(benzyloxy)quinoline Three necked RBF (500 mL) equipped with dropping funnel, magnetic stirrer, and guard tube was charged with 8-Hydroxyquinolin (34), 5 g, 0.0344 mol), potassium carbonate (9.5 gm, 0.0688 mol) and DMF (100 mL). To this solution was added benzyl bromide (6.13 mL, 0.0516 mol) dropwise with constant stirring over half an hour and stirring was further continued for 12 h at room temperature. During this time all the starting materials was consumed as confirmed by TLC (3:9, EtOAc:Hexane). Reaction mixture was added in cold water (250 mL). The reaction mixture was extracted with ethyl acetate (3×100 mL). All the organic layer was combined and washed with water (3×100 mL). Organic layer was dried over anhydrous sodium sulphate and concentrated under reduced pressure. The crude mass was purified by column chromatography over silica gel using ethyl acetate (5-10%) in hexane as eluent to afford 8-(benzyloxy)quinoline (35) as off white solid (Yield=5.2 gm).

Synthesis of 36: 8-(benzyloxy)-5-bromoquinoline

Single necked RBF (250 mL) equipped with magnetic stirrer, and guard tube was charged with 8-benzyloxyquinolin (35, 4 g, 0.016 mol) in DCM (100 mL). To this solution was added N-Bromosuccinimide (3.02 gm, 0.016 mol) portion wise with constant stirring over half an hour at 10° C. and stirring was further continued for 1 h at room temperature. During this time all the starting materials was consumed as confirmed by TLC (2:8, EtOAc:Hexane). Reaction mixture was added in cold water (150 mL). The reaction mixture was extracted with dichloromethane (3×100 mL). Organic layer was dried over anhydrous sodium sulphate and concentrated under reduced pressure. The crude mass was purified by column chromatography over silica gel using ethyl acetate (5-10%) in hexane as eluent to afford 8-(benzyloxy)-5-bromoquinoline (36) as off white solid (Yield=3.9 gm).

Synthesis of 37: 5-(benzo[d][1,3]dioxol-5-yl)-8-(benzyloxy)quinoline

Single necked RBF (250 mL) equipped with magnetic stirrer, condenser and guard tube was charged with 8-(benzyloxy)-5-bromoquinoline (36, 1 g, 0.00318 mol) and 3, 4 (methylenedioxy) phenylboronic acid (0.79 gm, 0.00477 mol) in DME (20 mL). To this solution was added sodium carbonate (0.673 gm, 0.00636 mol) dissolved in water (3.2 mL). Reaction mixture was stirred at rt for 10 minutes and then added tetrakis palladium (0) (0.183 gm, 0.000159 mol). Reaction mixture was refluxed for 12 hrs. During this time all the starting materials was consumed as confirmed by TLC (3:7, EtOAc:Hexane). Reaction mixture was added in water (100 mL). The reaction mixture was extracted with ethyl acetate (3×100 mL). Organic layer was dried over anhydrous sodium sulphate and concentrated under reduced pressure. The crude mass was purified by column chromatography over silica gel using ethyl acetate (10-20%) in hexane as eluent to afford 37 as off white solid (Yield=0.94 gm).

Synthesis of 38: 5-(benzo[d][1,3]dioxol-5-yl)quinolin-8-ol

Single necked RBF (250 mL) equipped with magnetic stirrer, condenser and guard tube was charged with 5-(benzo[d][1,3]dioxol-5-yl)-8-(benzyloxy)quinoline (37, 3 g, 0.00845 mol) and ethylene glycol (55 mL). To this solution was added conc. HCl (55 ml) at RT. Reaction mixture was refluxed for 12 hrs. During this time all the starting materials was consumed as confirmed by TLC (3:7, EtOAc:Hexane). Reaction mixture was added in ice cold water (200 mL). The reaction mixture was neutralized with sodium bicarbonate and extracted with ethyl acetate (3×100 mL). Organic layer was dried over anhydrous sodium sulphate and concentrated under reduced pressure. The crude mass was purified by column chromatography over silica gel using ethyl acetate (20-50%) in hexane as eluent to afford 5-(benzo[d][1,3]dioxol-5-yl)quinolin-8-ol (38) as off white solid (Yield=1.21 gm).

Synthesis of 39b: 8-(4-bromobutoxy)-5-(benzo[d][1,3]dioxol-5-yl)quinoline

Dibromobutane (12.22 gm, 56.6 mmol) was added dropwise to a solution of Compound 38 (1.5 g, 5.66 mmol), NaOH (1.358 g, 33.9 mmol) and DMSO (60 ml). Reaction mixture was stirred at 45° C. for 5 hrs. Reaction was monitored with TLC. After completion of the reaction, the reaction mixture was poured in ice cold water and extracted with ethyl acetate (100 ml*3 times). Organic layer was washed with water (100 ml*3 times). The combined organic layer was dried over anhydrous sodium sulfate and concentrated under reduced pressure. The obtained crude compound was purified by column chromatography (Hexane:Ethyl acetate—50:50) to afford 8-(4-bromobutoxy)-5-(benzo[d][1,3]dioxol-5-yl)quinoline (39b) as off white solid.
Pure compound=1.34 gm. % Yield=59%.

Synthesis of 39c: 8-(6-bromohexyloxy)-5-(benzo[d][1,3]dioxol-5-yl)quinoline

Dibromohexane (1.0 g, 3.76 mmol) was added dropwise to a solution of Compound 38 (5.5 g, 22.6 mmol), NaOH (0.308 g, 7.58 mmol), TBAB (0.121 g, 3.76 mmol) and water (100 ml). Reaction mixture was stirred at 40° C. for 5 hrs. Reaction was monitored with TLC. After completion of the reaction, the reaction mixture was poured in ice cold water and extracted with ethyl acetate (100 ml*3 times). Organic layer was washed with water (100 ml). The combined organic layer was dried over anhydrous sodium sulfate and concentrated under reduced pressure. The obtained crude compound was purified by column chromatography (Hexane:Ethyl acetate—50:50) to afford 8-(6-bromohexyloxy)-5-(benzo[d][1,3]dioxol-5-yl)quinoline (39c) as a sticky oil.
Pure comp.=0.475 gm. % Yield=30%.

Synthesis of Compound of Formula XVII (40b): N-(4-(5-(benzo[d][1,3]dioxol-5-yl)quinolin-8-yloxy)butyl)cyclohexanamine 8-(4-bromobutoxy)-5-(benzo[d][1,3]dioxol-5-yl)quinolone (39b) (0.4 g, 1.0 mmol) was dissolved in dry DMF (20 ml) at room temperature. Potassium carbonate (1.38 g, 10 mmol) was added in reaction mixture. Reaction mixture was stirred at RT for 15 min. Cyclohexylamine (0.991 g, 10 mmol) was added in reaction mixture. Reaction mixture was stirred at RT for 16 hrs. Reaction was monitored with TLC. After completion of the reaction, the reaction mixture was poured in ice cold water and extract with ethyl acetate (100 ml*3 times). Organic layer was washed with water (100 ml*3 times). The combined organic layer was dried over anhydrous sodium sulfate and concentrated under reduced pressure. The obtained crude compound was purified by column chromatography (Methanol:Ethyl acetate—5:95) to afford N-(4-(5-(benzo[d][1,3]dioxol-5-yl)quinolin-8-yloxy)butyl)cyclohexanamine (40b) as off white solid.

Pure compound=0.1 gm. % Yield=29%.

$^1$H-NMR (400 MHz, CDCl3): δ=8.95 (d, 1H, J=4 Hz), 8.25 (d, 1H, J=8 Hz), 7.39 (m, 2H), 7.08 (d, 1H, J=8 Hz), 6.91 (m, 3H), 6.04 (s, 2H), 4.29 (t, 2H, J=8 Hz), 3.52 (m, 1H), 3.22 (m, 2H), 3.14 (m, 1H), 2.24 (m, 6H), 1.86 (m, 2H), 1.68 (m, 3H). 1.32 (m, 3H).

Synthesis of Compound of Formula XVI (40c):
8-(6-morpholinohexyloxy)-5-(benzo[d][1,3]dioxol-5-yl)quinoline 8-(6-bromohexyloxy)-5-(benzo[d][1,3]dioxol-5-yl)quinoline (39c) (0.45 gm, 1.05 mmol) was dissolved in dry DMF (30 ml) at room temperature. Potassium carbonate (1.5 g, 10.5 mmol) was added in reaction mixture. Reaction mixture was stirred at RT for 15 min. Morpholine (0.91 g, 10.5 mmol) was added in reaction mixture. Reaction mixture was stirred at RT for 16 hrs. Reaction was monitored with TLC. After completion of the reaction, the reaction mixture was poured in ice cold water and extracted with ethyl acetate (100 ml*3 times). Organic layer was washed with water (100 ml*3 times). The combined organic layer was dried over anhydrous sodium sulfate and concentrated under reduced pressure. The obtained crude comp. was purified by column chromatography (Methanol:Ethyl acetate—5:95) to afford 8-(6-morpholinohexyloxy)-5-(benzo[d][1,3]dioxol-5-yl)quinoline (40c) as off white solid.

Pure comp.=0.157 gm. % Yield=36%.

$^1$H-NMR (400 MHz, CDCl3): δ=8.95 (d, 1H, J=4 Hz), 8.25 (d, 1H, J=8 Hz), 7.39 (m, 2H), 7.08 (d, 1H, J=8 Hz), 6.91 (m, 3H), 6.04 (s, 2H), 4.29 (t, 2H, J=8 Hz), 3.75 (m, 4H), 2.54 (m, 4H), 2.36 (m, 2H), 1.98 (m, 2H). 1.62 (m, 6H).

Test Data

The following tests were conducted to determine the efficiency and non-toxicity of the compounds.

Cancer Cell Assays

1. In Vitro Antiproliferative Assay (MTT Assay)

MTT assay is a simple and sensitive assay where, metabolic reducing activity of the cells is measured. The increase of this activity in time is taken as a parameter of cell growth. If treatment with a drug impairs this increase, the action is a consequence of growth inhibition, cell killing or both. The compounds of the present invention and standard cytotoxic drug (e.g. Cisplatin) were tested at different concentrations (1, 0.1, 0.01, 0.001 mM) using breast, prostate and oral cancer cell lines. All cell lines were cultured in a 37° C. incubator with a 5% $CO_2$ environment. Compounds were dissolved in DMSO with a concentration of 0.1M (stock solution). Cells were seeded into 96-well plates at suitable plating efficiency.

Following plating efficiencies were standardized for MTT assay:

TABLE 1

| Cell lines | Name of the cell line | Plating efficiency (No. of cells/well or per 200 μl) |
|---|---|---|
| Breast | MDAMB231 | 10000 |
| Prostate | PC3 | 10000 |
|  | DU145 | 5000 |

In the MTT procedure, the cells were plated in 96 well plates as per predetermined plating efficiency (Table1). The plates were then incubated for 24 hrs in 5% $CO_2$ atmosphere at 37° C. Appropriate concentrations of the drugs were then added to the plate and further incubation was carried out for 48 hrs (in 5% $CO_2$ atmosphere at 37° C.). The assay plate was then centrifuged twice at 3000 rpm for 3 mins and supernatant was then discarded. 100 ul of MTT solution (0.5 mg/ml) was then added to each well of the plate and it was further incubated for 4 hrs (in 5% $CO_2$ atmosphere at 37° C.) Following 4 hr incubation, the plate was then centrifuged twice, and supernatant was aspirated off very carefully. 200 ul of DMSO was then added to each well to solubilize. MTT crystals and mixed well by shaking the plate. XY graph of log percent viability was then plotted against log drug concentration. IC50 (Drug concentration inhibiting the 50% of cell population) was then calculated by regression analysis.

Results of MTT Assay of the Compounds on Breast Cancer (MDAMB231 Cell Line) and Prostate Cancer (PC3 and DU145 Cell Line).

TABLE 2

|  | IC50 in micromolar | | |
|---|---|---|---|
| Compounds | MDAMB231 | PC3 | DU145 |
| Cisplatin | 29.44 | 24.04 | 29.78 |
| Formula III | 6.68 | 2.36 | 5.41 |
| Formula IV | 3.86 | 3.79 | 3.16 |
| Formula V | 9.25 | 6.03 | 9.77 |
| Formula VI | 10.86 | — | 4.05 |
| Formula VII | 3.27 | 2.75 | 2.34 |
| Formula VIII | 1.15 | 1.77 | 0.723 |
| Formula IX | 10.89 | — | 10.7 |
| Formula X | 5.36 | 4.0 | 5.96 |
| Formula XI | 3.2 | 12.6 | 8.18 |
| Formula XII | 2.7 | 3.98 | 2.59 |
| Formula XIII | 7.29 | 8.83 | 8.85 |
| Formula XIV | 0.308 | 0.346 | 0.532 |
| Formula XV | 4.95 | 7.82 | 2.51 |
| Formula XVI | 3.8 | 5.52 | 3.52 |
| Formula XVII | 2.13 | 2.82 | 1.99 |
| Formula XVIII | 0.398 | 0.32 | 0.348 |
| Formula XIX | 2.14 | 3.71 | 2.04 |
| Formula XX | 3.04 | 3.34 | 3.87 |
| Formula XXI | 4.2 | 3.86 | 4.26 |
| Formula XXII | 1.35 | 2.45 | 1.48 |

The above results indicate that the activity of compounds of Formula III to XXII on breast and prostate cancer cell lines is higher compared to standard chemotherapeutic drug cisplatin.

Figure 5:
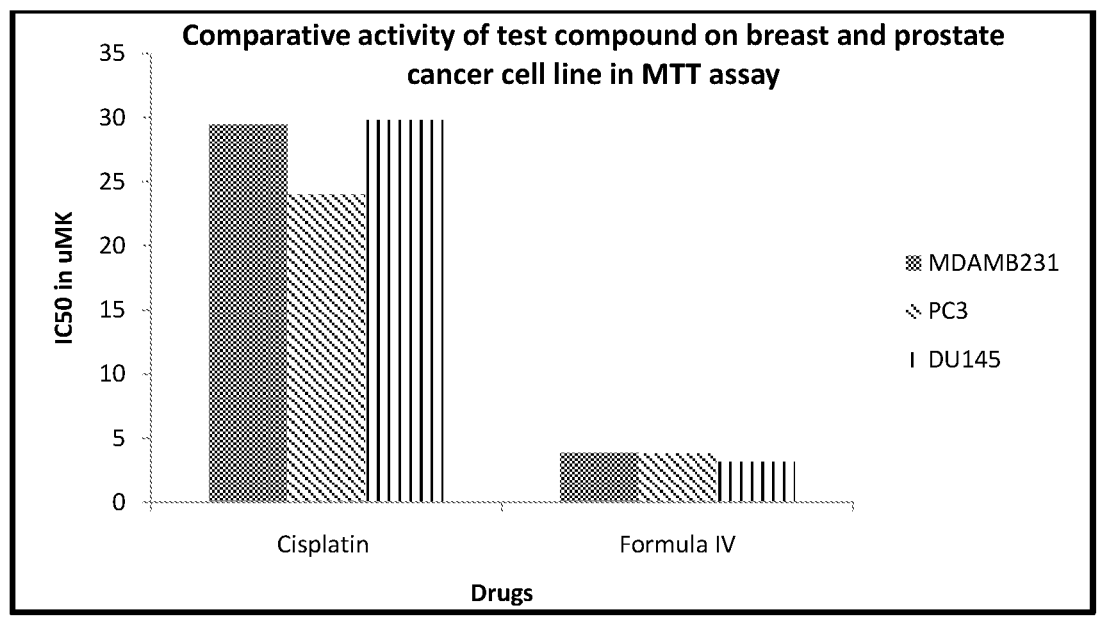
FIG. 5 illustrates the activity of compound of Formula IV compared to cisplatin on breast cancer (MDAMB231) and prostate cancer (PC3 and DU145) cell lines in MTT assay.
Figure 9:
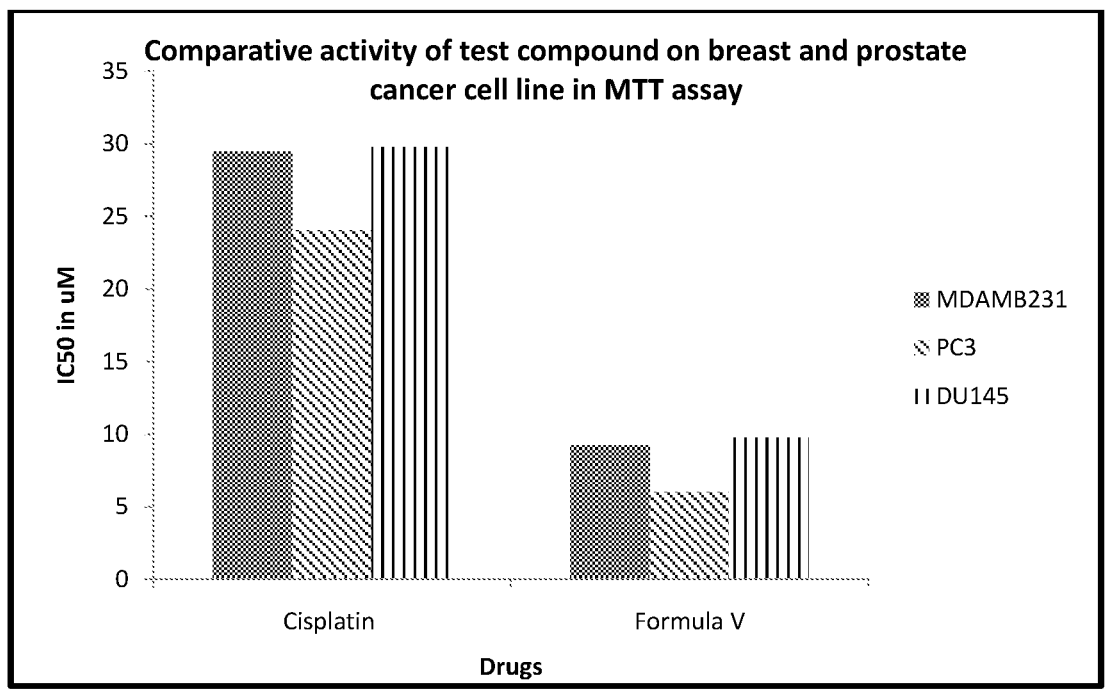
FIG. 9 illustrates the activity of compound of Formula V compared to cisplatin on breast cancer (MDAMB231) and prostate cancer (PC3 and DU145) cell lines in MTT assay.
Figure 13:
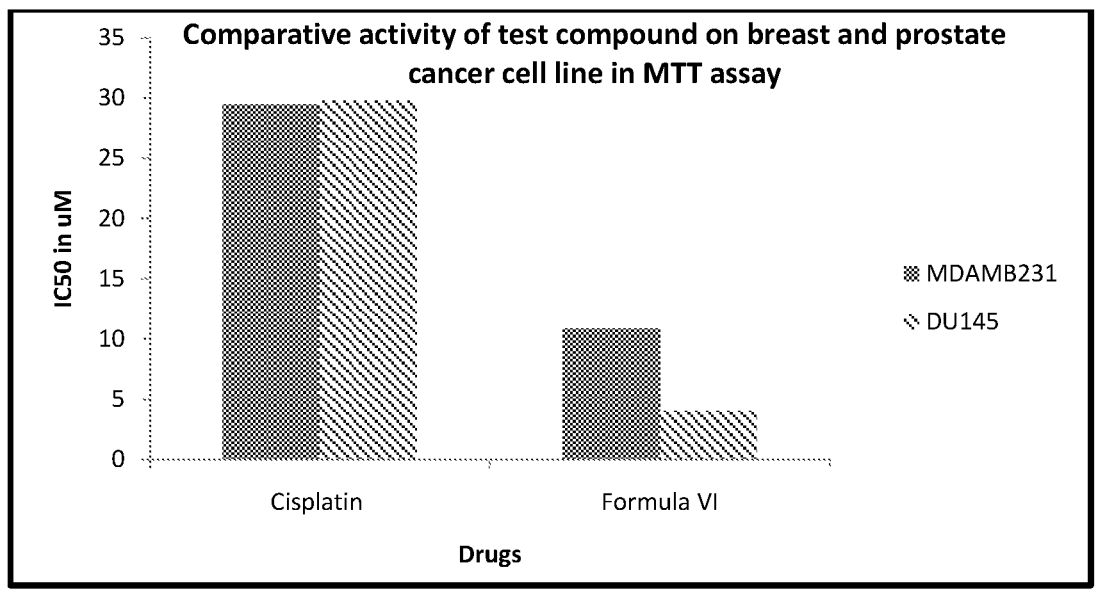
FIG. 13 illustrates the activity of compound of Formula VI compared to cisplatin on breast cancer (MDAMB231) and prostate cancer (PC3 and DU145) cell lines in MTT assay.
Figure 16:
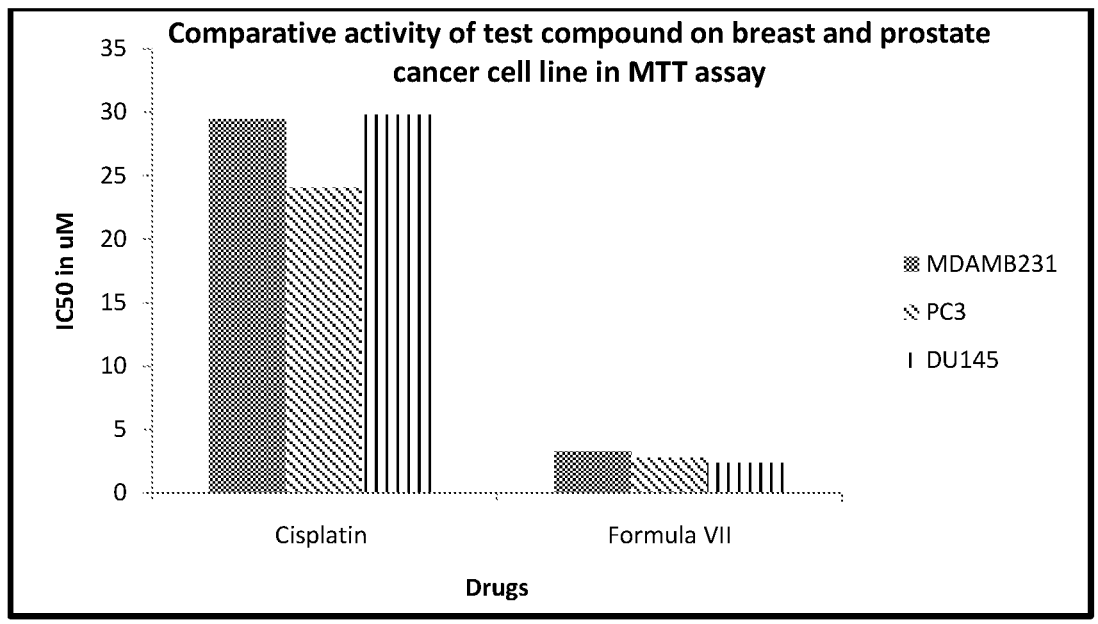
FIG. 16 illustrates the activity of compound of Formula VII compared to cisplatin on breast cancer (MDAMB231) and prostate cancer (PC3 and DU145) cell lines in MTT assay.
Figure 20:
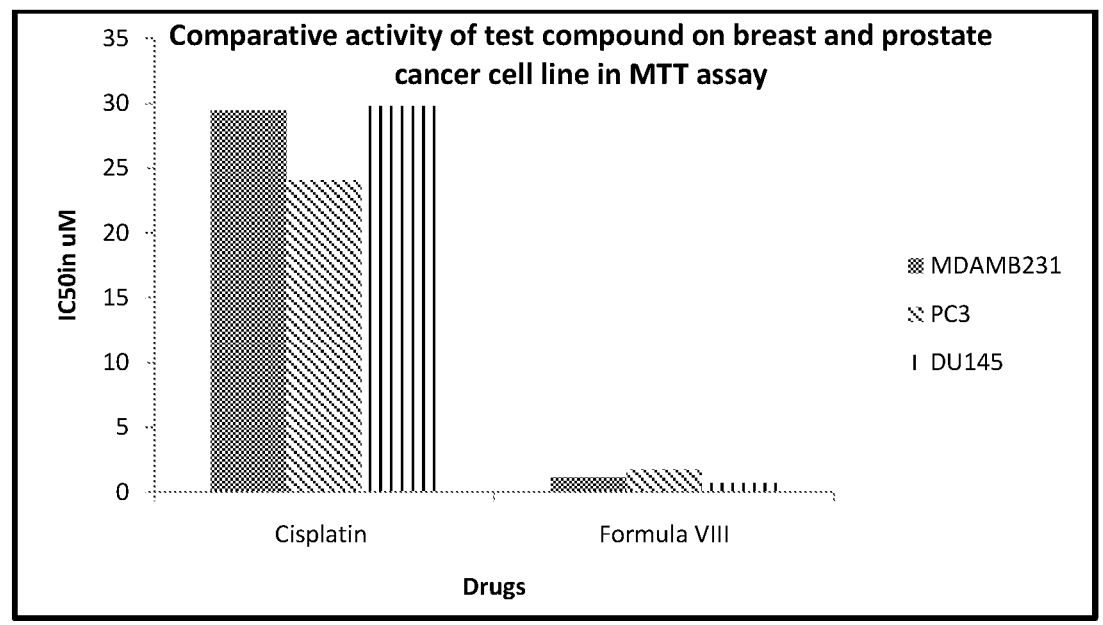
FIG. 20 illustrates the activity of compound of Formula VIII compared to cisplatin on breast cancer (MDAMB231) and prostate cancer (PC3 and DU145) cell lines in MTT assay.
Figure 24:
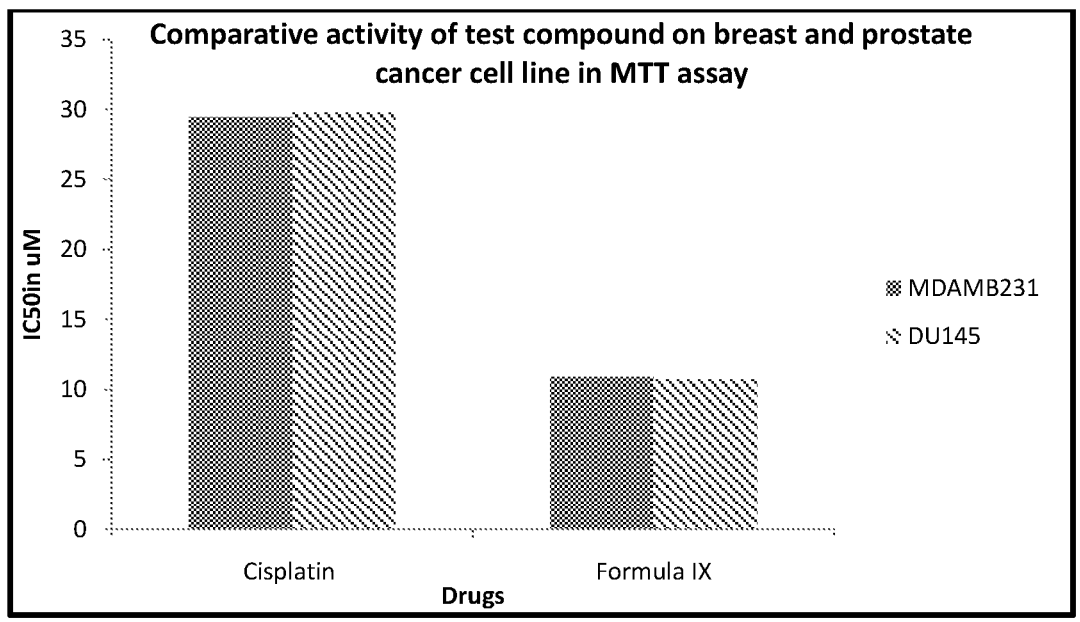
FIG. 24 illustrates the activity of compound of Formula IX compared to cisplatin on breast cancer (MDAMB231) and prostate cancer (PC3 and DU145) cell lines in MTT assay.
Figure 26:
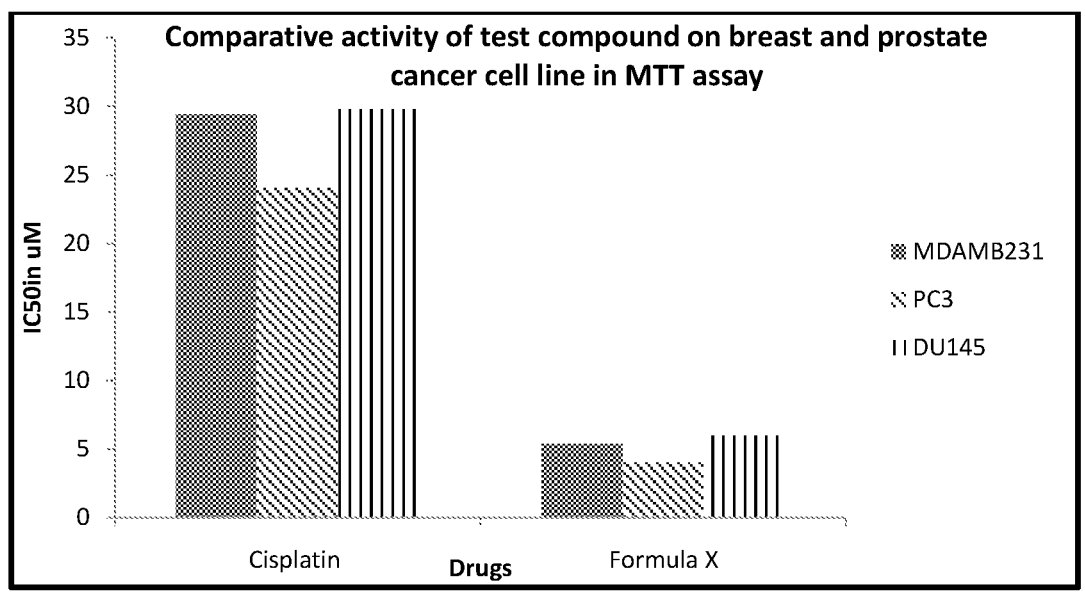
FIG. 26 illustrates the activity of compound of Formula X compared to cisplatin on breast cancer (MDAMB231) and prostate cancer (PC3 and DU145) cell lines in MTT assay.
Figure 30:
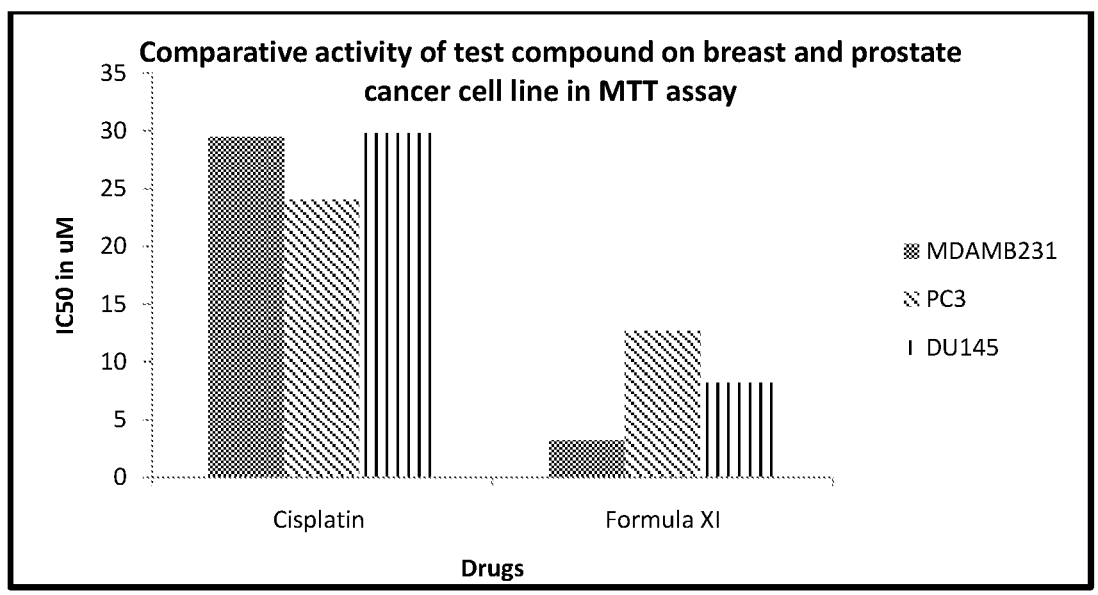
FIG. 30 illustrates the activity of compound of Formula XI compared to cisplatin on breast cancer (MDAMB231) and prostate cancer (PC3 and DU145) cell lines in MTT assay.
Figure 34:
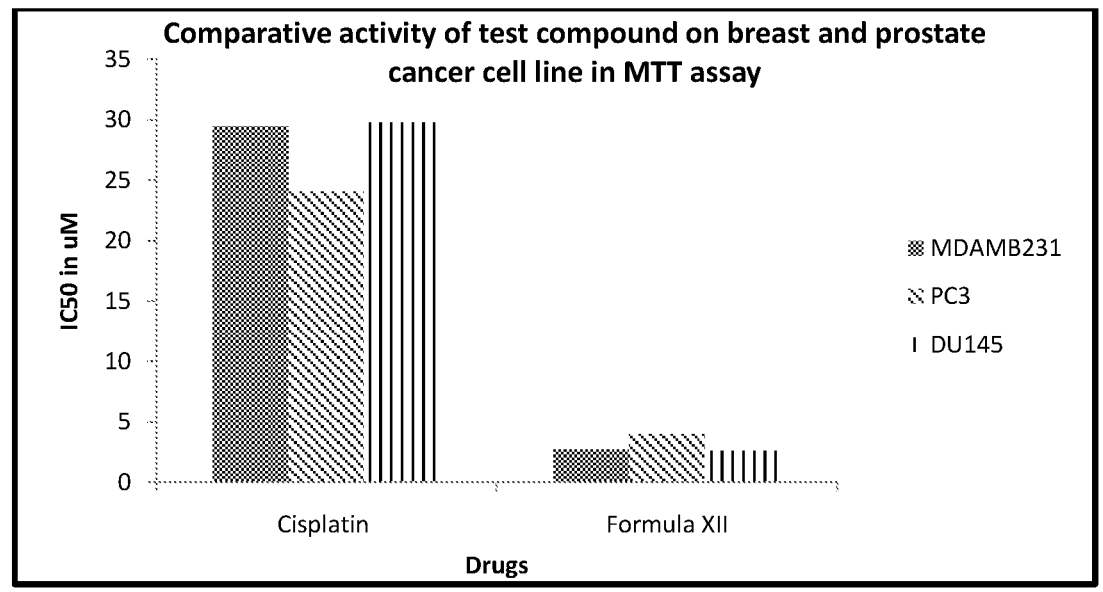
FIG. 34 illustrates the activity of compound of Formula XII compared to cisplatin on breast cancer (MDAMB231) and prostate cancer (PC3 and DU145) cell lines in MTT assay.
Figure 38:
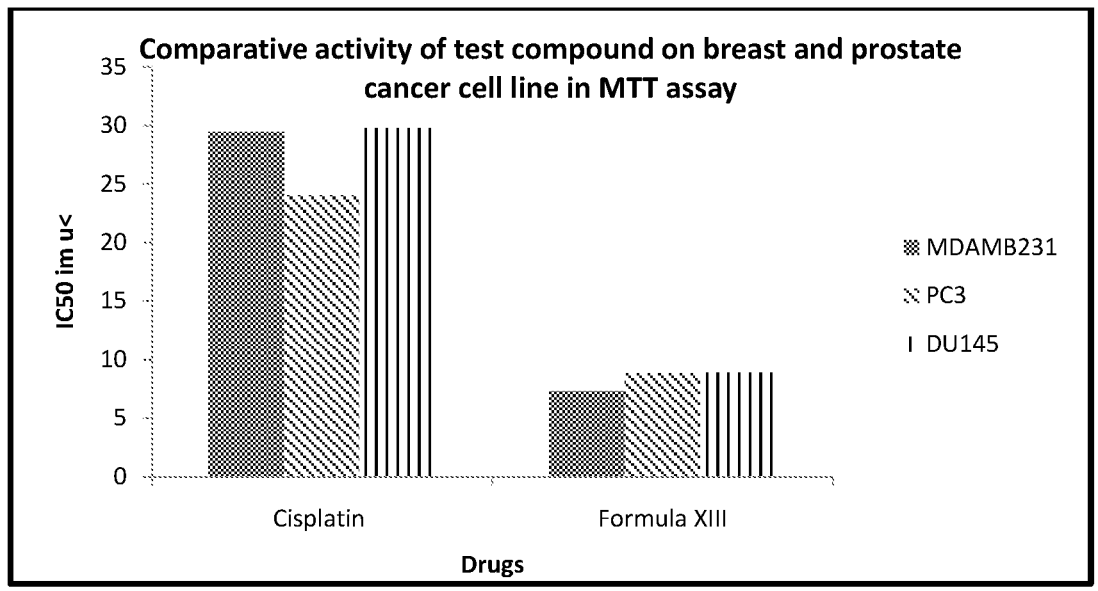
FIG. 38 illustrates the activity of compound of Formula XIII compared to cisplatin on breast cancer (MDAMB231) and prostate cancer (PC3 and DU145) cell lines in MTT assay.
Figure 42:
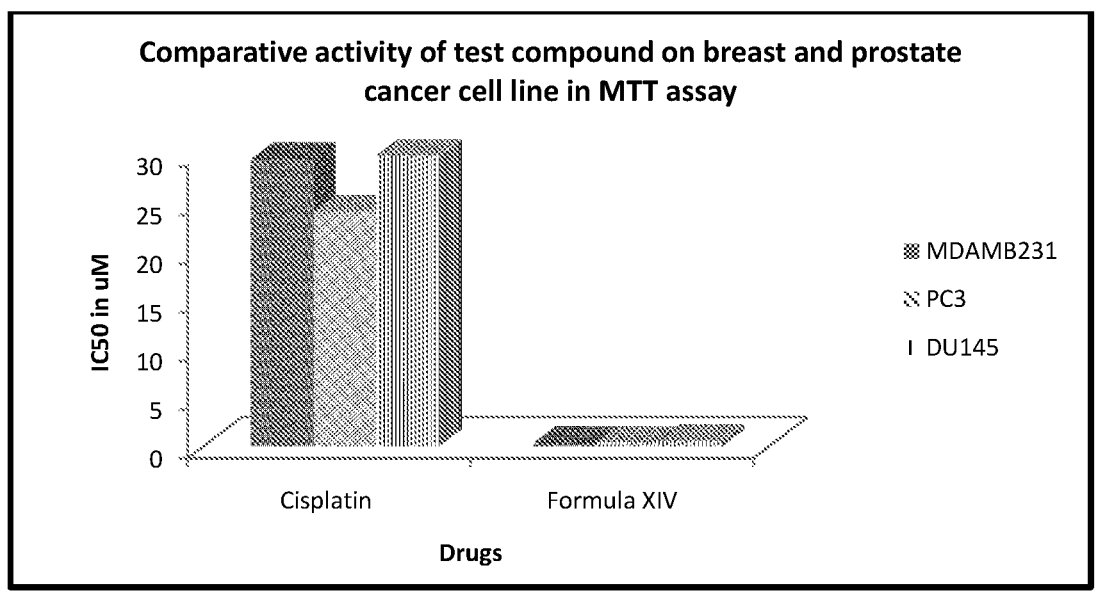
FIG. 42 illustrates the activity of compound of Formula XIV compared to cisplatin on breast cancer (MDAMB231) and prostate cancer (PC3 and DU145) cell lines in MTT assay.
Figure 46:
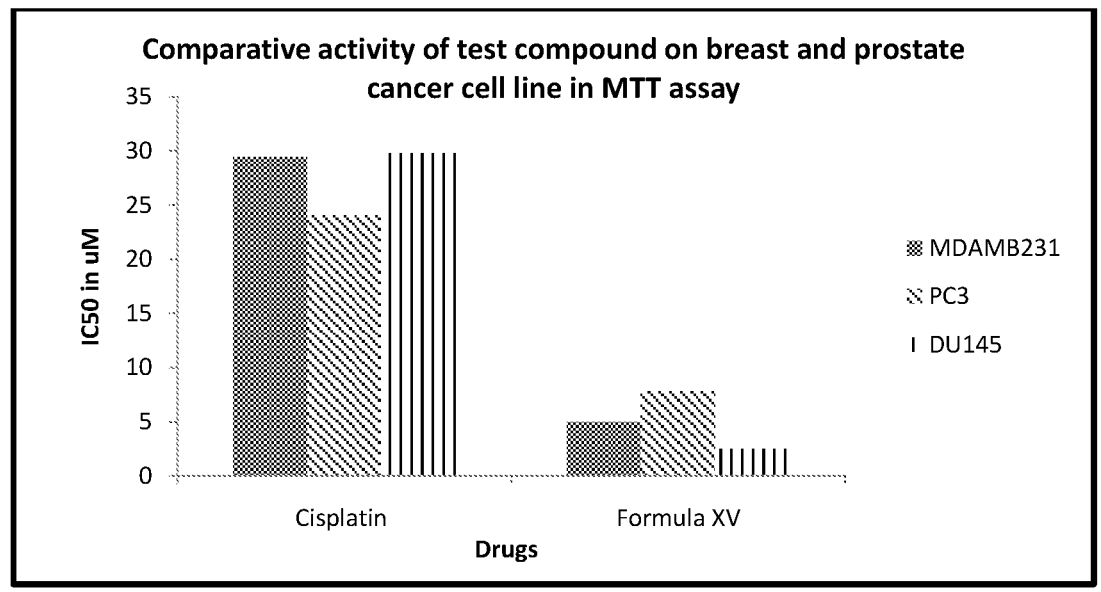
FIG. 46 illustrates the activity of compound of Formula XV compared to cisplatin on breast cancer (MDAMB231) and prostate cancer (PC3 and DU145) cell lines in MTT assay.
Figure 49:
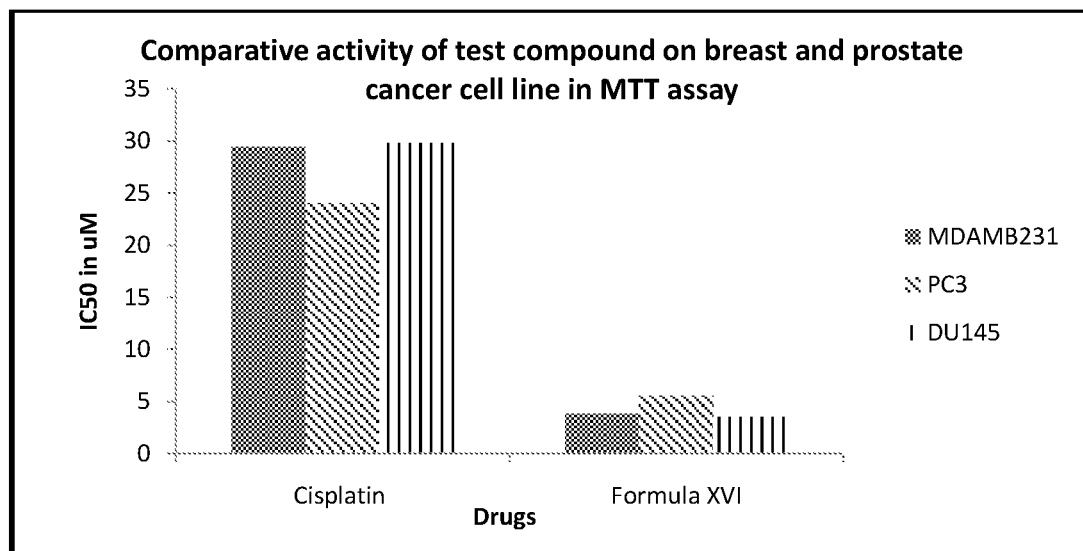
FIG. 49 illustrates the activity of compound of Formula XVI compared to cisplatin on breast cancer (MDAMB231) and prostate cancer (PC3 and DU145) cell lines in MTT assay.
Figure 52:
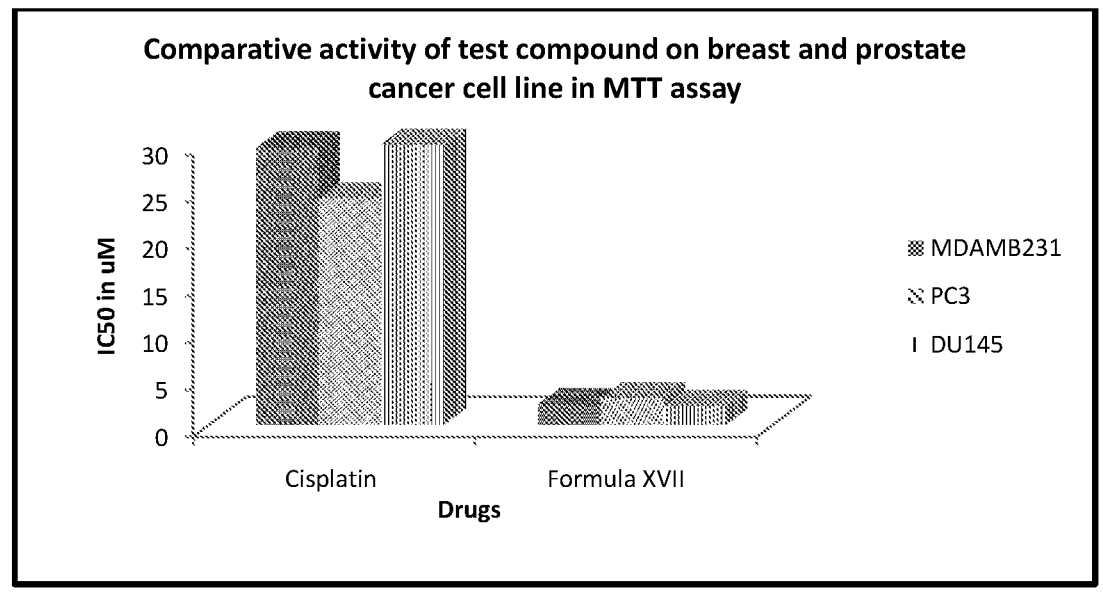
FIG. 52 illustrates the activity of compound of Formula XVII compared to cisplatin on breast cancer (MDAMB231) and prostate cancer (PC3 and DU145) cell lines in MTT assay.
Figure 53:
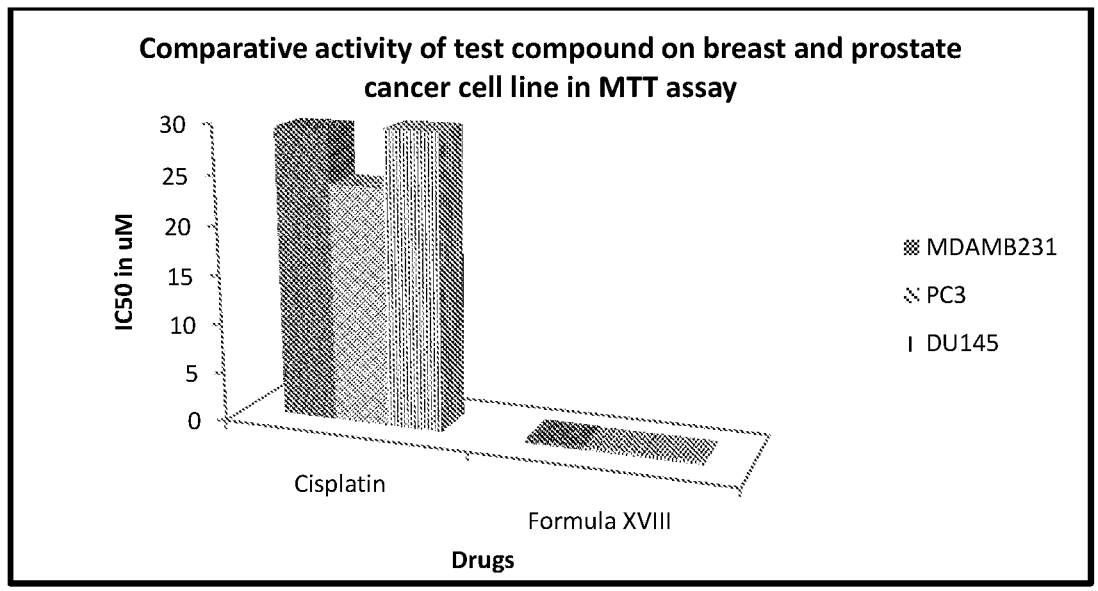
FIG. 53 illustrates the activity of compound of Formula XVIII compared to cisplatin on breast cancer (MDAMB231) and prostate cancer (PC3 and DU145) cell lines in MTT assay.
Figure 57:
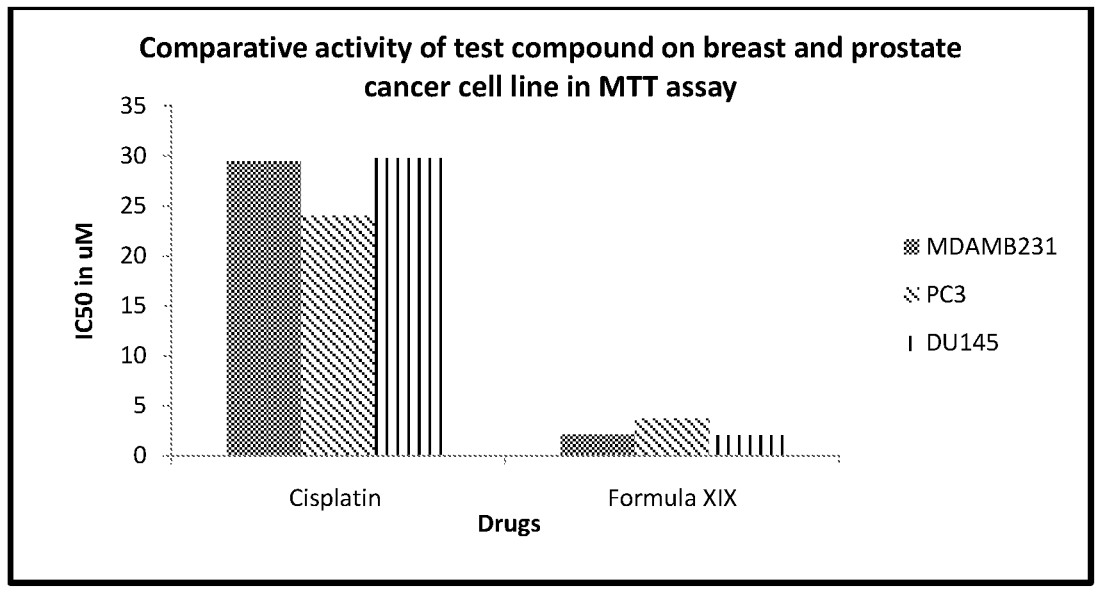
FIG. 57 illustrates the activity of compound of Formula XIX compared to cisplatin on breast cancer (MDAMB231) and prostate cancer (PC3 and DU145) cell lines in MTT assay.
Figure 61:
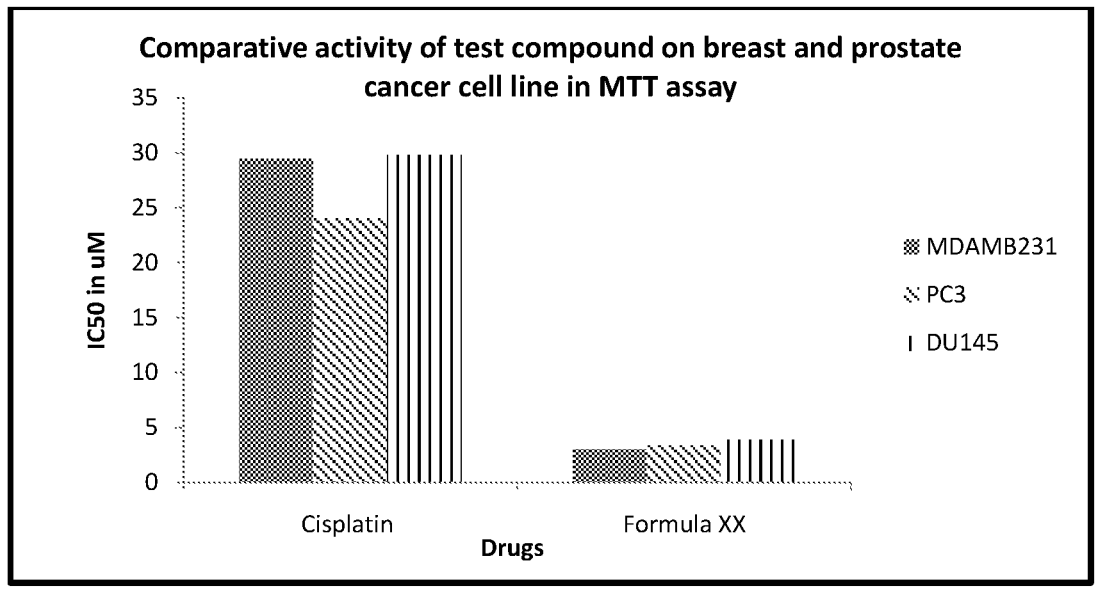
FIG. 61 illustrates the activity of compound of Formula XX compared to cisplatin on breast cancer (MDAMB231) and prostate cancer (PC3 and DU145) cell lines in MTT assay.
Figure 65:
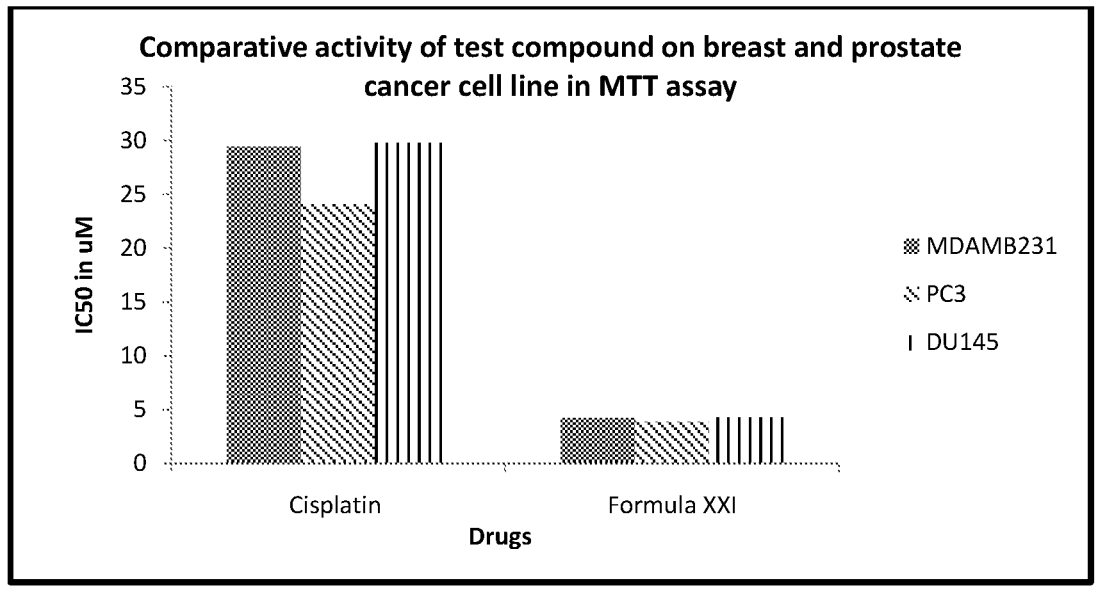
FIG. 65 illustrates the activity of compound of Formula XXI compared to cisplatin on breast cancer (MDAMB231) and prostate cancer (PC3 and DU145) cell lines in MTT assay.
Figure 68:
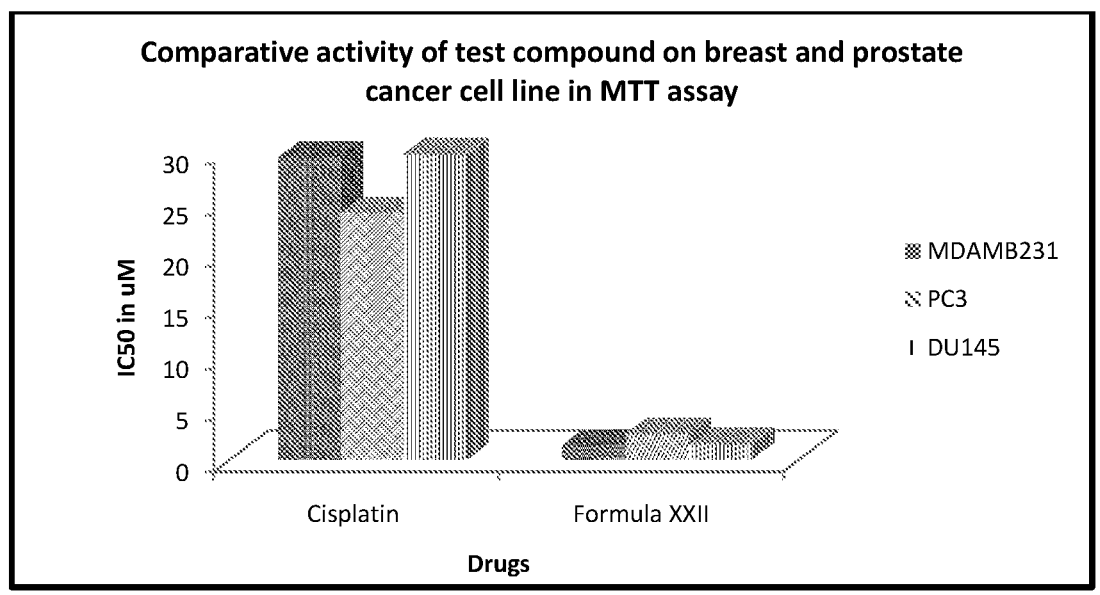
FIG. 68 illustrates the activity of compound of Formula XXII compared to cisplatin on breast cancer (MDAMB231) and prostate cancer (PC3 and DU145) cell lines in MTT assay.

FIG. 1, FIG. 5, FIG. 9, FIG. 13, FIG. 16, FIG. 20, FIG. 24, FIG. 26, FIG. 30, FIG. 34, FIG. 38, FIG. 42, FIG. 46, FIG. 49, FIG. 52, FIG. 53, FIG. 57, FIG. 61, FIG. 65 and FIG. 68 indicate the activity of the compounds of Formula III to XXII respectively on breast and prostate cancer cell lines in comparison with cisplatin. It was found that compounds of Formula III to XXII exhibit higher anticancer activity in comparison with cisplatin.

2. Soft Agar Assay

The Soft Agar Colony-formation Assay is an anchorage-independent growth assay in soft agar, which is one of the most stringent assays for detecting malignant transformation of cells. For this assay, malignant cells are cultured with appropriate controls in soft agar medium for 1-2 weeks. Following this incubation period, formed colonies can either be analyzed morphologically using cell stain and quantifying the number of colonies formed. The results of the assay are comparable to those obtained after injecting tumorigenic cells into nude mice and is regarded as the "gold standard"

for testing the tumorigenicity of cells in vitro (one of the important features of cancer stem cells, (CSCs).

Briefly, for Soft Agar Assay a mixture of 50 ul of 2× medium (taken appropriately as per cell line) and 50 ul of 1.2% Bacto Agar were plated on to each well of 96 well micro titer assay plate. 10 ul of cells (of specific plating efficiency pre standardized for respective cell line) were mixed with 20 ul of 2× medium and 30 ul of 0.8% of Bacto Agar and 1.6 ul of drug (of appropriate concentration) in a vial and transferred to the solidified pre layers of the assay plates. The cells were then allowed to grow and form colonies at 37° C. and 5% C02 for 1 week. An intermittent feeding with 50 ul of appropriate 2× medium was performed after 3 days of experimental set up. 16 ul of Alamar Blue (1.5 mg/ml) was then added to all the wells to quantify the developed colonies. The plates were incubated for 24 hrs at 37° C. Absorbance was then measured at 630 nm. XY graph of log Percent viability was then plotted against log drug concentration. IC50 (Drug concentration inhibiting the 50% of cell population) was then calculated by regression analysis.

Following plating efficiencies were standardized for Soft Agar Assay:

TABLE 3

| Cell lines | Name of the cell line | Plating efficiency (No. of cells/well) |
|---|---|---|
| Breast | MDAMB231 | 7500 |
| Prostate | PC3 | 5000 |

Results of Soft Agar Assay of the Compounds on Breast Cancer (MDAMB231 Cell Line) and Prostate Cancer (PC3 Cell Line).

TABLE 4

| | IC50 in micromolar | |
|---|---|---|
| Compounds | MDAMB231 | PC3 |
| Cisplatin | 26.18 | 33.42 |
| Formula III | 2.53 | 4.84 |
| Formula IV | 2.59 | 7.5 |
| Formula V | 2.21 | 3.98 |
| Formula VI | 2.69 | 2.65 |
| Formula VII | 2.05 | 2.70 |
| Formula VIII | 1.73 | 2.07 |
| Formula IX | 0.327 | 3.29 |
| Formula X | 4.18 | 10.35 |
| Formula XI | 2.7 | 5.12 |
| Formula XII | 3.33 | 4.07 |
| Formula XIII | 3.03 | 3.84 |
| Formula XIV | 2.8 | 0.4 |
| Formula XV | 5.36 | 3.06 |
| Formula XVIII | 4.18 | 2.63 |
| Formula XIX | 3.41 | 5.12 |
| Formula XX | 3.78 | 3.31 |
| Formula XXI | 4.34 | 2.75 |

The above results indicate that the activity of compounds of Formula III to XV, VIII to XXI on breast and prostate cancer cell lines is higher compared to standard chemotherapeutic drug cisplatin.

Figure 2:
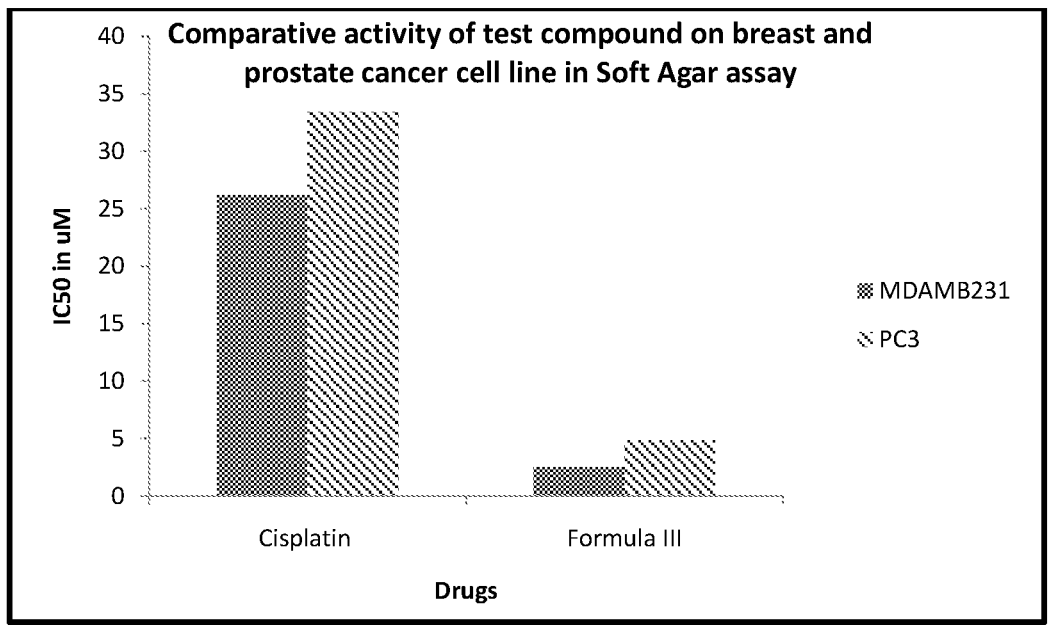
FIG. 2 illustrates the activity of compound of Formula III compared to cisplatin on breast cancer and prostate cancer cell lines in Soft Agar Assay.
Figure 6:
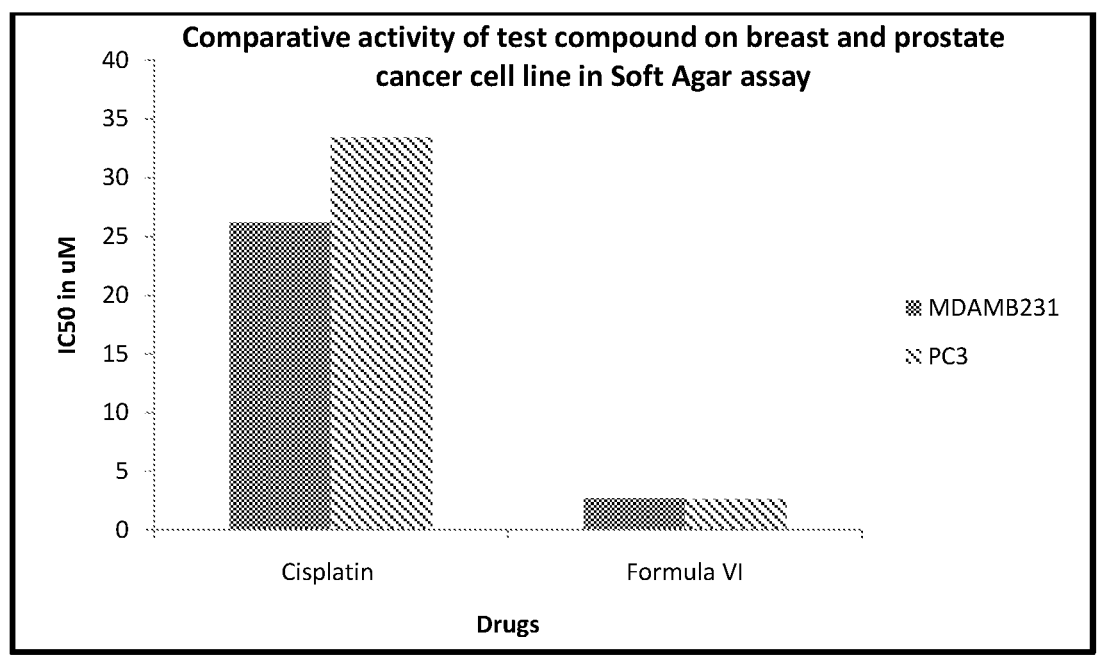
FIG. 6 illustrates the activity of compound of Formula IV compared to cisplatin on breast cancer and prostate cancer cell lines in Soft Agar Assay.
Figure 10:
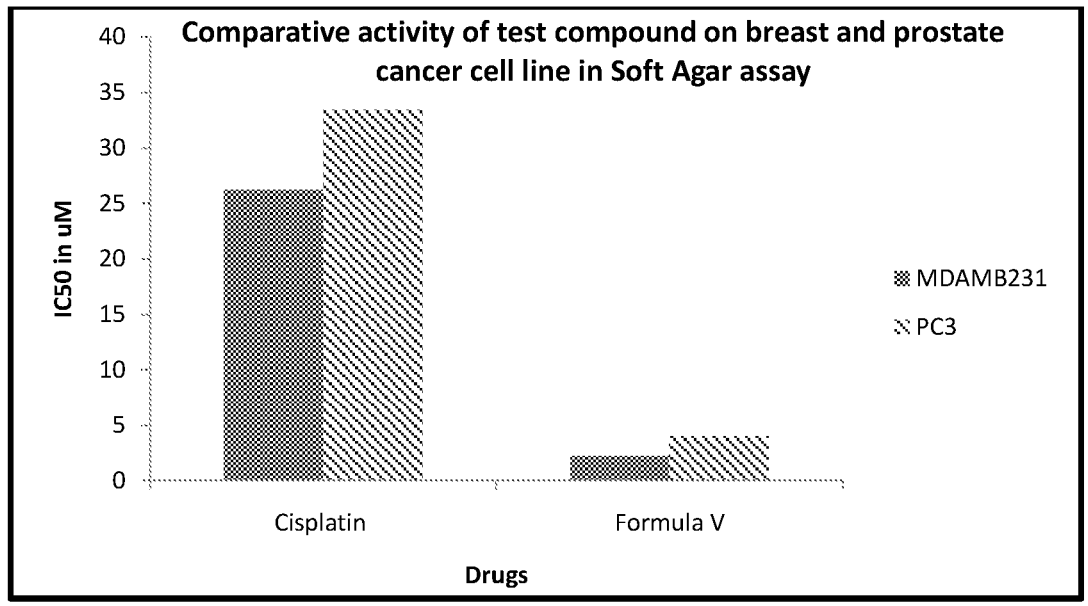
FIG. 10 illustrates the activity of compound of Formula V compared to cisplatin on breast cancer and prostate cancer cell lines in Soft Agar Assay.
Figure 14:
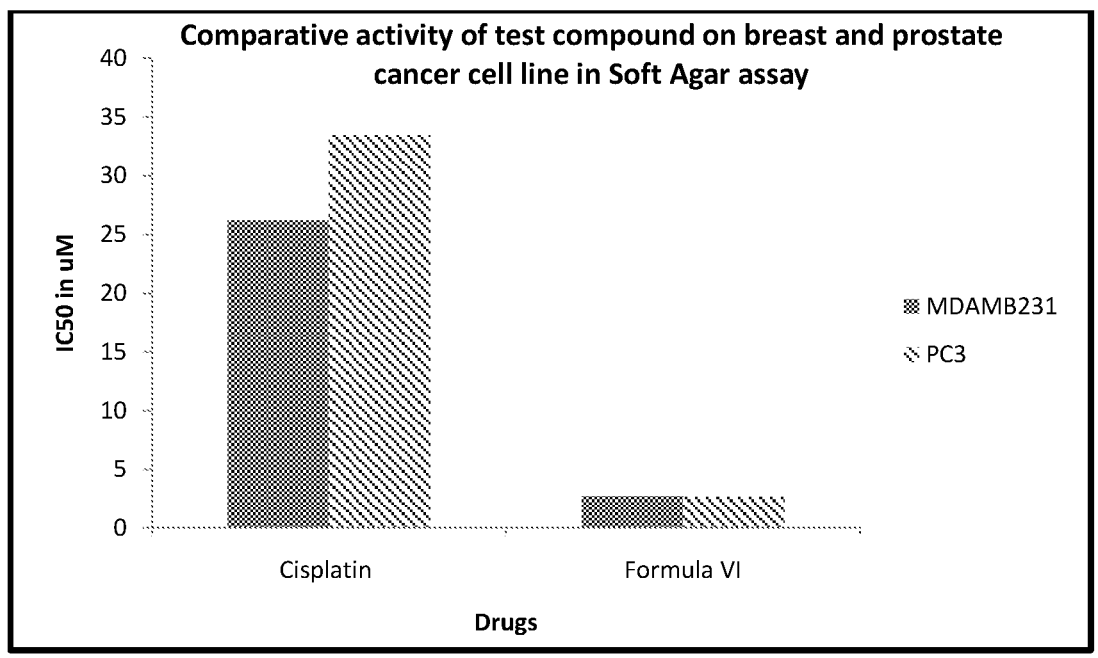
FIG. 14 illustrates the activity of compound of Formula VI compared to cisplatin on breast cancer and prostate cancer cell lines in Soft Agar Assay.
Figure 17:
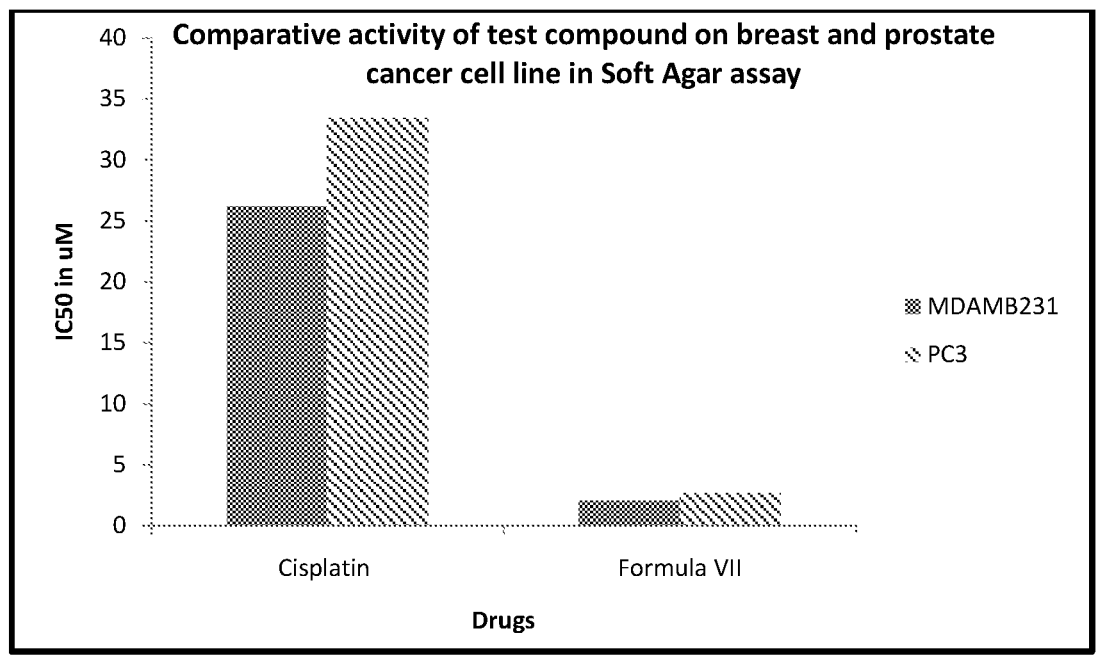
FIG. 17 illustrates the activity of compound of Formula VII compared to cisplatin on breast cancer and prostate cancer cell lines in Soft Agar Assay.
Figure 21:
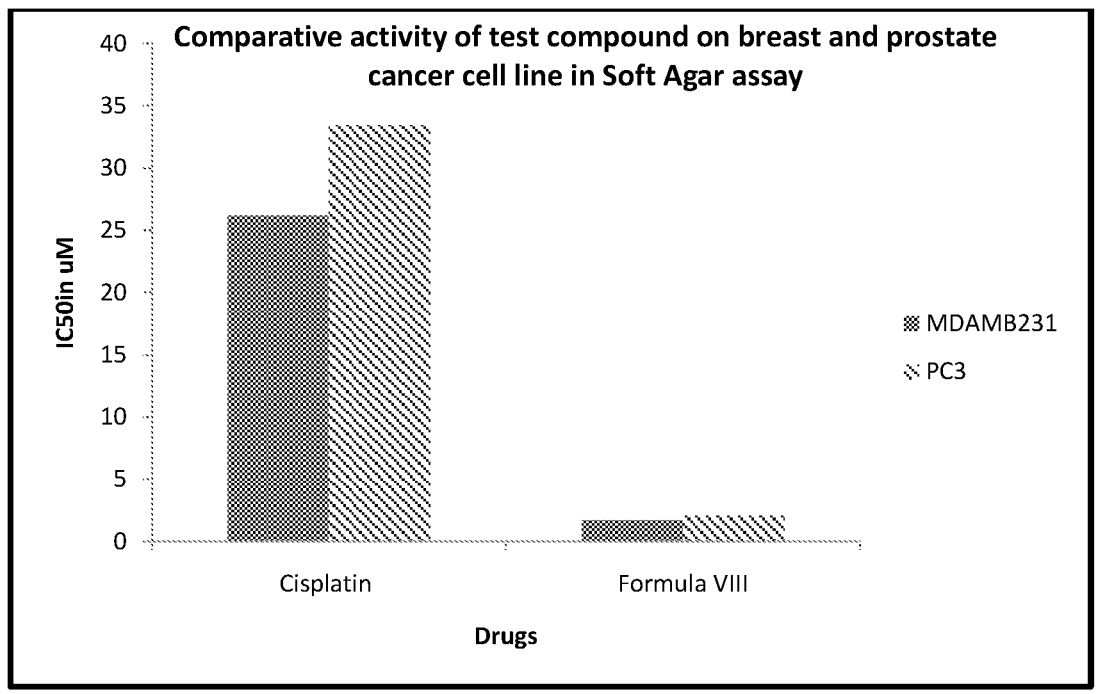
FIG. 21 illustrates the activity of compound of Formula VIII compared to cisplatin on breast cancer and prostate cancer cell lines in Soft Agar Assay.
Figure 25:
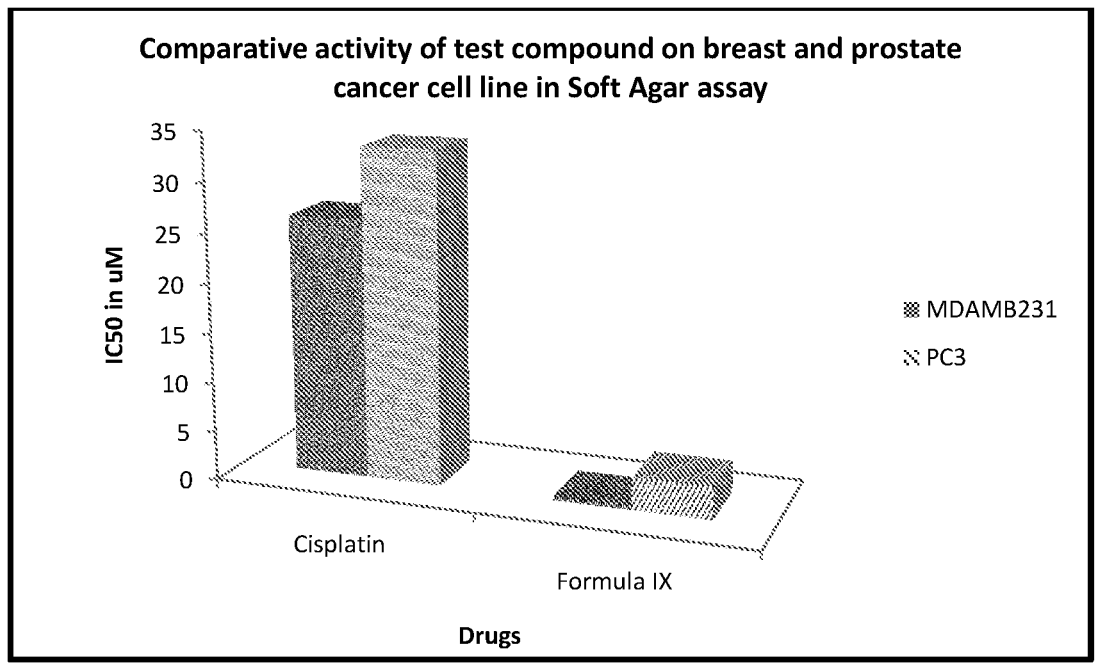
FIG. 25 illustrates the activity of compound of Formula IX compared to cisplatin on breast cancer and prostate cancer cell lines in Soft Agar Assay.
Figure 27:
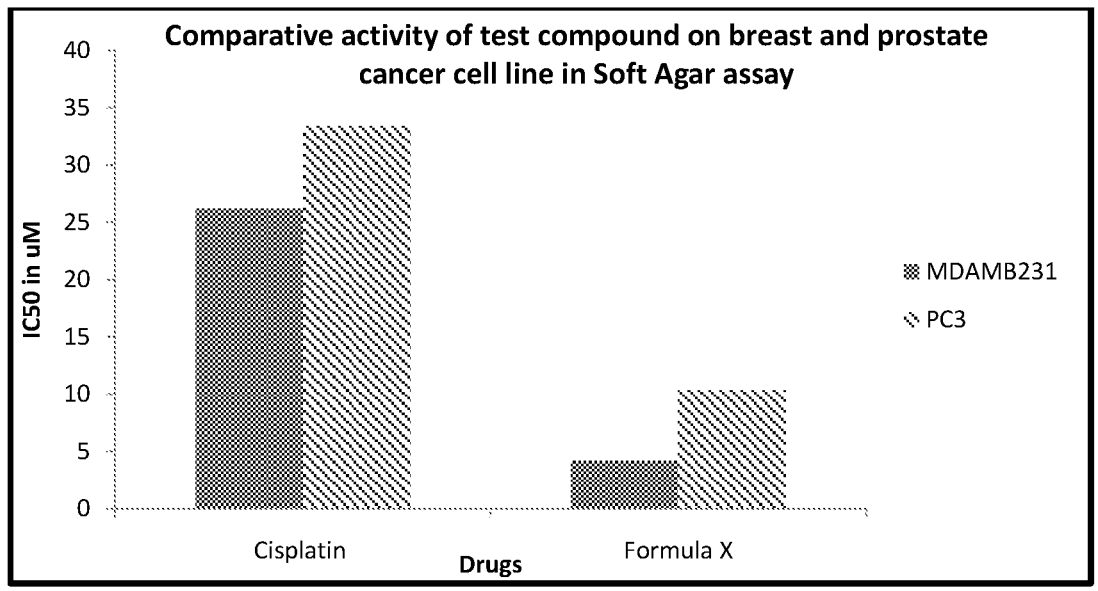
FIG. 27 illustrates the activity of compound of Formula X compared to cisplatin on breast cancer and prostate cancer cell lines in Soft Agar Assay.
Figure 31:
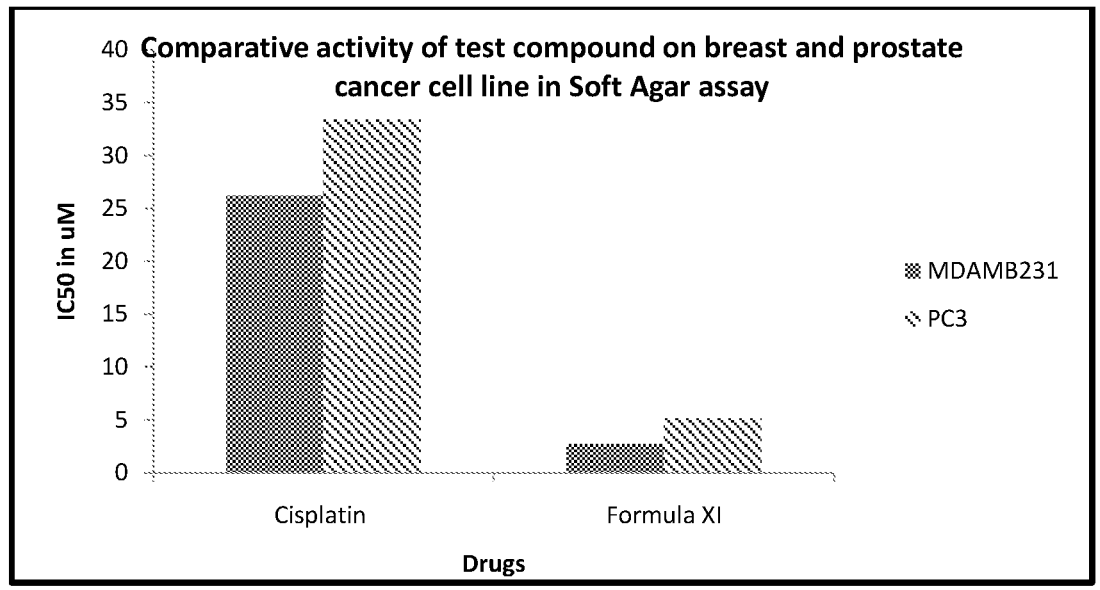
FIG. 31 illustrates the activity of compound of Formula XI compared to cisplatin on breast cancer and prostate cancer cell lines in Soft Agar Assay.
Figure 35:
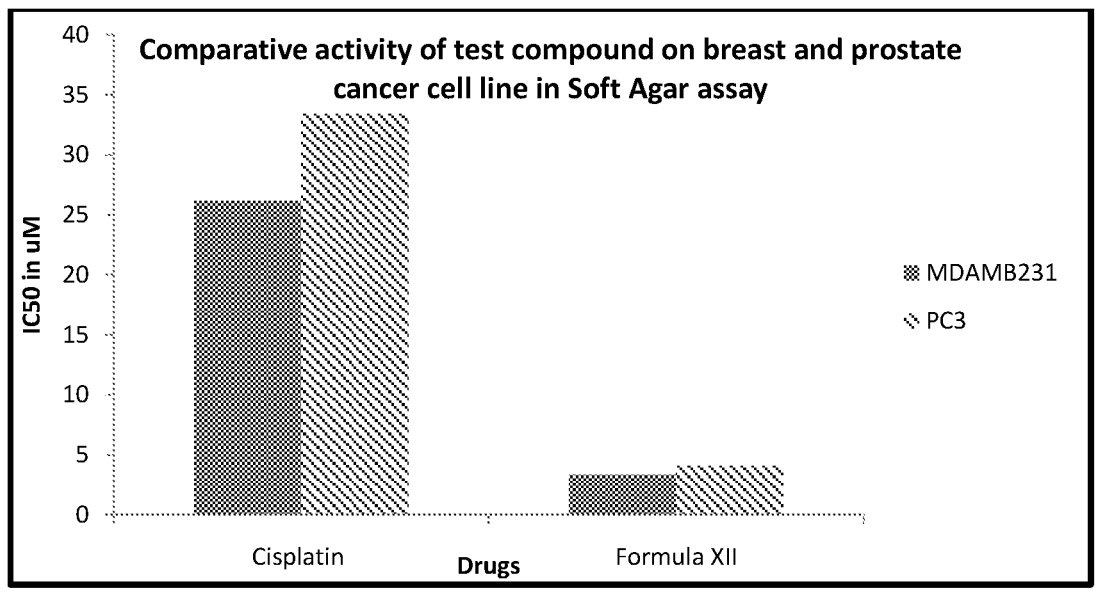
FIG. 35 illustrates the activity of compound of Formula XII compared to cisplatin on breast cancer and prostate cancer cell lines in Soft Agar Assay.
Figure 39:
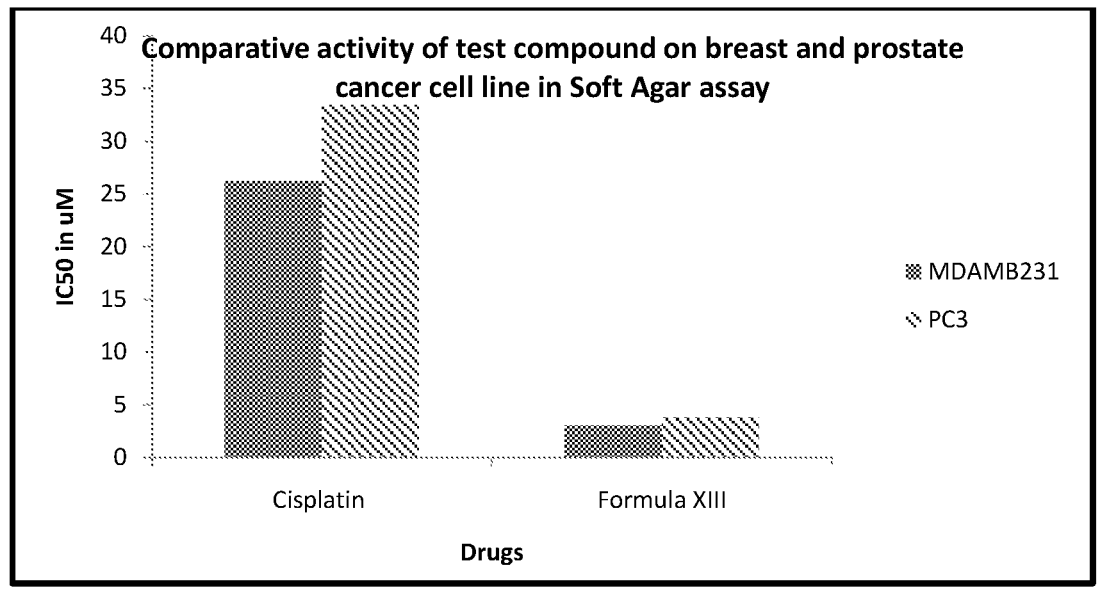
FIG. 39 illustrates the activity of compound of Formula XIII compared to cisplatin on breast cancer and prostate cancer cell lines in Soft Agar Assay.
Figure 43:
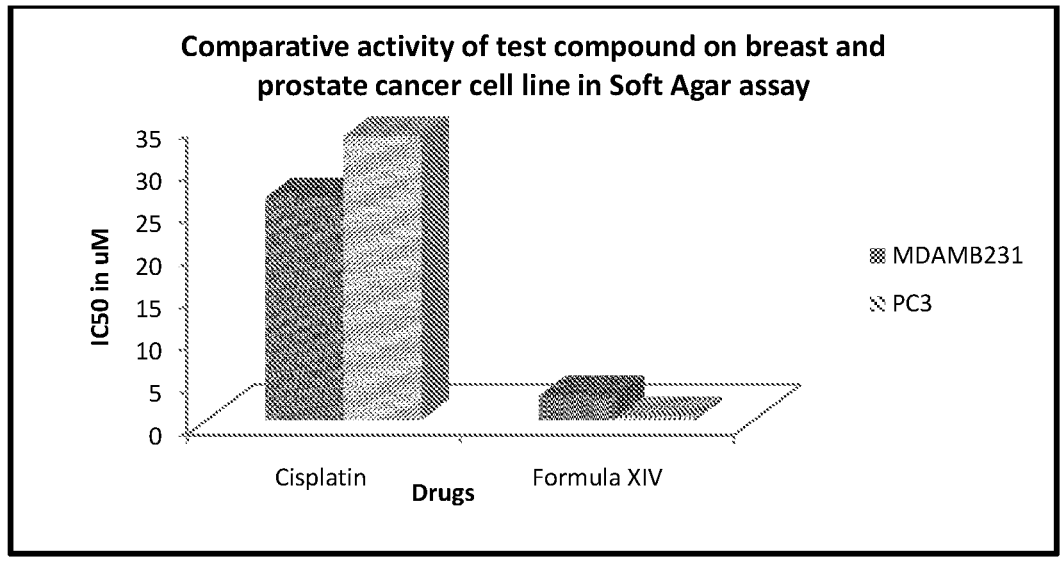
FIG. 43 illustrates the activity of compound of Formula XIV compared to cisplatin on breast cancer and prostate cancer cell lines in Soft Agar Assay.
Figure 47:
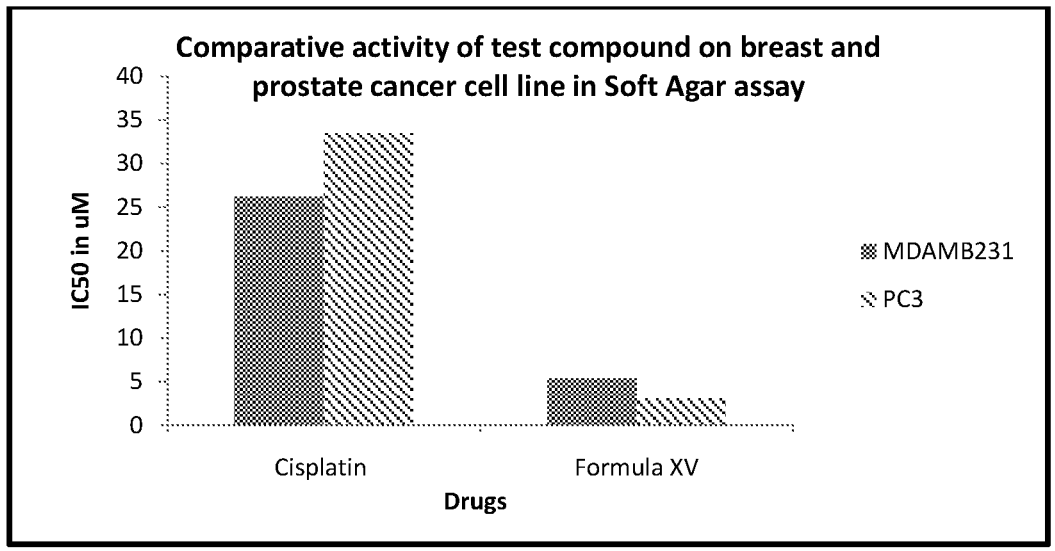
FIG. 47 illustrates the activity of compound of Formula XV compared to cisplatin on breast cancer and prostate cancer cell lines in Soft Agar Assay.
Figure 54:
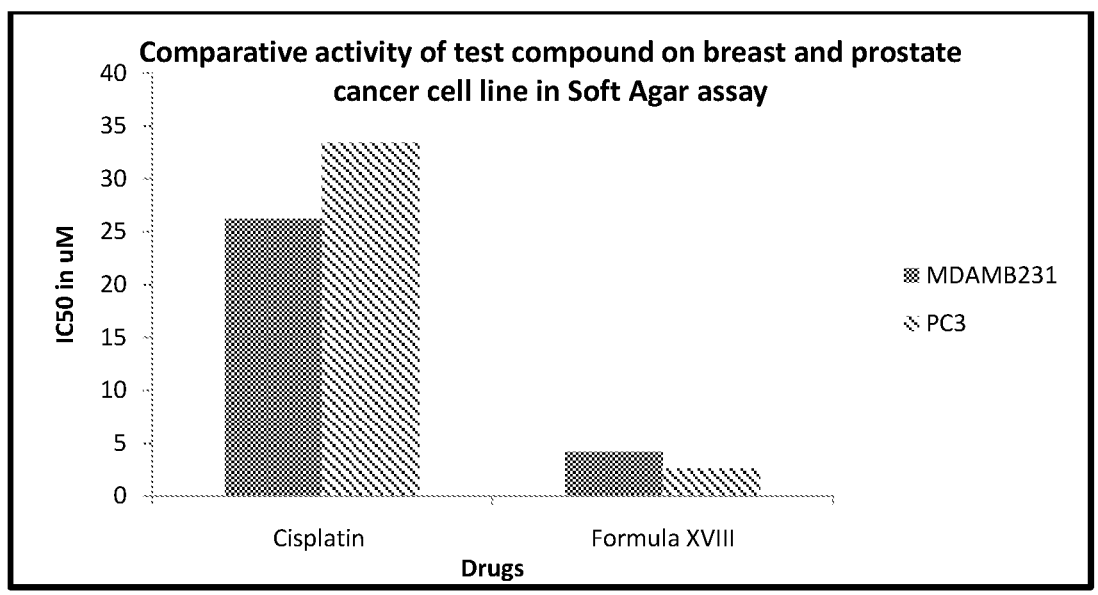
FIG. 54 illustrates the activity of compound of Formula XVIII compared to cisplatin on breast cancer and prostate cancer cell lines in Soft Agar Assay.
Figure 58:
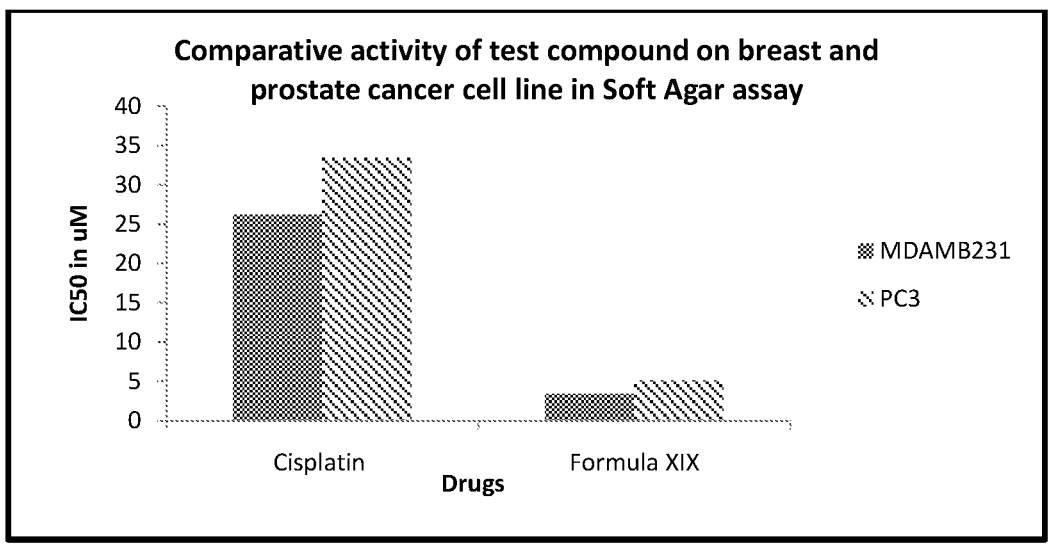
FIG. 58 illustrates the activity of compound of Formula XIX compared to cisplatin on breast cancer and prostate cancer cell lines in Soft Agar Assay.
Figure 62:
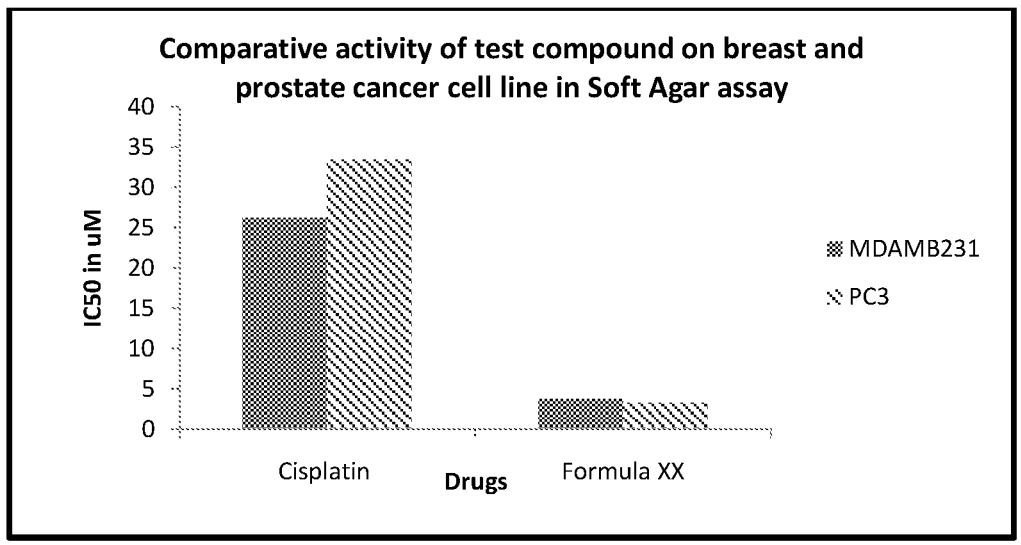
FIG. 62 illustrates the activity of compound of Formula XX compared to cisplatin on breast cancer and prostate cancer cell lines in Soft Agar Assay.
Figure 66:
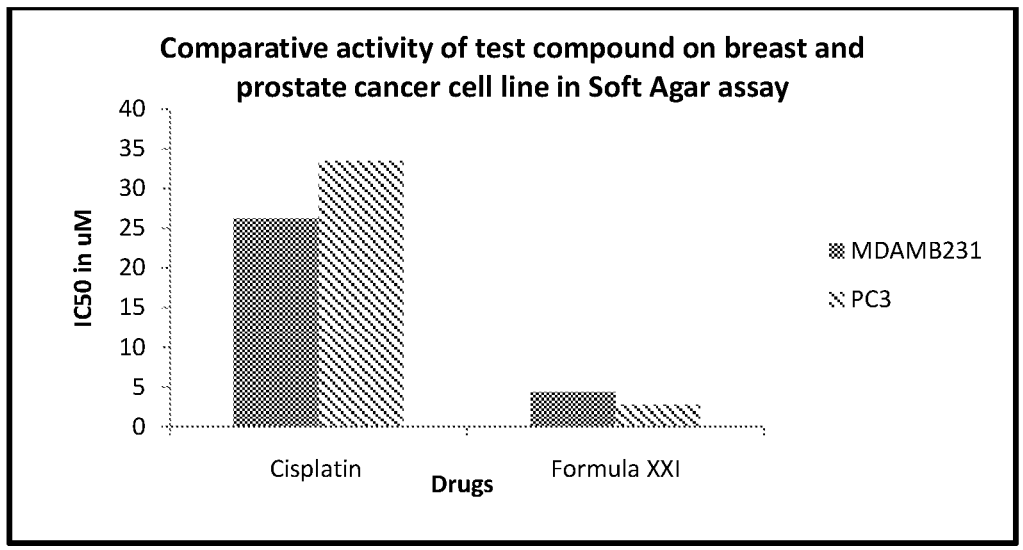
FIG. 66 illustrates the activity of compound of Formula XXI compared to cisplatin on breast cancer and prostate cancer cell lines in Soft Agar Assay.

FIG. 2, FIG. 6, FIG. 10, FIG. 14, FIG. 17, FIG. 21, FIG. 25, FIG. 27, FIG. 31, FIG. 35, FIG. 39, FIG. 43, FIG. 47, FIG. 54, FIG. 58, FIG. 62, FIG. 66 indicate the activity of the compounds of Formula III to XV and XVIII to XXI respectively on breast and prostate cancer cell lines in comparison with cisplatin. It was found that the compounds exhibit higher anticancer activity in comparison with cisplatin.

3. Stem Cell Assays

In Vitro Sphere-forming Assay: Sphere assay measures the ability of cancer stem cells (CSCs) to form spheres in specially designed serum-free medium. This assay was used to measure the killing efficiency of the test compounds as compared to the standard chemotherapeutic drug, Cisplatin.

Materials and Reagents:50×B27 Supplement (Life Technologies, Invitrogen, Catlog No.: 17502-044), Fibroblast Growth Factor (FGF) (Sigma-Aldrich, Catlog No.: F029125), Epidermal Growth Factor (EGF) (Sigma-Aldrich, Catlog No.: E9644), Insulin (Sigma, Catlog No.: 19278), Dulbecco's Modified Eagle Medium/F12 (HiMedia Catlog No.: AL139-6), Dulbecco's Phosphate Buffered Saline (HiMedia Catlog No.: TL1006), Trypan Blue (TC193), Prostate Epithelial Media (LONZA, Catlog No.: CC-3166) MEGM (LONZA, Catlog No.: CC-3051), Heparin (Sigma, Catlog No.: H3393), Penstrep (HiMedia, Catlog No.: A002)

Mammosphere Media Preparation (For 100 mL): 1 g methyl cellulose autoclaved with magnetic stirrer, 100 ml plain media (MEBM) was added and dissolved under magnetic stirring. After complete dissolution FGF—80 μL, EGF—40 μL, Penstrep—1 mL, Heparin—400 μL was added.

Prostosphere Media Preparation (For 100 mL): 1 g methyl cellulose autoclaved with magnetic stirrer, 100 mL plain media (Prostate Epithelial Basal Medium) was added and dissolved, under magnetic stirring. After complete dissolution, Insulin—40 μL, B27—2 mL, EGF—80 μL, Penstrep—1 ml was added.

Procedure—The cells were trypsinised and made into single-cell suspension by passing through cell strainers (100 μl and 40 μl, respectively), The cells were diluted at a concentration of 2000 cells/100 μL and suspended in either Mammosphere (for breast cell lines) or Prostosphere (for prostate cell lines). 100 μL of this suspension was added into each well of 96-well suspension plates and incubated at 37 C, 50 $CO_2$ for 24 hrs. Appropriate concentrations of the drugs (2 L) were added into respective wells with 100 μL of stem cell culture medium. Plates were incubated at 37° C., 50% $CO_2$ for 72 hrs. After incubation, 2.5 μL of the respective drug concentration and 50 μL of stem cell culture medium were added into each well and the plates were further incubated at 37° C., 500 $CO_2$ for 72 hrs. 3 μL of the respective drug concentration was added with 50 μL of stem cell culture medium again after incubation and plates were reincubated for 72 hrs at 37° C., 500 $CO_2$. Number of primary spheres formed for each concentration were counted. The spheres were converted to 0 viability of spheres compared to untreated (Growth Control with DMSO, GCD). A comparative graph of 00 viability of spheres was plotted against the drug concentration and compared with standard therapeutic drug Cisplatin.

Results of In-Vitro Sphere Forming Assay of the Compounds on Breast Cancer (MIDAMB231 Cell Line) and Prostate Cancer (PC3 and DU145 Cell Line) at a Plating Efficiency of 2000 Cells/Well (n=6±S.D).

TABLE 5

3D sphere count of MDAMB231 in Mammosphere media at plating efficiency of 2000 cells/well (n = 6 ± S.D)

| Drug Concentration in uM | 250 | 25 | 2.5 | 0.25 | 0.025 | 0.0025 | GC(Growth Control) | GCD (Growth Control With DMSO) |
|---|---|---|---|---|---|---|---|---|
| Cisplatin | 24(±3) | 36(±2) | 41(±3) | 55(±2) | 58(±5) | — | 84(±2) | 77(±2) |
| Formula III | 0(±0) | 17(±4) | 30(±4) | 35(±3) | 41(±2) | — | 84(±2) | 77(±2) |
| Cisplatin | 25(±2) | 39(±2) | 48(±3) | 54(±3) | 67(±2) | — | 84(±3) | 79(±2) |
| Formula IV | 0(±0) | 11(±2) | 25(±2) | 35(±2) | 40(±2) | — | 84(±3) | 79(±2) |
| Cisplatin | 32(±3) | 35(±3) | 45(±3) | 58(±3) | 67(±2) | — | 86(±3) | 82(±2) |
| Formula V | 0(±0) | 19(±4) | 27(±3) | 39(±3) | 41(±5) | — | 86(±3) | 82(±2) |
| Cisplatin | — | 31(±2) | 49(±5) | 67(±3) | 70(±5) | 72(±3) | 76(±3) | 71(±3) |
| Formula VII | — | 21(±2) | 29(±3) | 36(±3) | 47(±3) | 58(±3) | 76(±3) | 71(±3) |
| Cisplatin | — | 31(±2) | 49(±5) | 67(±3) | 70(±5) | 72(±3) | 76(±3) | 71(±3) |
| Formula VIII | — | 19(±1) | 28(±3) | 39(±2) | 49(±4) | 54(±3) | 76(±3) | 71(±3) |
| Cisplatin | — | 33(±2) | 42(±4) | 52(±4) | 58(±3) | 79(±3) | 86(±4) | 82(±4) |
| Formula X | — | 7(±3) | 21(±3) | 34(±3) | 42(±4) | 57(±5) | 86(±4) | 82(±4) |
| Cisplatin | — | 31(±3) | 39(±3) | 49(±3) | 59(±3) | 69(±3) | 83(±3) | 79(±3) |
| Formula XI | — | 0(±0) | 20(±3) | 31(±3) | 41(±3) | 51(±3) | 83(±3) | 79(±3) |
| Cisplatin | — | 31(±3) | 39(±3) | 49(±3) | 59(±3) | 69(±3) | 83(±3) | 79(±3) |
| Formula XII | — | 9(±3) | 30(±3) | 34(±3) | 41(±3) | 47(±4) | 83(±3) | 79(±3) |
| Cisplatin | — | 37(±3) | 45(±4) | 53(±4) | 69(±3) | 79(±3) | 85(±3) | 79(±3) |
| Formula XIII | — | 21(±3) | 30(±4) | 36(±2) | 40(±3) | 49(±3) | 85(±3) | 79(±3) |
| Cisplatin | — | 32(±3) | 42(±3) | 51(±3) | 63(±3) | 70(±4) | 88(±3) | 82(±2) |
| Formula XIV | — | 7(±3) | 21(±3) | 21(±7) | 43(±3) | 47(±3) | 88(±3) | 82(±2) |
| Cisplatin | — | 32(±2) | 43(±2) | 53(±2) | 65(±2) | 75(±2) | 88(±3) | 82(±1) |
| Formula XV | — | 16(±4) | 31(±3) | 40(±6) | 51(±5) | 53(±2) | 88(±3) | 82(±1) |
| Cisplatin | — | 34(±2) | 42(±5) | 56(±5) | 66(±2) | 82(±3) | 87(±3) | 85(±3) |
| Formula XVI | — | 22(±4) | 37(±3) | 42(±3) | 51(±3) | 61(±3) | 87(±3) | 85(±3) |
| Cisplatin | — | 31(±2) | 49(±5) | 67(±3) | 70(±5) | 72(±3) | 76(±3) | 71(±3) |
| Formula XVIII | — | 19(±1) | 28(±3) | 39(±2) | 49(±4) | 54(±3) | 76(±3) | 71(±3) |
| Cisplatin | — | 31(±3) | 39(±3) | 49(±3) | 59(±3) | 69(±3) | 83(±3) | 79(±3) |
| Formula XIX | — | 13(±2) | 23(±5) | 34(±3) | 40(±4) | 48(±4) | 83(±3) | 79(±3) |
| Cisplatin | — | 31(±3) | 39(±3) | 49(±3) | 59(±3) | 69(±3) | 83(±3) | 79(±3) |
| Formula XX | — | 0(±0) | 14(±4) | 27(±3) | 37(±4) | 48(±4) | 83(±3) | 79(±3) |
| Cisplatin | — | 34(±2) | 42(±5) | 56(±5) | 66(±2) | 82(±3) | 87(±3) | 85(±3) |
| Formula XXII | — | 0(±0) | 9(±2) | 24(±4) | 34(±3) | 47(±3) | 87(±3) | 85(±3) |

The above results indicate that compounds of Formula III to XVI, XVIII to XX and XXII are more effective in inhibiting spheres of MDAMB231 compared to cisplatin.

Figure 3:
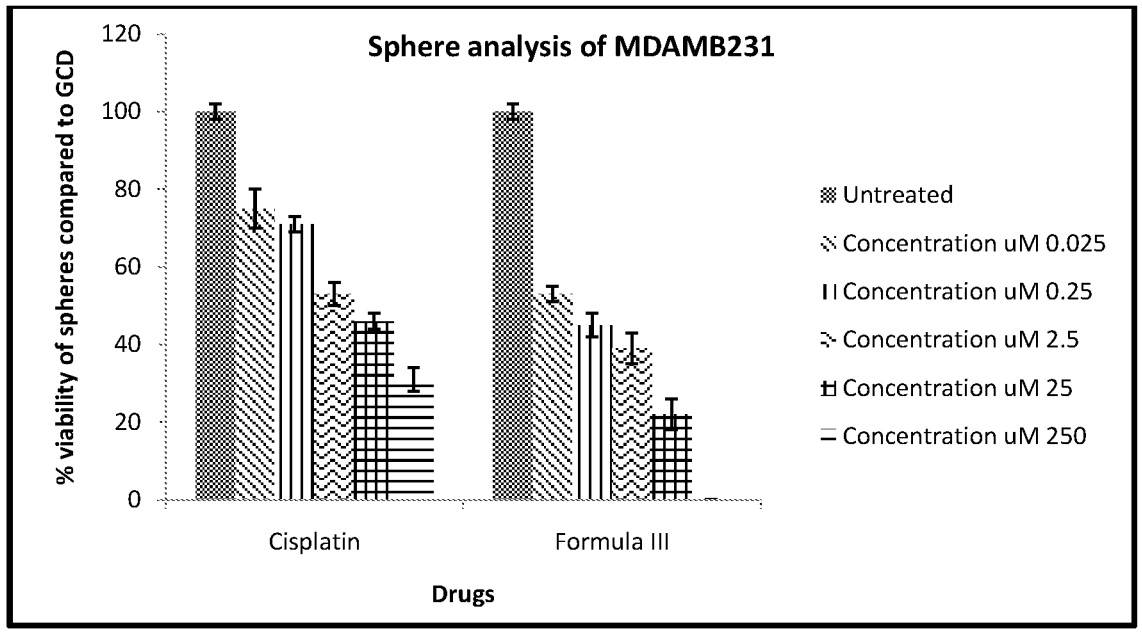
FIG. 3 illustrates the sphere analysis of MDAMB231 cell line in the presence of compound of Formula III and cisplatin.
Figure 7:
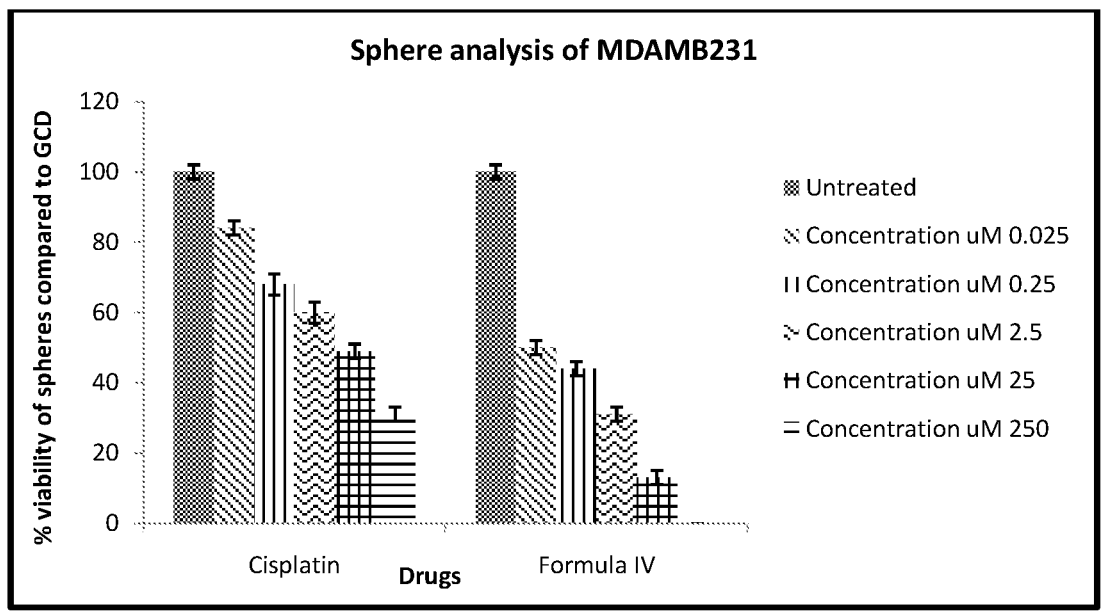
FIG. 7 illustrates the sphere analysis of MDAMB231 cell line in the presence of compound of Formula IV and cisplatin.
Figure 11:
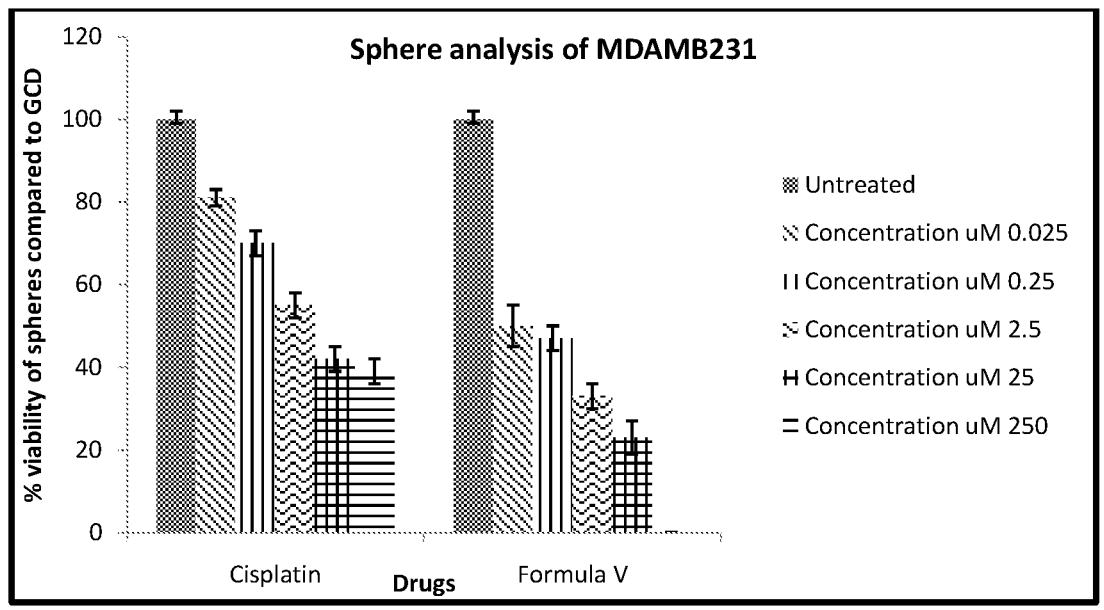
FIG. 11 illustrates the sphere analysis of MDAMB231 cell line in the presence of compound of Formula V and cisplatin.
Figure 18:
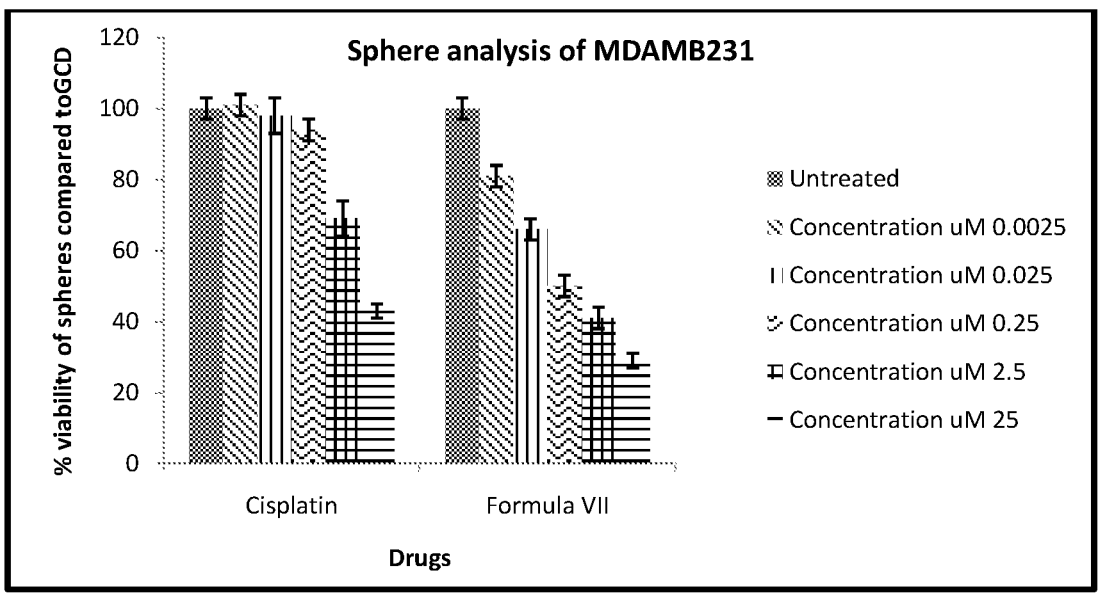
FIG. 18 illustrates the sphere analysis of MDAMB231 cell line in the presence of compound of Formula VII and cisplatin.
Figure 22:
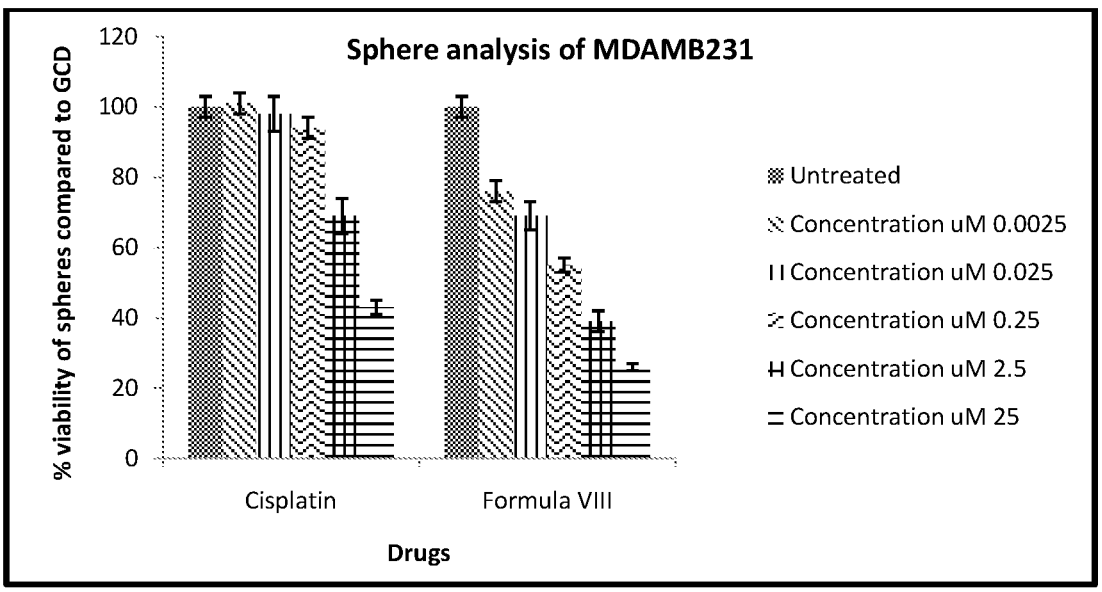
FIG. 22 illustrates the sphere analysis of MDAMB231 cell line in the presence of compound of Formula VIII and cisplatin.
Figure 28:
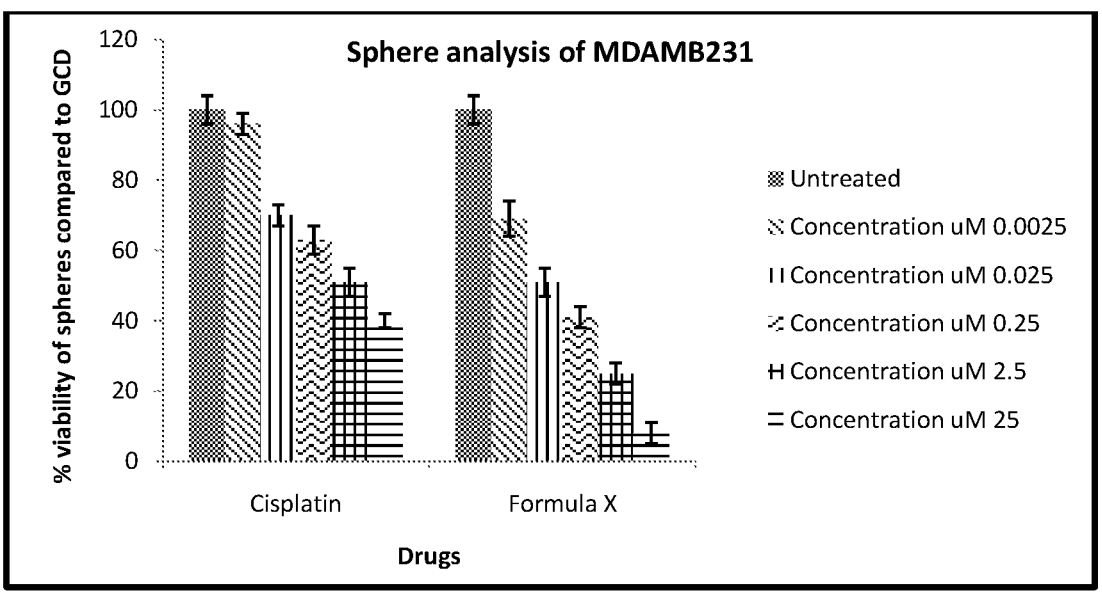
FIG. 28 illustrates the sphere analysis of MDAMB231 cell line in the presence of compound of Formula X and cisplatin.
Figure 32:
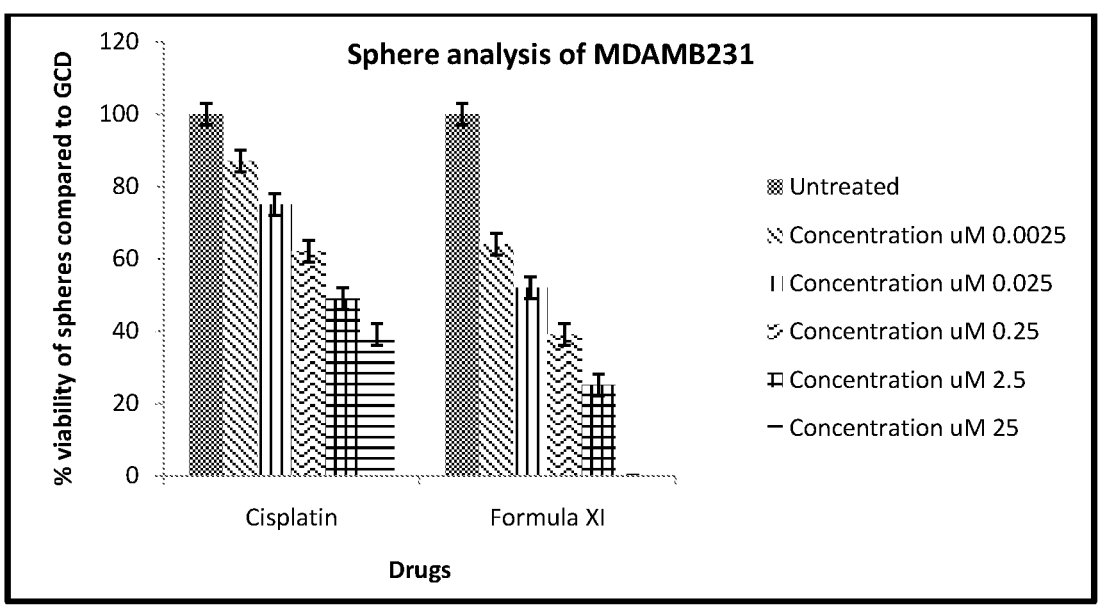
FIG. 32 illustrates the sphere analysis of MDAMB231 cell line in the presence of compound of Formula XI and cisplatin.
Figure 36:
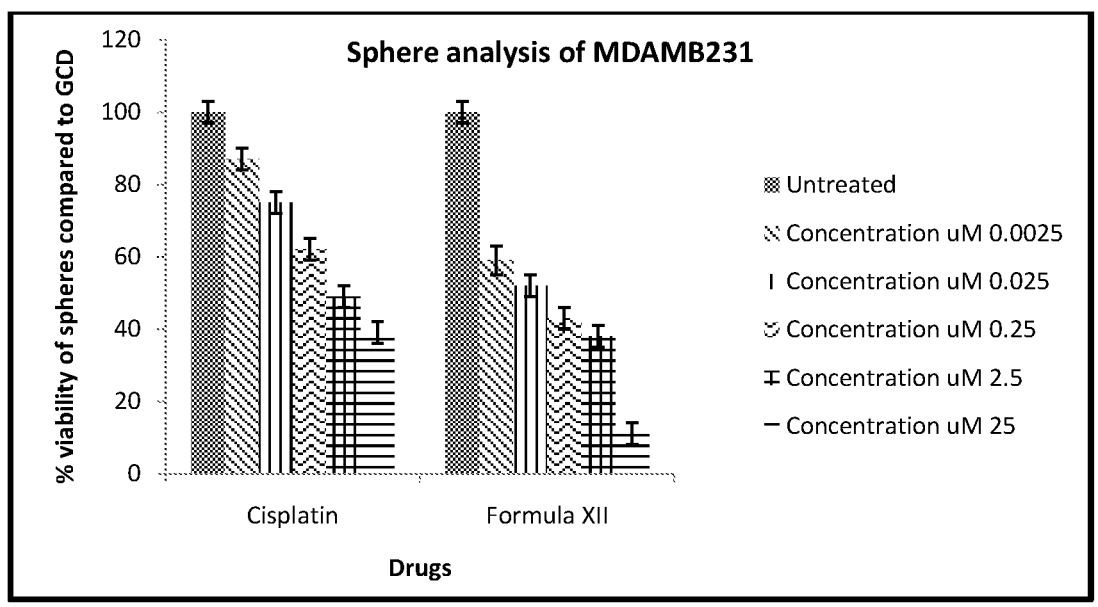
FIG. 36 illustrates the sphere analysis of MDAMB231 cell line in the presence of compound of Formula XII and cisplatin.
Figure 40:
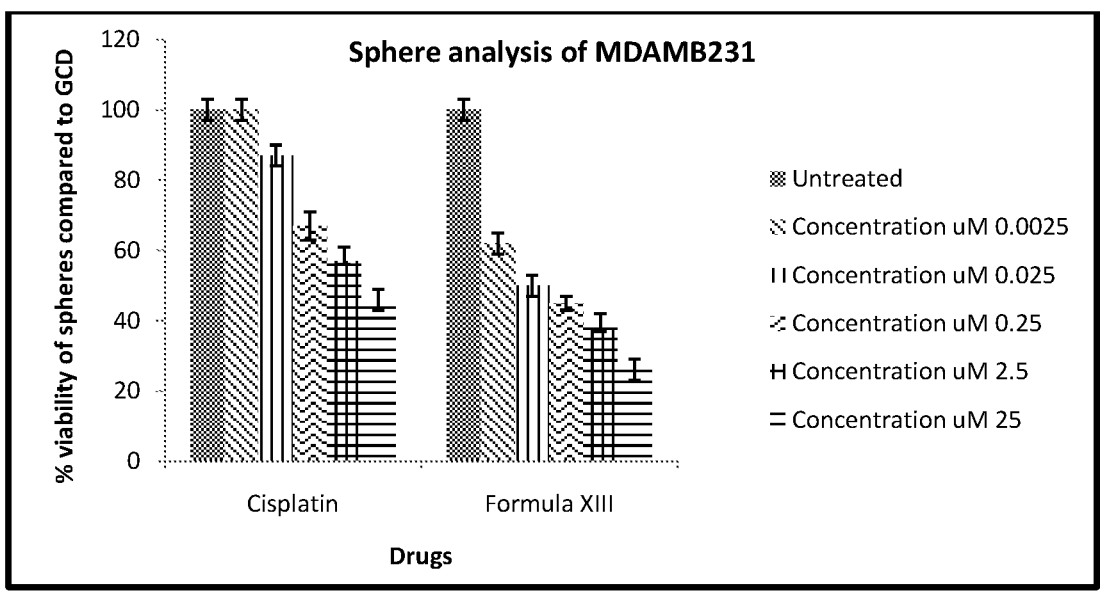
FIG. 40 illustrates the sphere analysis of MDAMB231 cell line in the presence of compound of Formula XIII and cisplatin.
Figure 44:
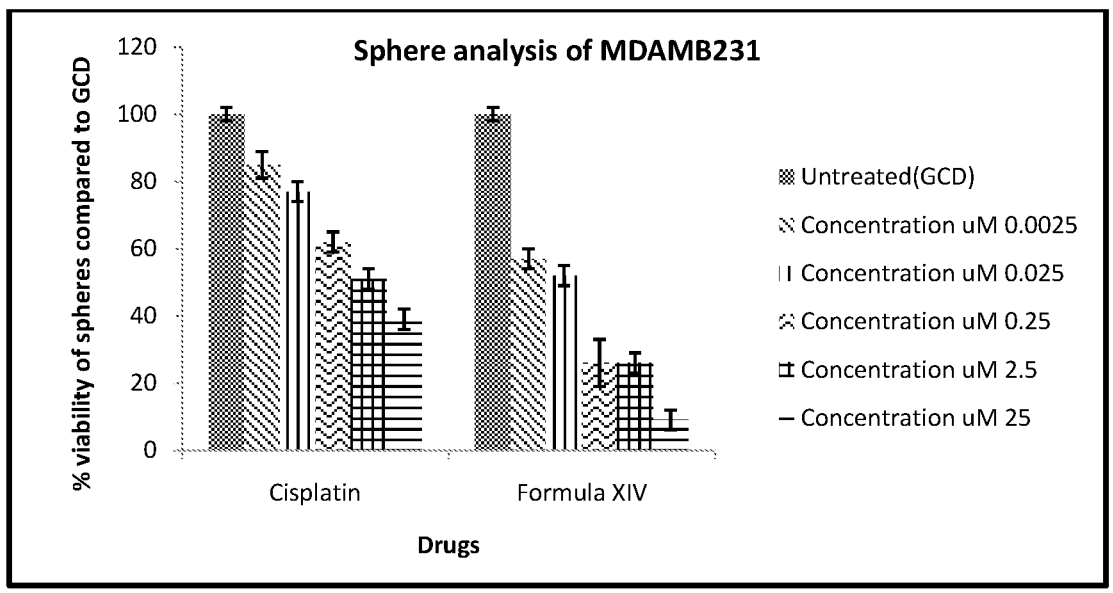
FIG. 44 illustrates the sphere analysis of MDAMB231 cell line in the presence of compound of Formula XIV and cisplatin.
Figure 48:
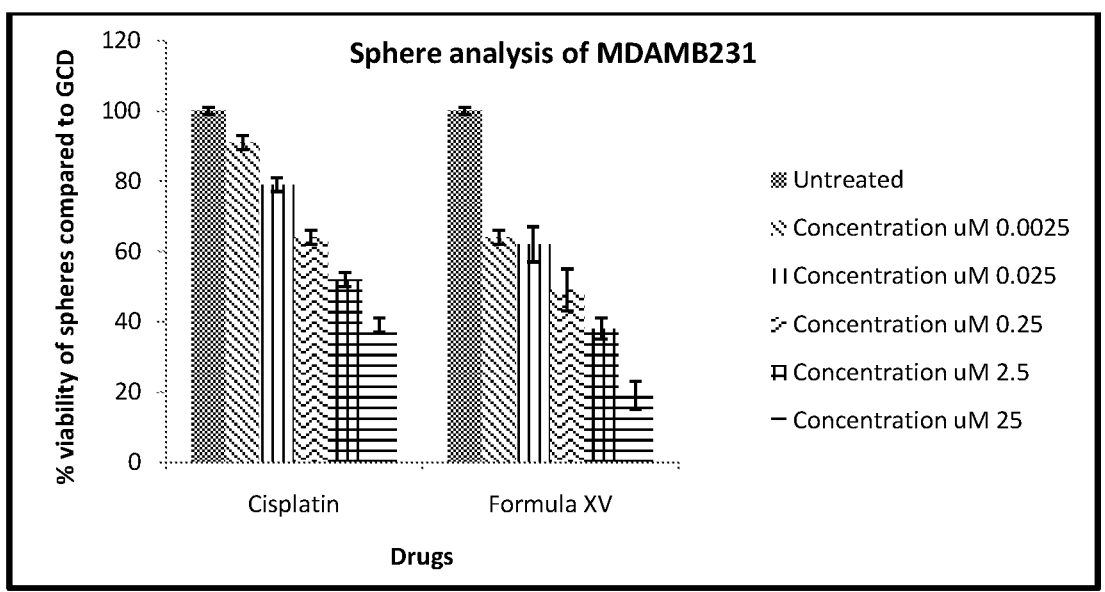
FIG. 48 illustrates the sphere analysis of MDAMB231 cell line in the presence of compound of Formula XV and cisplatin.
Figure 50:
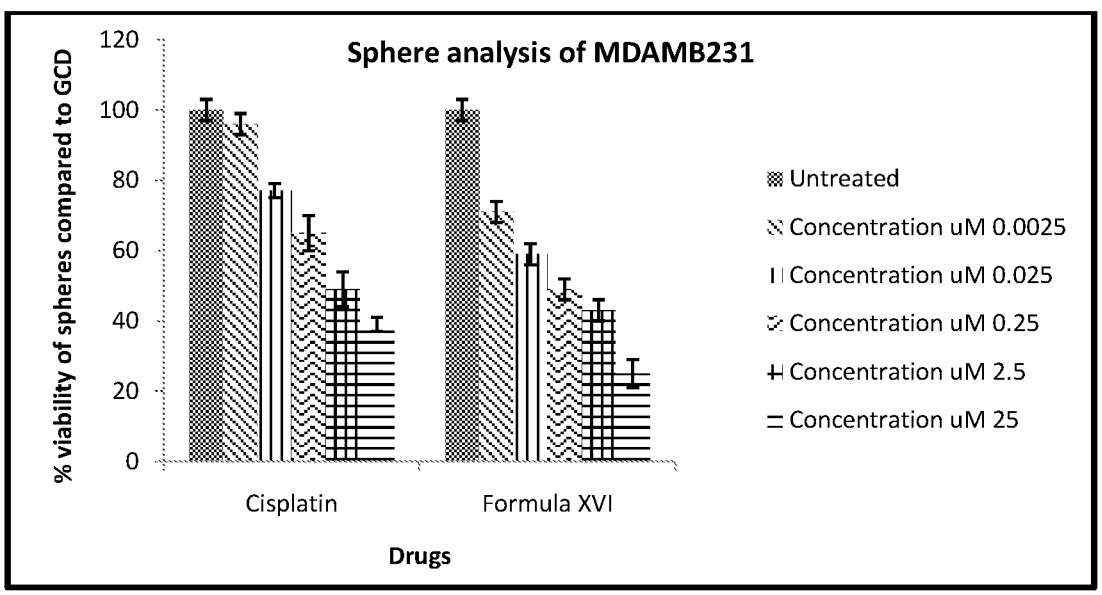
FIG. 50 illustrates the sphere analysis of MDAMB231 cell line in the presence of compound of Formula XVI and cisplatin
Figure 55:
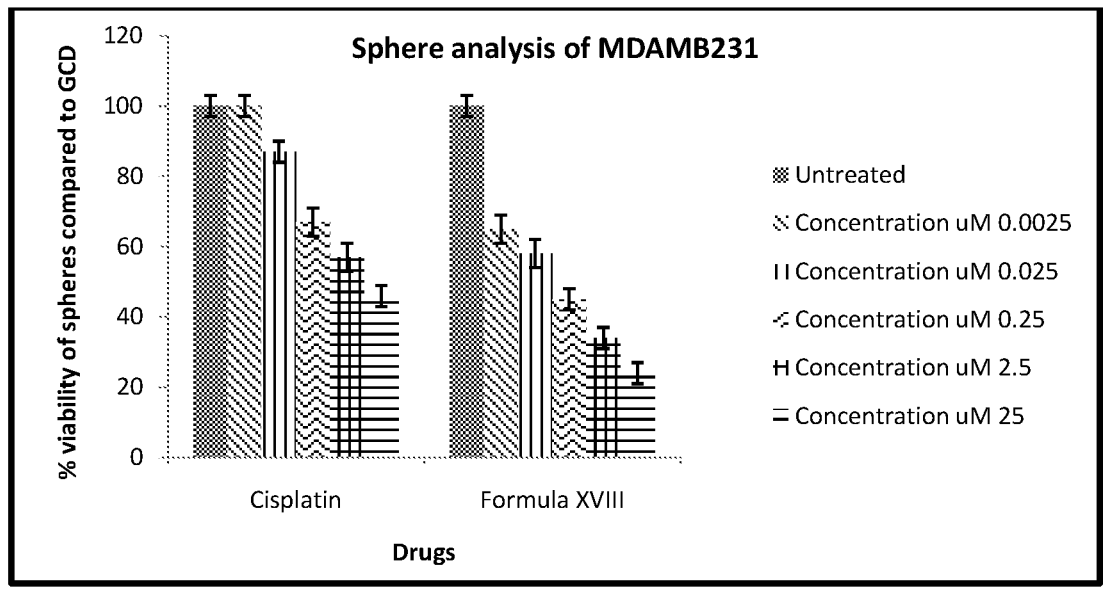
FIG. 55 illustrates the sphere analysis of MDAMB231 cell line in the presence of compound of Formula XVIII and cisplatin.
Figure 59:
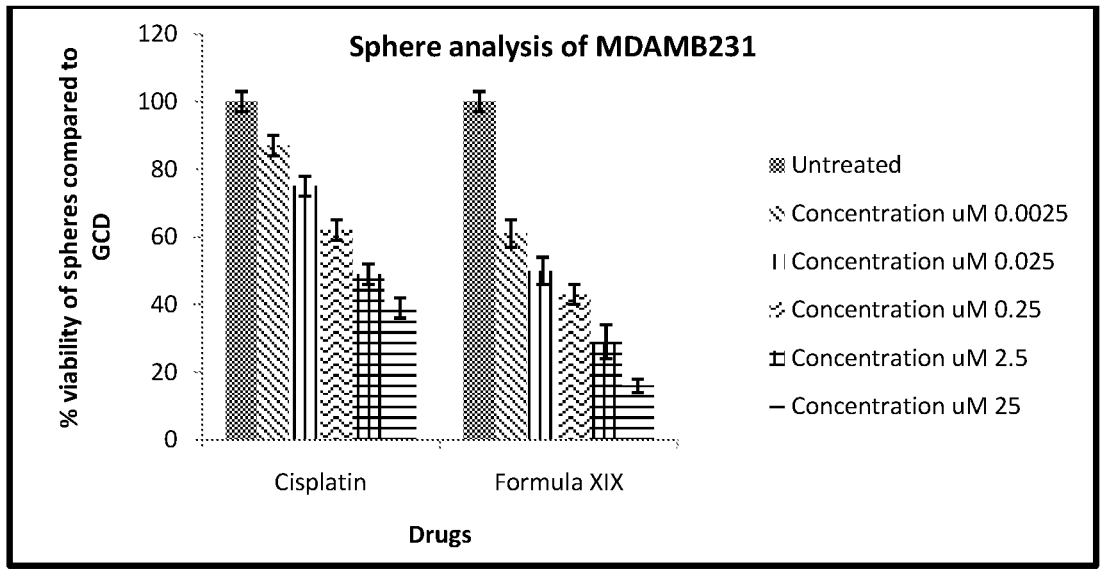
FIG. 59 illustrates the sphere analysis of MDAMB231 cell line in the presence of compound of Formula XIX and cisplatin.
Figure 63:
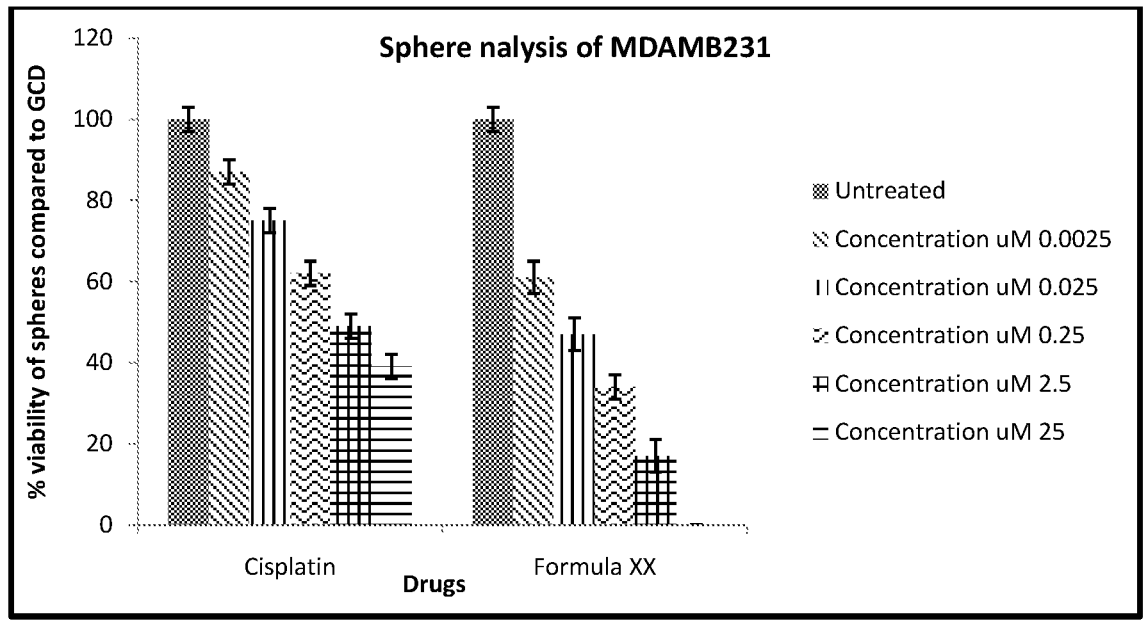
FIG. 63 illustrates the sphere analysis of MDAMB231 cell line in the presence of compound of Formula XX and cisplatin.
Figure 69:
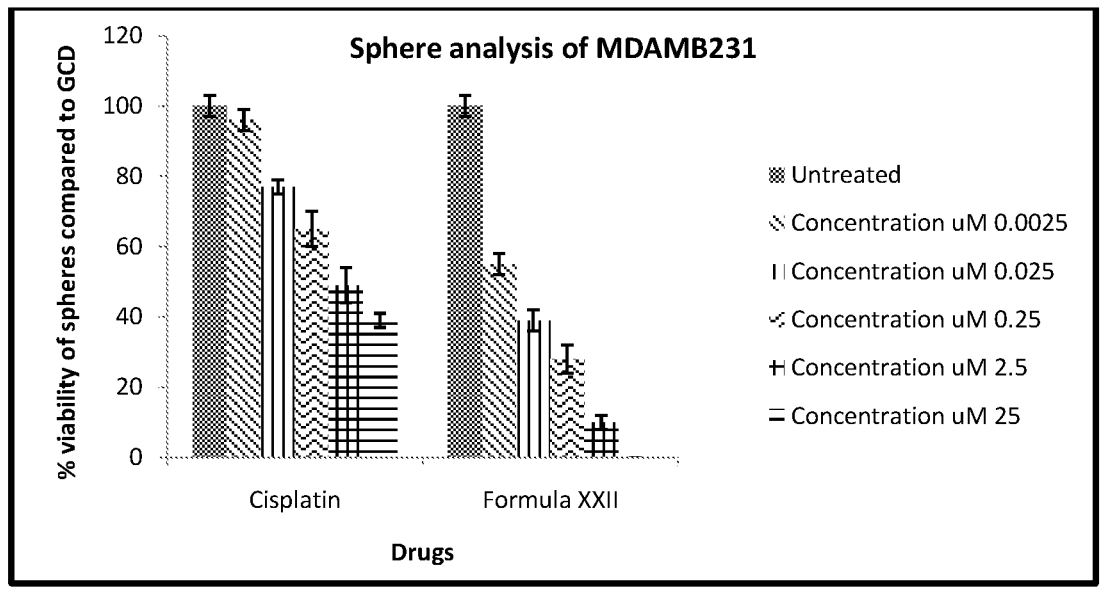
FIG. 69 illustrates the sphere analysis of MDAMB231 cell line in the presence of compound of Formula XXII and cisplatin.

FIG. 3, FIG. 7, FIG. 11, FIG. 18, FIG. 22, FIG. 28, FIG. 32, FIG. 36, FIG. 40, FIG. 44, FIG. 48, FIG. 50, FIG. 55, FIG. 59, FIG. 63, FIG. 69 refer to compounds of Formula III to V, VII, VIII, X to XVI, XVIII to XX and XXII respectively.

FIG. 3, FIG. 7, FIG. 11, FIG. 18, FIG. 22, FIG. 28, FIG. 32, FIG. 36, FIG. 40, FIG. 44, FIG. 48, FIG. 50, FIG. 55, FIG. 59, FIG. 63, FIG. 69 illustrates the percentage viability of spheres obtained from conversion of the number of spheres formed and compared with growth control with DMSO (GCD), wherein GCD is considered as 100% viability. The sphere count results for respective drug concentration indicated in Table 6 have been converted to percentage viability of spheres for graphical representation. The figures and Table 6 indicate that there is a decrease in percentage viability of spheres of MDAMB231 in the presence of compounds of Formula III to V, VII, VIII, X to XVI, XVIII to XX and XXII in comparison to cisplatin.

TABLE 6

% Viability of spheres (MDAMB231)

| Drug Concentration in uM | Untreated (GCD) | 250 | 25 | 2.5 | 0.25 | 0.025 | 0.0025 |
|---|---|---|---|---|---|---|---|
| Cisplatin | 100(±2) | 31(±3) | 46(±2) | 53(±3) | 71(±2) | 75(±5) | — |
| Formula III | 100(±2) | 0(±0) | 22(±4) | 39(±4) | 45(±3) | 53(±2) | — |
| Cisplatin | 100(±2) | 31(±2) | 49(±2) | 60(±3) | 68(±3) | 84(±2) | — |
| Formula IV | 100(±2) | 0(±0) | 13(±2) | 31(±2) | 44(±2) | 50(±2) | — |
| Cisplatin | 100(±2) | 39(±3) | 42(±3) | 55(±3) | 70(±3) | 81(±2) | — |
| Formula V | 100(±2) | 0(±0) | 23(±4) | 33(±3) | 47(±3) | 50(±5) | — |
| Cisplatin | 100(±3) | — | 43(±2) | 69(±5) | 94(±3) | 98(±5) | 101(±3) |
| Formula VII | 100(±3) | — | 29(±2) | 41(±3) | 50(±3) | 66(±3) | 81(±3) |

TABLE 6-continued

% Viability of spheres (MDAMB231)

| Drug Concentration in uM | Untreated (GCD) | 250 | 25 | 2.5 | 0.25 | 0.025 | 0.0025 |
|---|---|---|---|---|---|---|---|
| Cisplatin | 100(±3) | — | 43(±2) | 69(±5) | 94(±3) | 98(±5) | 101(±3) |
| Formula VIII | 100(±3) | — | 26(±1) | 39(±3) | 55±2) | 69(±4) | 76(±3) |
| Cisplatin | 100(±4) | — | 40(±2) | 51(±4) | 63(±4) | 70(±3) | 96(±3) |
| Formula X | 100(±4) | — | 8(±3) | 25(±3) | 41(±3) | 51(±4) | 69(±5) |
| Cisplatin | 100(±3) | — | 39(±3) | 49(±3) | 62(±3) | 75(±3) | 87(±3) |
| Formula XI | 100(±3) | — | 0(±0) | 25(±3) | 39(±3) | 52(±3) | 64(±3) |
| Cisplatin | 100(±3) | — | 39(±3) | 49(±3) | 62(±3) | 75(±3) | 87(±3) |
| Formula XII | 100(±3) | — | 11(±3) | 38(±3) | 43(±3) | 52(±3) | 59(±4) |
| Cisplatin | 100(±3) | — | 46(±3) | 57(±4) | 67(±4) | 87(±3) | 100(±3) |
| Formula XIII | 100(±3) | — | 26(±3) | 38(±4) | 45(±2) | 50(±3) | 62(±3) |
| Cisplatin | 100(±2) | — | 39(±3) | 51(±3) | 62(±3) | 77(±3) | 85(±4) |
| Formula XIV | 100(±2) | — | 9(±3) | 26(±3) | 26(±7) | 52(±3) | 57(±3) |
| Cisplatin | 100(±1) | — | 39(±2) | 52(±2) | 64(±2) | 79(±2) | 91(±2) |
| Formula XV | 100(±1) | — | 19(±4) | 38(±3) | 49(±6) | 62(±5) | 64(±2) |
| Cisplatin | 100(±3) | — | 39(±2) | 49(±5) | 65(±5) | 77(±2) | 96(±3) |
| Formula XVI | 100(±3) | — | 25(±4) | 43(±3) | 49(±3) | 59(±3) | 71(±3) |
| Cisplatin | 100(±3) | — | 46(±3) | 57(±4) | 67(±4) | 87(±3) | 100(±3) |
| Formula XVIII | 100(±3) | — | 24(±3) | 34(±3) | 45(±3) | 58(±4) | 65(±4) |
| Cisplatin | 100(±3) | — | 39(±3) | 49(±3) | 62(±3) | 75(±3) | 87(±3) |
| Formula XIX | 100(±3) | — | 16(±2) | 29(±5) | 43(±3) | 50(±4) | 61(±4) |
| Cisplatin | 100(±3) | — | 39(±3) | 49(±3) | 62(±3) | 75(±4) | 87(±4) |
| Formula XX | 100(±3) | — | 0(±0) | 17(±3) | 34(±4) | 47(±2) | 61(±5) |
| Cisplatin | 100(±3) | — | 39(±3) | 49(±2) | 65(±5) | 77(±5) | 96(±2) |
| Formula XXII | 100(±3) | — | 0(±3) | 10(±3) | 28(±4) | 39(±2) | 55(±0) |

TABLE 7

3D sphere count of PC3 in Prostosphere media at plating efficiency of 2000 cells/well (n = 6 ± S.D).

| Drug Concentration in uM | 250 | 25 | 2.5 | 0.25 | 0.025 | 0.0025 | GC(Growth Control) | GCD(Growth Control With DMSO) |
|---|---|---|---|---|---|---|---|---|
| Cisplatin | 27(±2) | 37(±3) | 48(±5) | 63(±3) | 78(±4) | — | 84(±3) | 77(±4) |
| Formula III | 0(±0) | 23(±3) | 29(±4) | 38(±4) | 49(±3) | — | 84(±3) | 77(±4) |
| Cisplatin | 29(±2) | 39(±3) | 52(±3) | 58(±5) | 70(±2) | — | 79(±3) | 74(±3) |
| Formula IV | 0(±0) | 22(±3) | 32(±3) | 35(±3) | 44(±3) | — | 79(±3) | 74(±3) |
| Cisplatin | 29(±5) | 41(±6) | 42(±4) | 51(±2) | 68(±3) | — | 92(±3) | 85(±2) |
| Formula V | 0(±0) | 30(±5) | 41(±2) | 49(±3) | 58(±3) | — | 92(±3) | 85(±2) |
| Cisplatin | 25(±2) | 35(±2) | 45(±3) | 55(±4) | 65(±2) | — | 90(±6) | 85(±2) |
| Formula VI | 0(±0) | 27(±2) | 37(±2) | 41(±2) | 49(±2) | — | 90(±6) | 85(±2) |
| Cisplatin | — | 35(±2) | 41(±2) | 52(±3) | 61(±2) | 72(±3) | 87(±2) | 82(±5) |
| Formula VII | — | 32(±3) | 37(±2) | 41(±3) | 46(±3) | 56(±3) | 87(±2) | 82(±5) |
| Cisplatin | — | 35(±2) | 41(±2) | 52(±3) | 61(±2) | 72(±3) | 87(±2) | 82(±5) |
| Formula VIII | — | 28(±3) | 36(±2) | 41(±2) | 49(±3) | 57(±2) | 87(±2) | 82(±5) |
| Cisplatin | — | 35(±3) | 43(±4) | 56(±2) | 64(±4) | 81(±3) | 87(±3) | 85(±3) |
| Formula X | — | 28(±3) | 42(±4) | 53(±3) | 61(±3) | 74(±4) | 87(±3) | 85(±3) |
| Cisplatin | — | 35(±3) | 42(±3) | 51(±3) | 62(±4) | 72(±4) | 86(±3) | 82(±3) |
| Formula XI | — | 0(±0) | 21(±3) | 32(±4) | 43(±3) | 51(±3) | 86(±3) | 82(±3) |
| Cisplatin | — | 35(±3) | 42(±3) | 51(±3) | 62(±4) | 72(±4) | 86(±3) | 82(±3) |
| Formula XII | — | 9(±3) | 28(±3) | 36(±3) | 42(±3) | 50(±3) | 86(±3) | 82(±3) |
| Cisplatin | — | 36(±4) | 43(±4) | 55(±3) | 62(±4) | 72(±3) | 85(±3) | 79(±3) |
| Formula XIII | — | 27(±3) | 32(±3) | 35(±3) | 44(±4) | 49(±3) | 85(±3) | 79(±3) |
| Cisplatin | — | 37(±3) | 46(±3) | 60(±6) | 70(±5) | 81(±2) | 93(±4) | 87(±2) |
| Formula XIV | — | 13(±3) | 24(±3) | 39(±5) | 44(±5) | 56(±3) | 93(±4) | 87(±2) |
| Cisplatin | — | 34(±2) | 41(±3) | 61(±3) | 62(±4) | 82(±4) | 89(±3) | 83(±3) |
| Formula XVI | — | 25(±4) | 34(±3) | 42(±4) | 53(±4) | 72(±6) | 89(±3) | 83(±3) |
| Cisplatin | — | 36(±4) | 43(±4) | 55(±3) | 62(±4) | 72(±3) | 85(±3) | 79(±3) |
| Formula XVIII | — | 19(±3) | 27(±4) | 39(±3) | 43(±5) | 50(±4) | 85(±3) | 79(±3) |
| Cisplatin | — | 35(±3) | 42(±3) | 51(±3) | 62(±4) | 72(±4) | 86(±3) | 82(±3) |
| Formula XIX | — | 13(±2) | 25(±3) | 35(±3) | 40(±3) | 51(±3) | 86(±3) | 82(±3) |
| Cisplatin | — | 35(±3) | 42(±3) | 51(±3) | 62(±4) | 72(±4) | 86(±3) | 82(±3) |
| Formula XX | — | 0(±0) | 15(±3) | 33(±4) | 37(±2) | 48(±5) | 86(±3) | 82(±3) |
| Cisplatin | — | 36(±4) | 43(±4) | 55(±3) | 62(±4) | 72(±3) | 85(±3) | 79(±3) |
| Formula XXI | — | 36(±2) | 45(±3) | 50(±2) | 54(±2) | 62(±4) | 85(±3) | 79(±3) |
| Cisplatin | — | 34(±2) | 41(±3) | 61(±3) | 62(±4) | 82(±4) | 89(±3) | 83(±3) |
| Formula XXII | — | 14(±3) | 25(±3) | 36(±3) | 44(±4) | 55(±3) | 89(±3) | 83(±3) |

The above results indicate that compounds of Formula III to VIII, X to XIV, XVI, XVIII to XXII are more effective in inhibiting spheres of PC3 compared to cisplatin.

Figure 4:
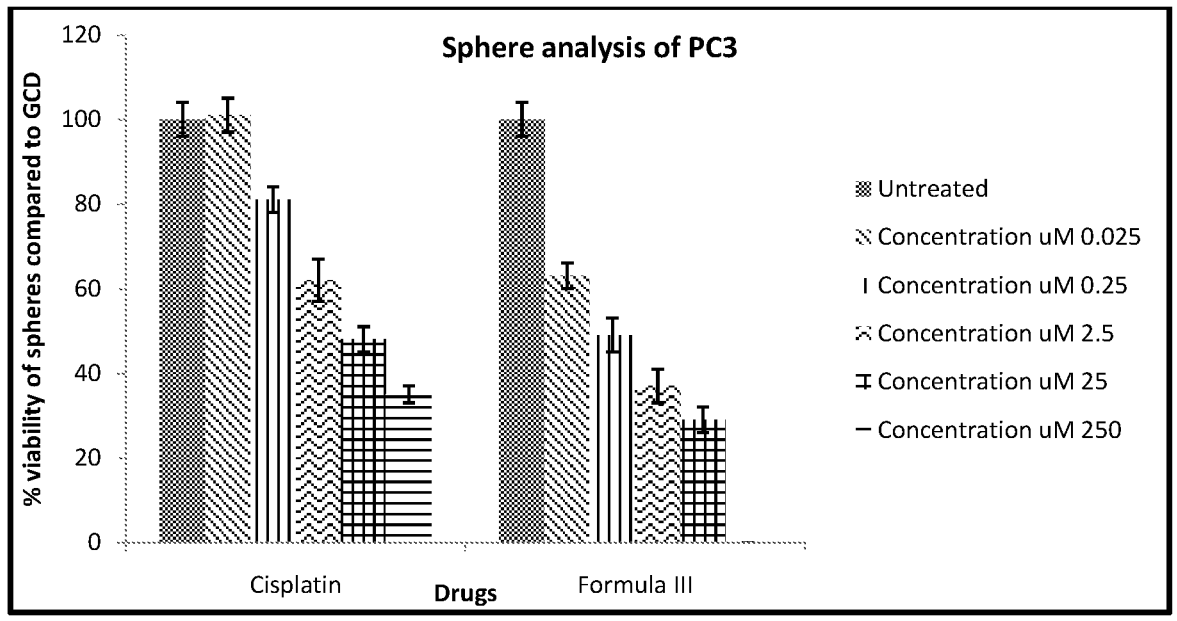
FIG. 4 illustrates the sphere analysis of PC3 cell line in the presence of compound of Formula III and cisplatin.
Figure 8:
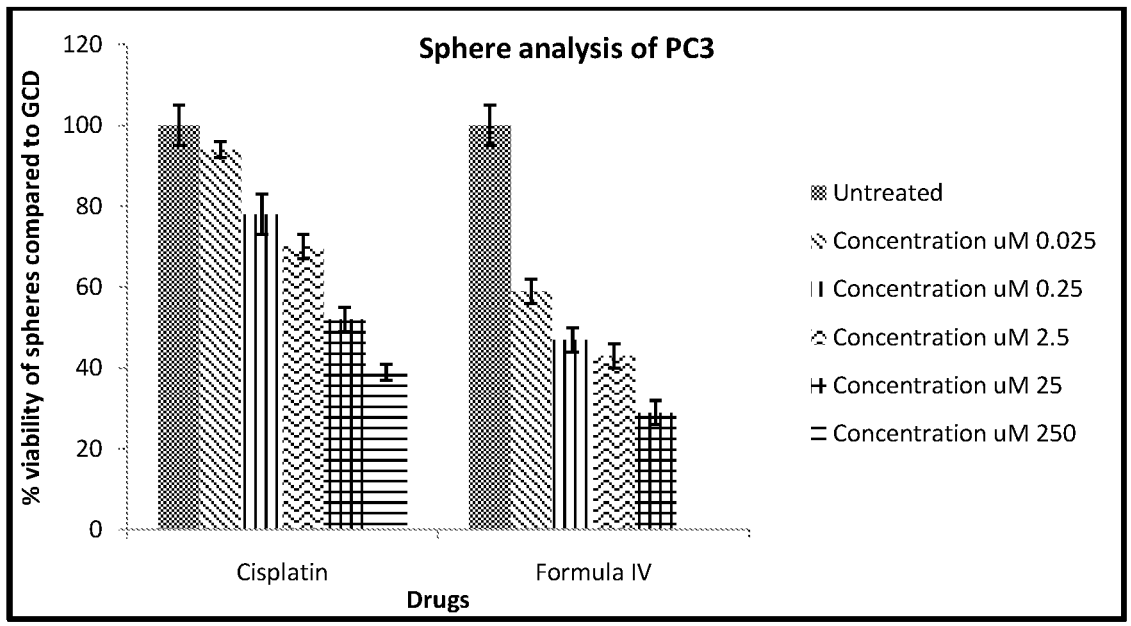
FIG. 8 illustrates the sphere analysis of PC3 cell line in the presence of compound of Formula IV and cisplatin.
Figure 12:
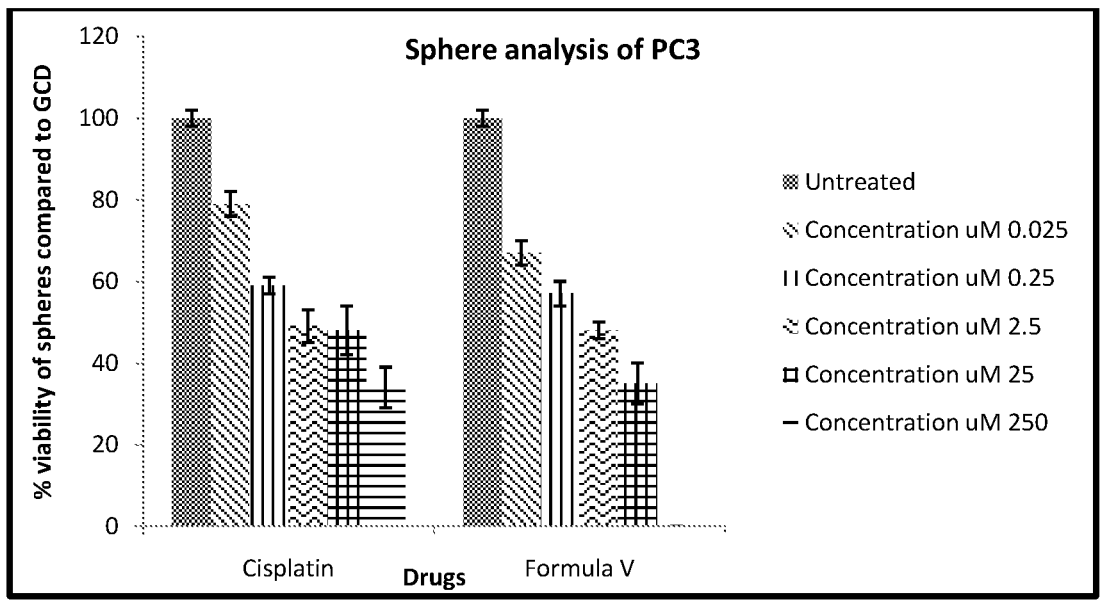
FIG. 12 illustrates the sphere analysis of PC3 cell line in the presence of compound of Formula V and cisplatin.
Figure 15:
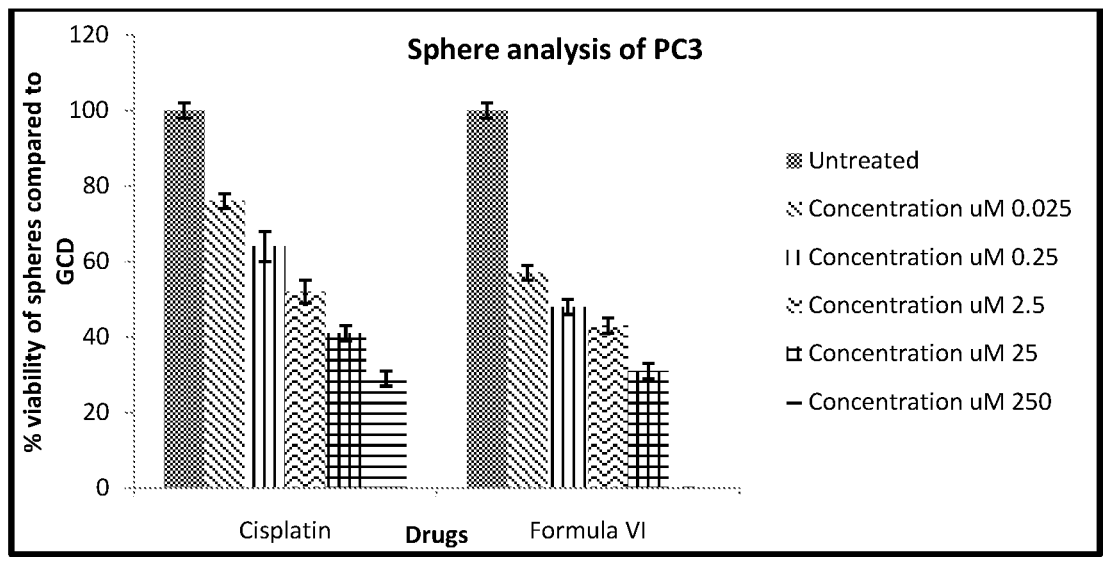
FIG. 15 illustrates the sphere analysis of PC3 cell line in the presence of compound of Formula VI and cisplatin.
Figure 19:
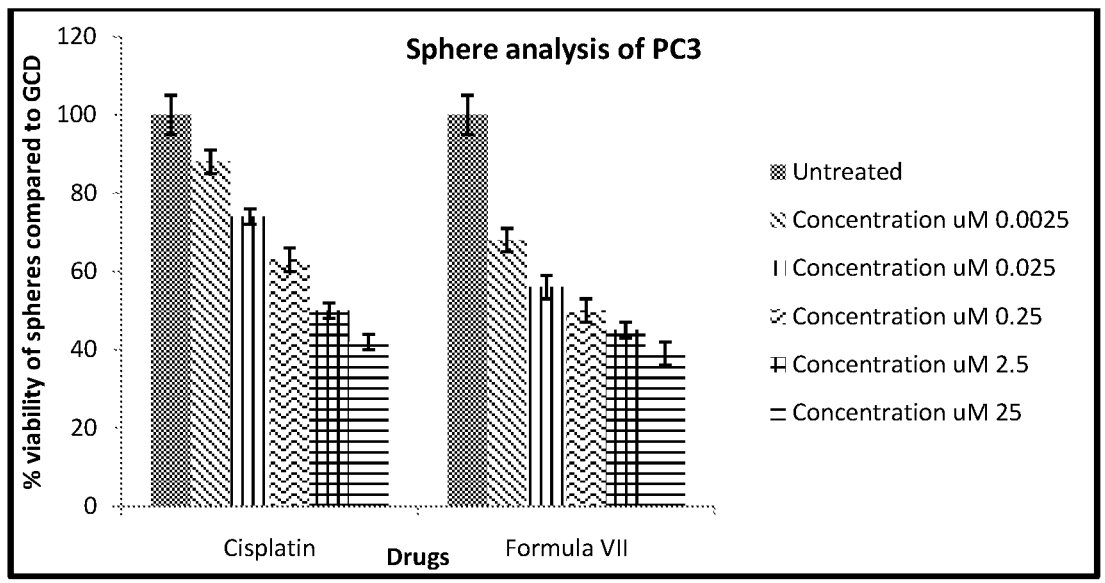
FIG. 19 illustrates the sphere analysis of PC3 cell line in the presence of compound of Formula VII and cisplatin.
Figure 23:
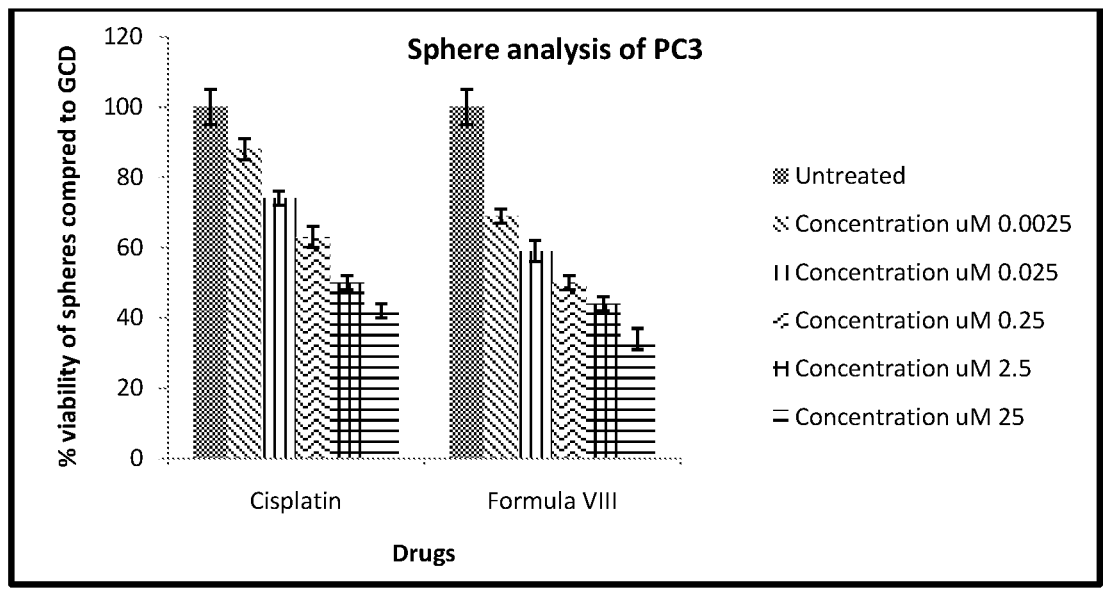
FIG. 23 illustrates the sphere analysis of PC3 cell line in the presence of compound of Formula VIII and cisplatin.
Figure 29:
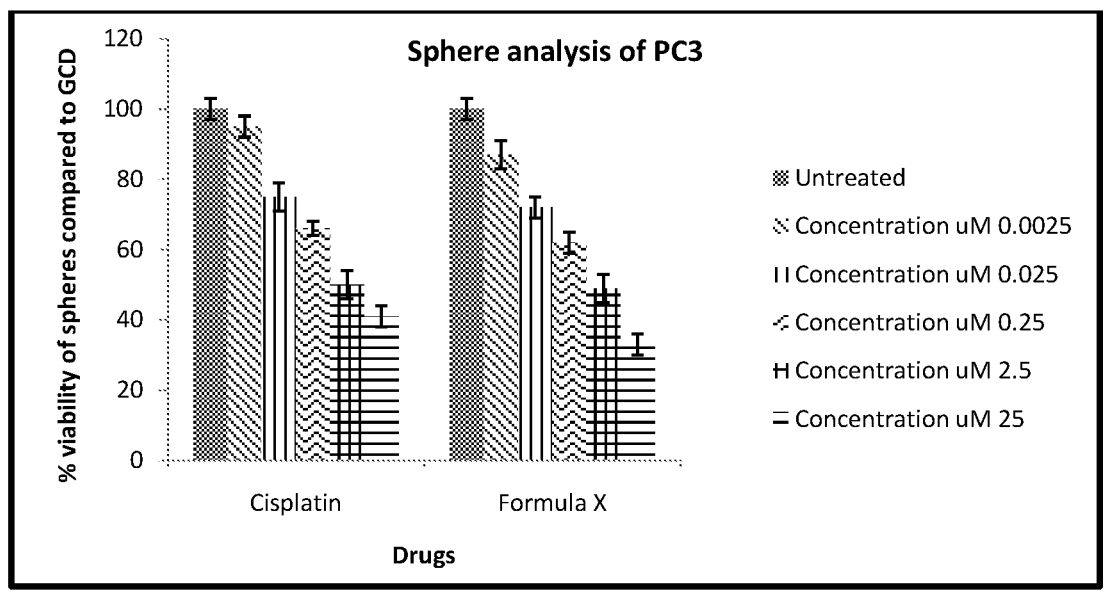
FIG. 29 illustrates the sphere analysis of PC3 cell line in the presence of compound of Formula X and cisplatin.
Figure 33:
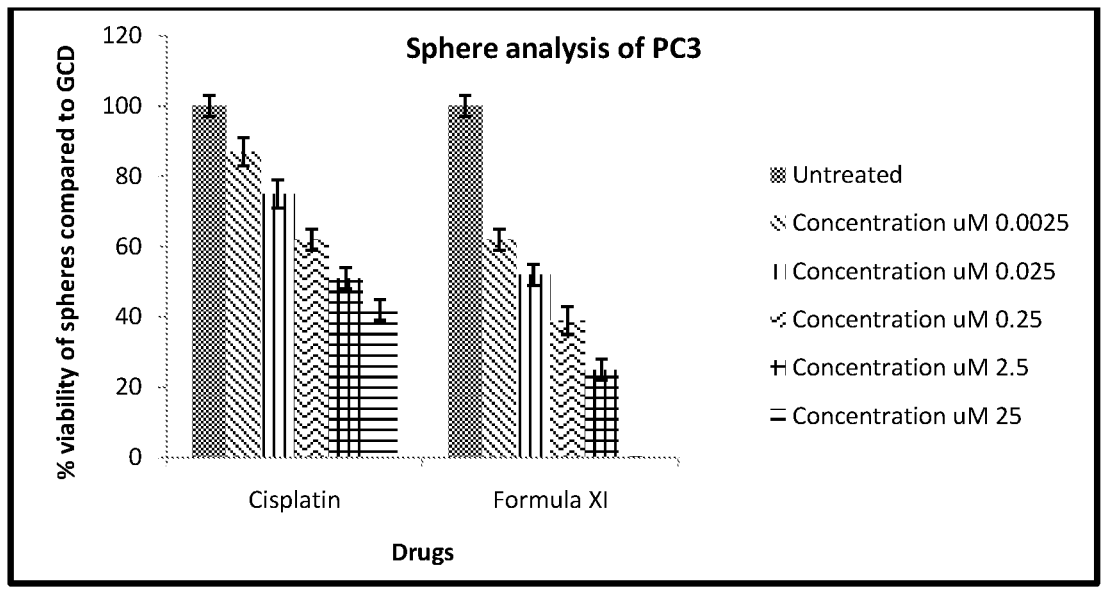
FIG. 33 illustrates the sphere analysis of PC3 cell line in the presence of compound of Formula XI and cisplatin.
Figure 37:
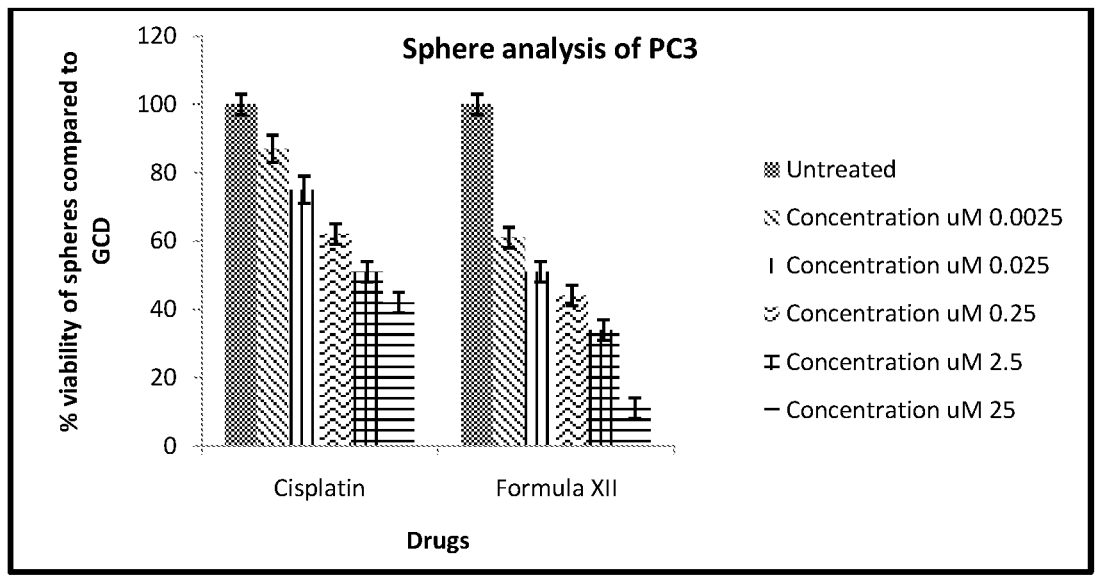
FIG. 37 illustrates the sphere analysis of PC3 cell line in the presence of compound of Formula XII and cisplatin.
Figure 41:
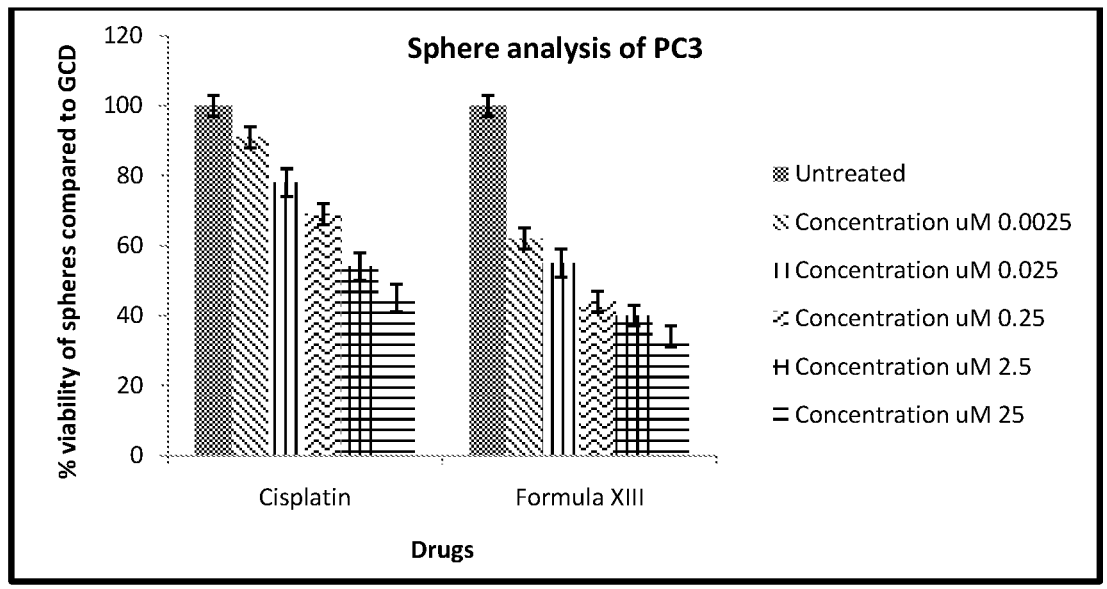
FIG. 41 illustrates the sphere analysis of PC3 cell line in the presence of compound of Formula XIII and cisplatin.
Figure 45:
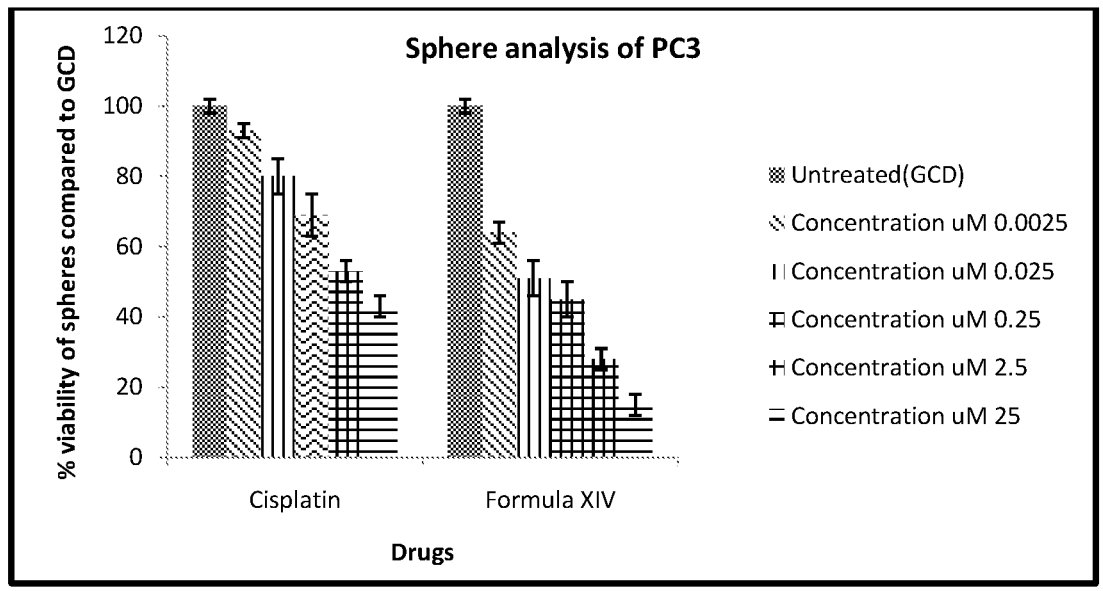
FIG. 45 illustrates the sphere analysis of PC3 cell line in the presence of compound of Formula XIV and cisplatin.
Figure 51:
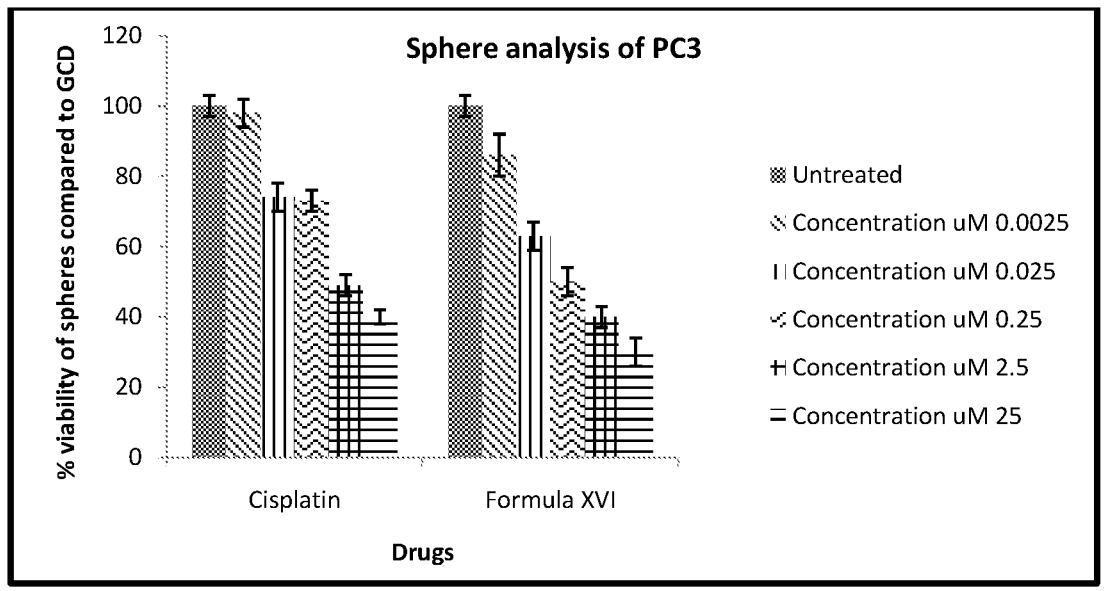
FIG. 51 illustrates the sphere analysis of PC3 cell line in the presence of compound of Formula XVI and cisplatin.
Figure 56:
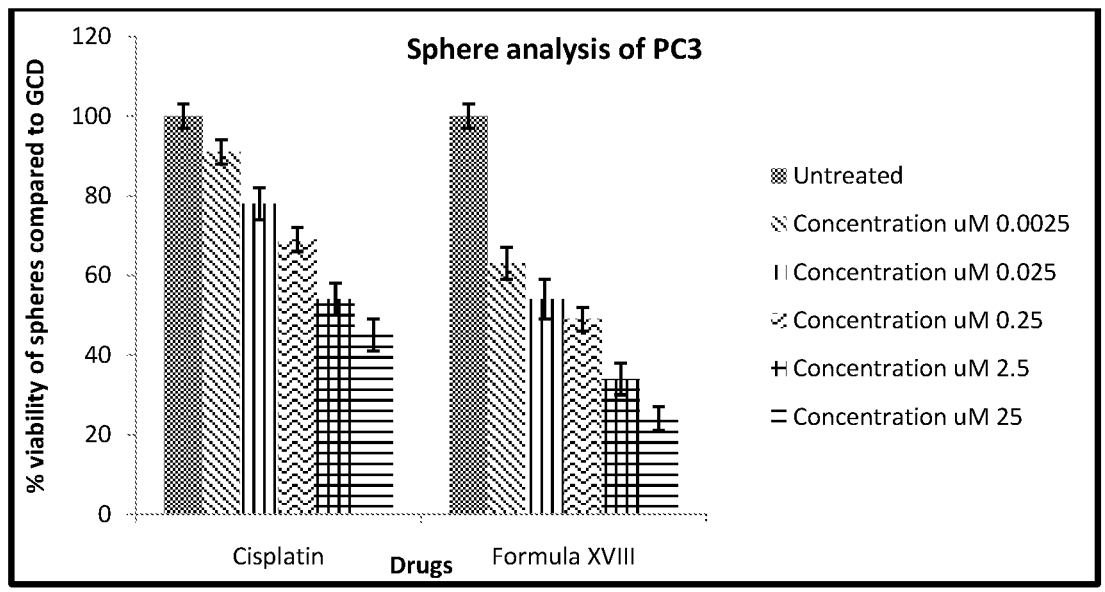
FIG. 56 illustrates the sphere analysis of PC3 cell line in the presence of compound of Formula XVIII and cisplatin.
Figure 60:
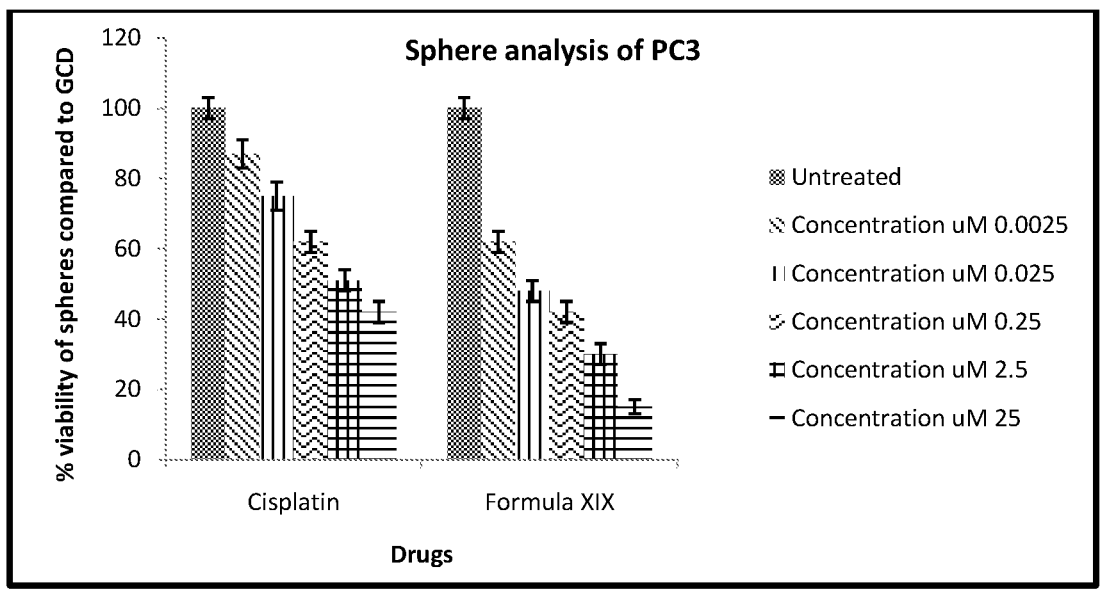
FIG. 60 illustrates the sphere analysis of PC3 cell line in the presence of compound of Formula XIX and cisplatin.
Figure 64:
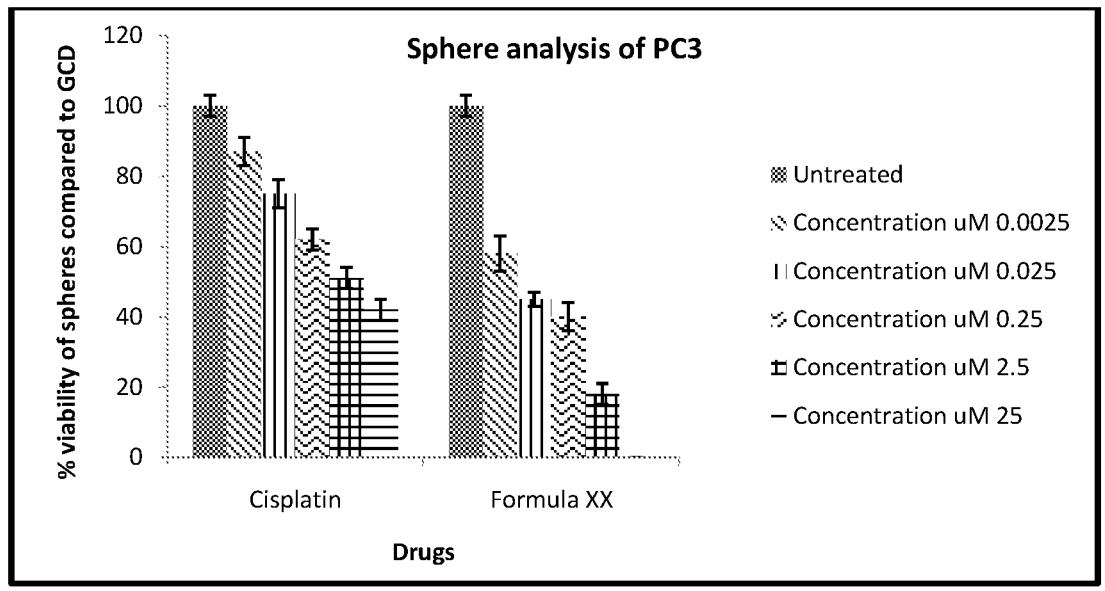
FIG. 64 illustrates the sphere analysis of PC3 cell line in the presence of compound of Formula XX and cisplatin.
Figure 67:
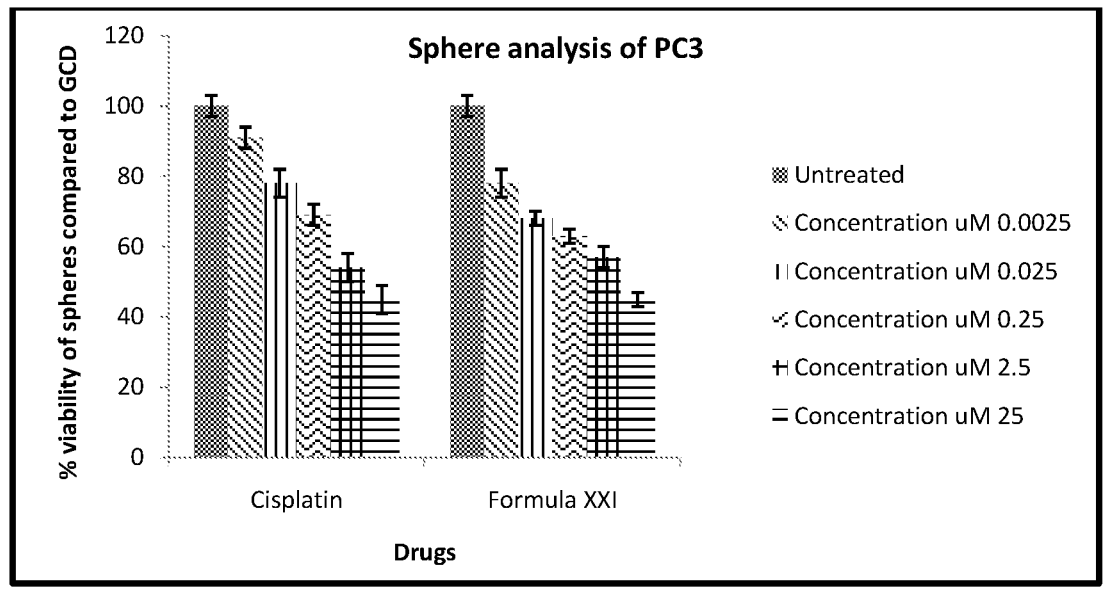
FIG. 67 illustrates the sphere analysis of PC3 cell line in the presence of compound of Formula XXI and cisplatin.
Figure 70:
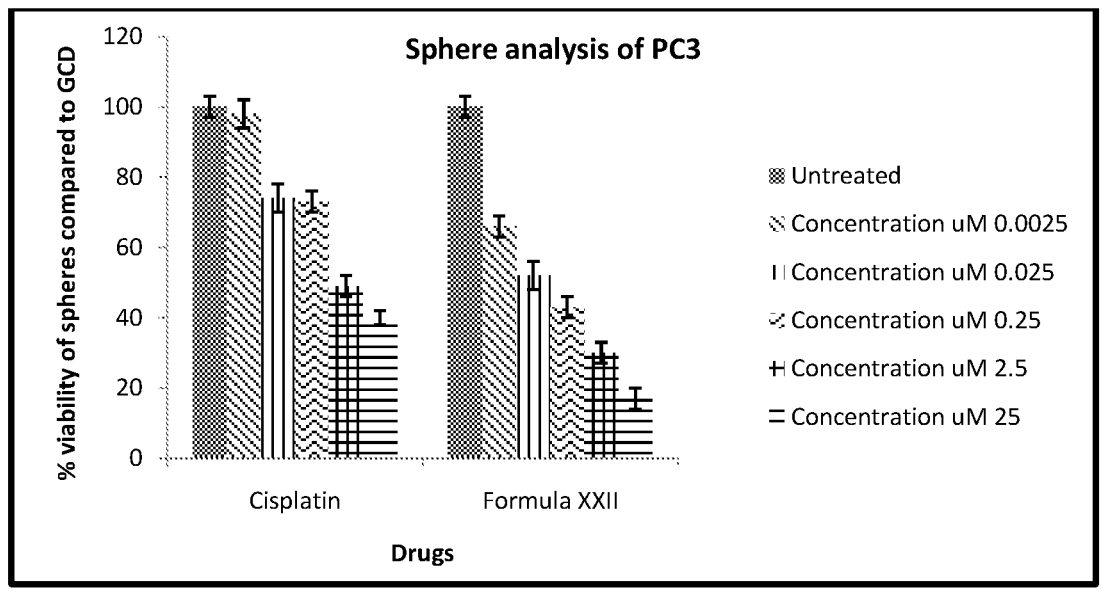
FIG. 70 illustrates the sphere analysis of PC3 cell line in the presence of compound of Formula XXII and cisplatin.

FIG. 4, FIG. 8, FIG. 12, FIG. 15, FIG. 19, FIG. 23, FIG. 29, FIG. 33, FIG. 37, FIG. 41, FIG. 45, FIG. 51, FIG. 56, FIG. 60, FIG. 64, FIG. 67, FIG. 70 refer to compounds of Formula III to VIII, X to XIV, XVI, XVIII to XXII respectively.

FIG. 4, FIG. 8, FIG. 12, FIG. 15, FIG. 19, FIG. 23, FIG. 29, FIG. 33, FIG. 37, FIG. 41, FIG. 45, FIG. 51, FIG. 56, FIG. 60, FIG. 64, FIG. 67, FIG. 70 illustrates the percentage viability of spheres obtained from conversion of the number of spheres formed and compared with growth control with DMSO (GCD), wherein GCD is considered as 100% viability. The sphere count results for respective drug concentration indicated in Table 8 have been converted to percentage viability of spheres for graphical representation. The figures and Table 8 indicate that there is a decrease in percentage viability of spheres of PC3 in the presence of compounds of Formula III to VIII, X to XIV, XVI, XVIII to XXII in comparison to cisplatin.

TABLE 8

% Viability of spheres (PC3)

| Drug Concentration in uM | Untreated (GCD) | 250 | 25 | 2.5 | 0.25 | 0.025 | 0.0025 |
|---|---|---|---|---|---|---|---|
| Cisplatin | 100(±4) | 35(±2) | 48(±3) | 62(±5) | 81(±3) | 101(±4) | — |
| Formula III | 100(±4) | 0(±0) | 29(±3) | 37(±4) | 49(±4) | 63(±3) | — |
| Cisplatin | 100(±5) | 39(±2) | 52(±3) | 70(±3) | 78(±5) | 94(±2) | — |
| Formula IV | 100(±5) | 0(±0) | 29(±3) | 43(±3) | 47(±3) | 59(±3) | — |
| Cisplatin | 100(±2) | 34(±5) | 48(±6) | 49(±4) | 59(±2) | 79(±3) | — |
| Formula V | 100(±2) | 0(±0) | 35(±5) | 48(±2) | 57(±3) | 67(±3) | — |
| Cisplatin | 100(±2) | 29(±2) | 41(±2) | 52(±3) | 64(±4) | 76(±2) | — |
| Formula VI | 100(±2) | 0(±0) | 31(±2) | 43(±2) | 48(±2) | 57(±2) | — |
| Cisplatin | 100(±5) | — | 42(±2) | 50(±2) | 63(±3) | 74(±2) | 88(±3) |
| Formula VII | 100(±5) | — | 34(±3) | 44(±2) | 50(±2) | 59(±3) | 69(±2) |
| Cisplatin | 100(±5) | — | 42(±2) | 50(±22) | 63(±3) | 74(±2) | 88(±3) |
| Formula VIII | 100(±5) | — | 34(±3) | 44(±2) | 50(±2) | 59(±3) | 69(±2) |
| Cisplatin | 100(±3) | — | 41(±3) | 50(±4) | 66(±2) | 75(±4) | 95(±3) |
| Formula X | 100(±3) | — | 33(±3) | 49(±4) | 62(±3) | 72(±3) | 87(±4) |
| Cisplatin | 100(±3) | — | 42(±3) | 51(±3) | 62(±3) | 75(±4) | 87(±4) |
| Formula XI | 100(±3) | — | 0(±0) | 25(±3) | 39(±4) | 52(±3) | 62(±4) |
| Cisplatin | 100(±3) | — | 42(±3) | 51(±3) | 62(±3) | 75(±4) | 87(±4) |
| Formula XII | 100(±3) | — | 11(±3) | 34(±3) | 44(±3) | 51(±3) | 61(±4) |
| Cisplatin | 100(±3) | — | 45(±4) | 54(±4) | 69(±3) | 78(±4) | 91(±3) |
| Formula XIII | 100(±3) | — | 34(±3) | 40(±3) | 44(±3) | 55(±4) | 62(±3) |
| Cisplatin | 100(±2) | — | 43(±3) | 53(±3) | 69(±6) | 80(±5) | 93(±2) |
| Formula XIV | 100(±2) | — | 15(±3) | 28(±3) | 45(±5) | 51(±5) | 64(±3) |
| Cisplatin | 100(±3) | — | 40(±2) | 49(±3) | 73(±3) | 74(±4) | 98(±4) |
| Formula XVI | 100(±3) | — | 30(±4) | 40(±3) | 50(±4) | 63(±4) | 86(±6) |
| Cisplatin | 100(±3) | — | 45(±4) | 54(±4) | 69(±3) | 78(±4) | 91(±3) |
| Formula XVIII | 100(±3) | — | 24(±3) | 34(±4) | 49(±3) | 54(±5) | 63(±4) |
| Cisplatin | 100(±3) | — | 42(±3) | 51(±3) | 62(±3) | 75(±4) | 87(±4) |
| Formula XIX | 100(±3) | — | 15(±2) | 30(±3) | 42(±3) | 48(±3) | 62(±3) |
| Cisplatin | 100(±3) | — | 42(±3) | 51(±3) | 62(±3) | 75(±4) | 87(±4) |
| Formula XX | 100(±3) | — | 0(±0) | 18(±3) | 40(±4) | 45(±2) | 58(±5) |
| Cisplatin | 100(±3) | — | 45(±4) | 54(±4) | 69(±3) | 78(±4) | 91(±3) |
| Formula XXI | 100(±3) | — | 45(±2) | 57(±3) | 63(±2) | 68(±2) | 78(±4) |
| Cisplatin | 100(±3) | — | 40(±2) | 49(±3) | 73(±3) | 74(±4) | 98(±4) |
| Formula XXII | 100(±3) | — | 17(±3) | 30(±3) | 43(±3) | 52(±4) | 66(±3) |

The invention claimed is:

1. A compound of Formula I:

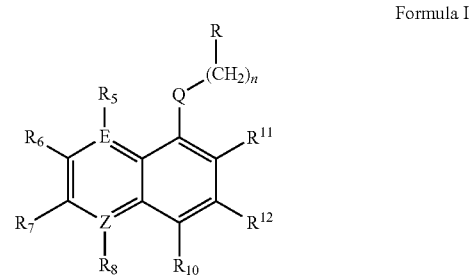

Formula I wherein,

E and Z is selected from C and N;

Q is O;

$R^5$ is —H or —Cl;

$R^6$ and $R^7$ each independently is selected from —H, or $R^6$ and $R^7$ together form a heterocyclic ring;

$R^8$ is —H;

$R^{10}$ is selected from

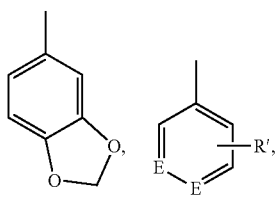

R' is selected from —H and alkoxy;

$R^{11}$ and $R^{12}$ each independently is selected from —H, or $R^{11}$ and $R^{12}$ can be substituted or unsubstituted lactone;

R is selected from

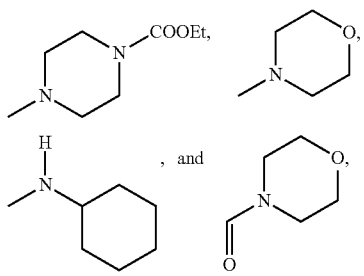

or salts thereof;

and n is selected from 2, 4 and 6.

2. The compound as claimed in claim 1, wherein the compound is compound of Formula IV 3. The compound as claimed in claim 1, wherein the compound is compound of Formula V

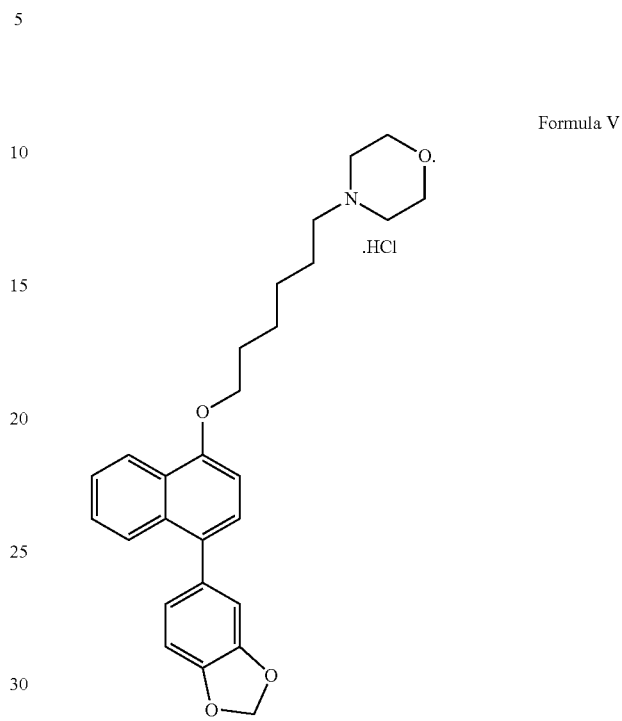

4. The compound as claimed in claim 1, wherein the compound is compound of Formula VIII 5. The compound as claimed in claim 1, wherein the compound is compound of Formula X

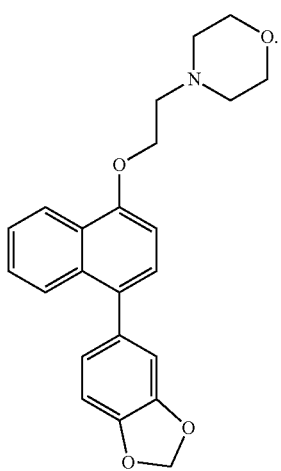

6. The compound as claimed in claim 1, wherein the compound is compound of Formula XI

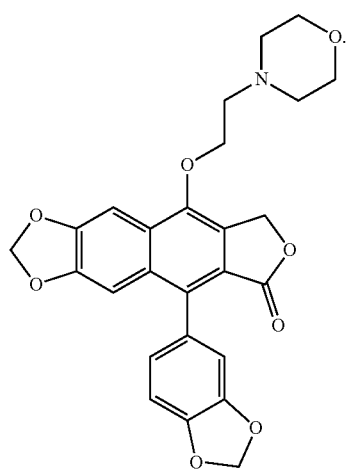

7. The compound as claimed in claim 1, wherein the compound is compound of Formula XII

8. The compound as claimed in claim 1, wherein the compound is compound of Formula XIII

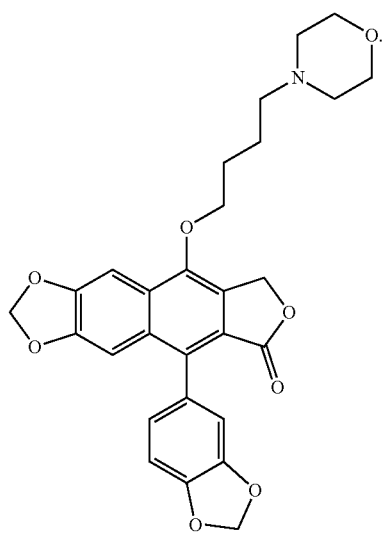

9. The compound as claimed in claim 1, wherein the compound is compound of Formula XIV

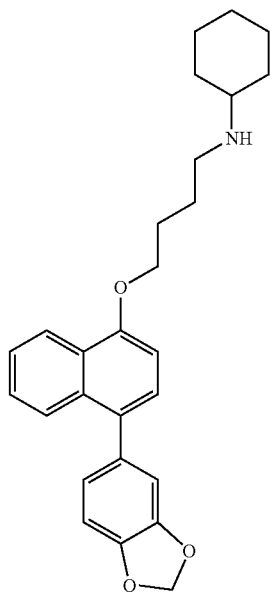

10. The compound as claimed in claim 1, wherein the compound is compound of Formula XVI

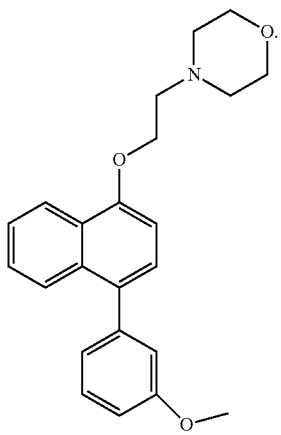

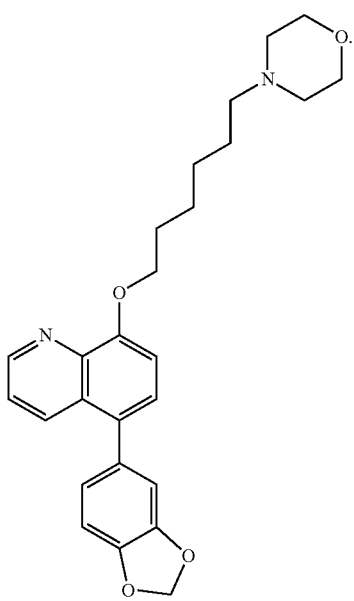

11. The compound as claimed in claim 1, wherein the compound is compound of Formula XVII Formula XVII

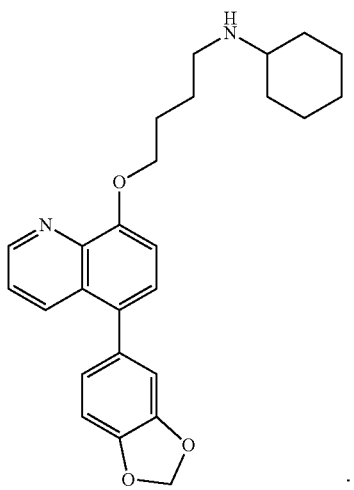

12. A compound of Formula Ia:

Formula Ia

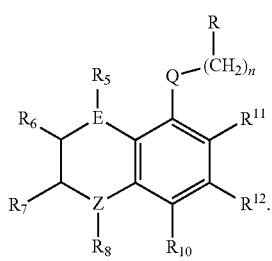

wherein,
E and Z is C;
Q is O;

Formula XVI $R^5$ is —H;
$R^6$ and $R^7$ each independently is —H;
$R^8$ is —H;
$R^{10}$ is

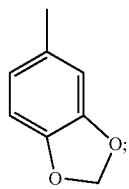

$R^{11}$ and $R^{12}$ each independently is —H;
R is selected from

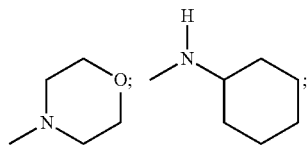

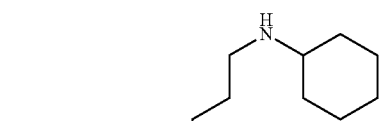

n is 1-10.

13. The compound as claimed in claim 12 selected from a group consisting of Formula XVIII, XIX, XX, XXI and XXII Formula XVIII

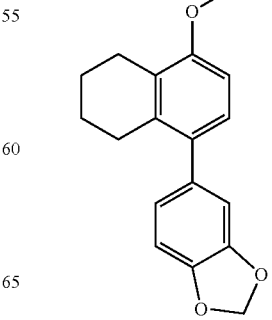

Formula XIX
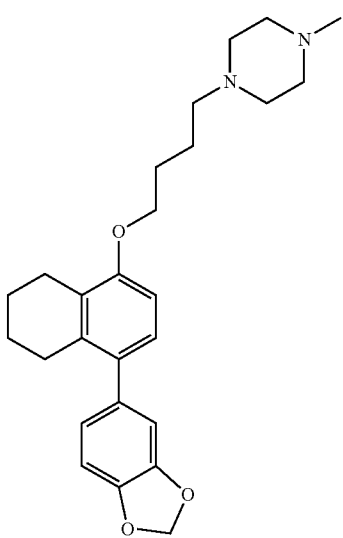
Formula XX
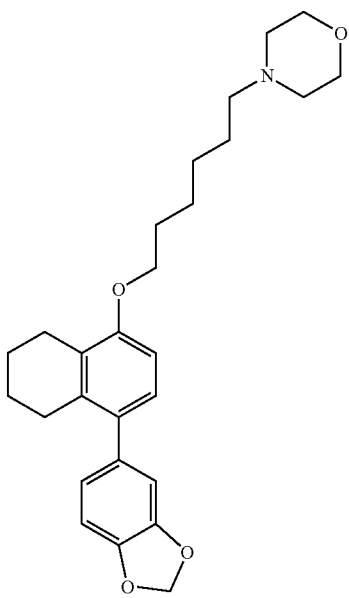
Formula XXI
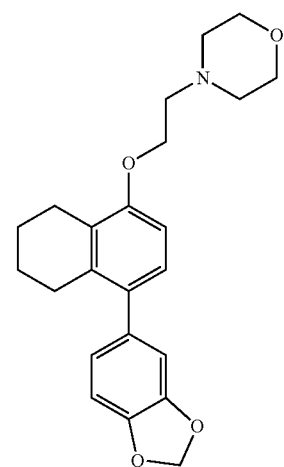
Formula XXII
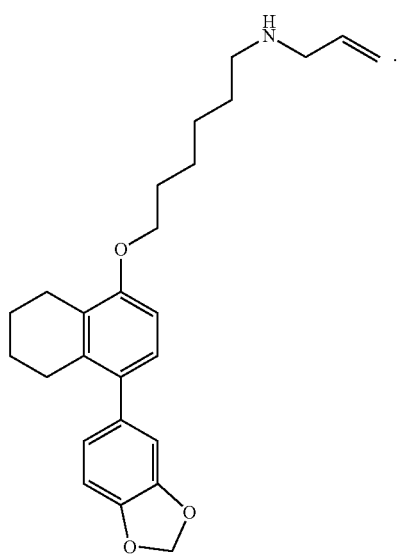
14. A pharmaceutical composition comprising any of the compounds selected from a group consisting of
Formula IV
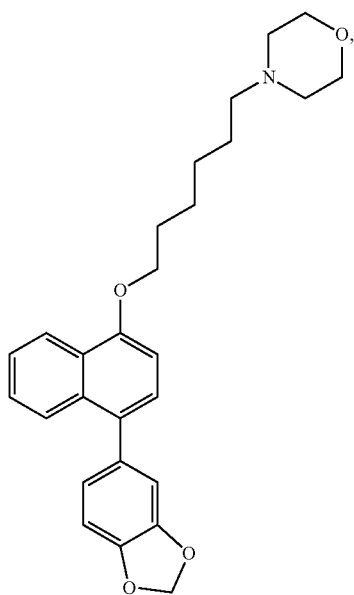

Formula V

Formula VIII

Formula X

Formula XI

Formula XII

Formula XIII

Formula XIV
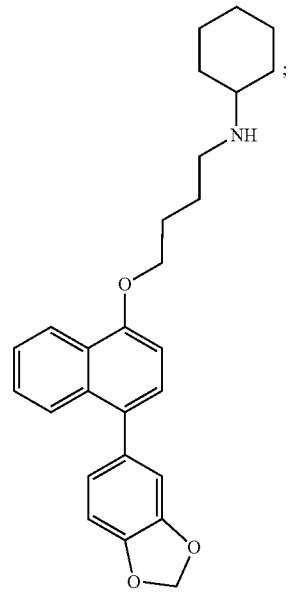
Formula XVI
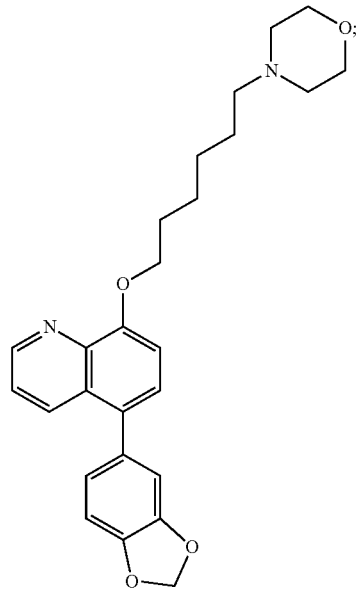
Formula XVII
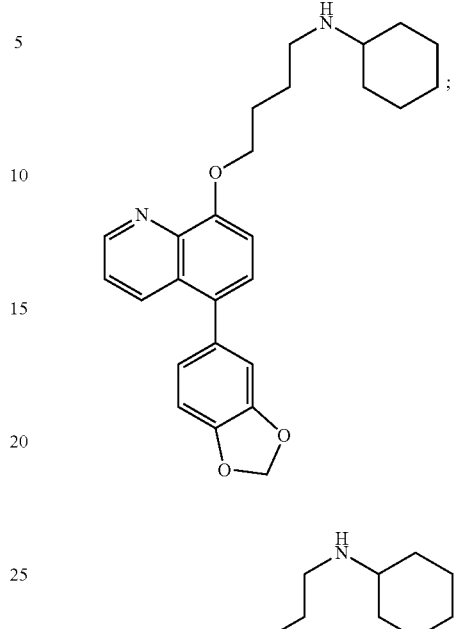
Formula XVIII
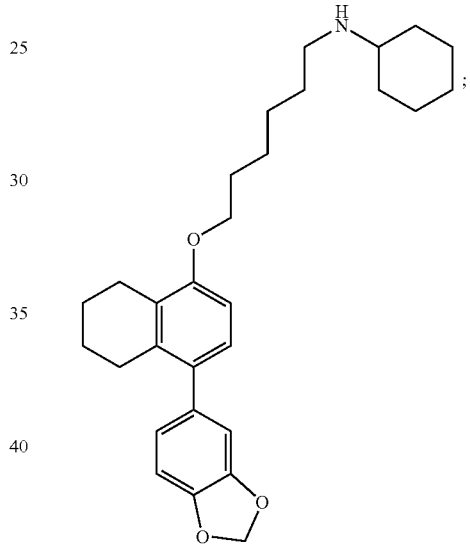
Formula XIX
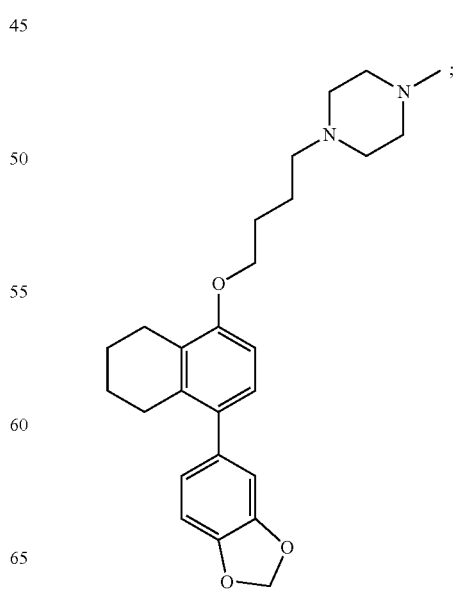

-continued
Formula XX
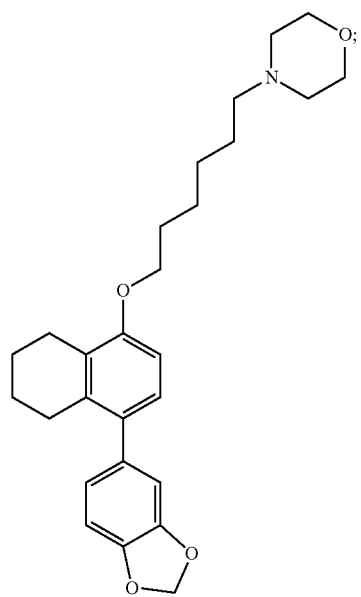
Formula XXI
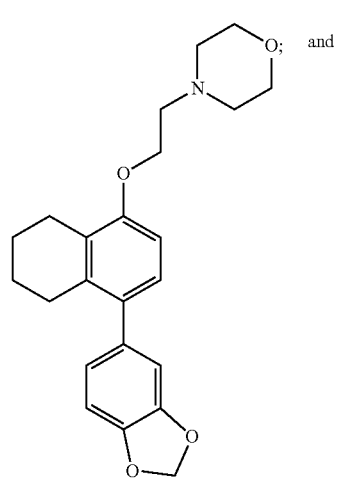 and
Formula XXII
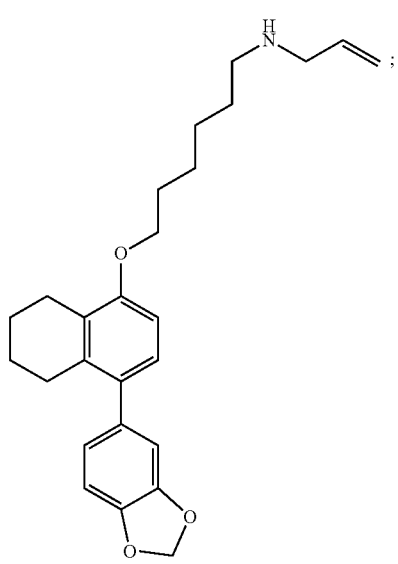
along with at least one pharmaceutically acceptable excipient and optionally at least one active agent.
15. A compound selected from a group consisting of
Formula IV
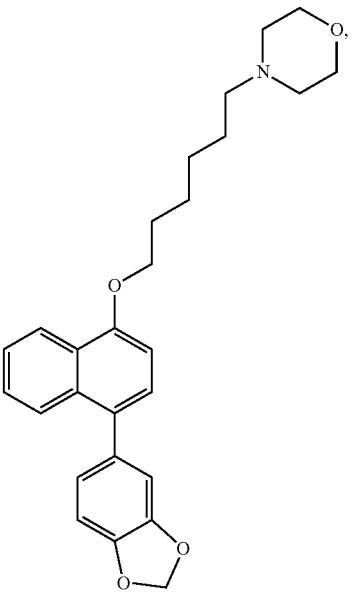
Formula V
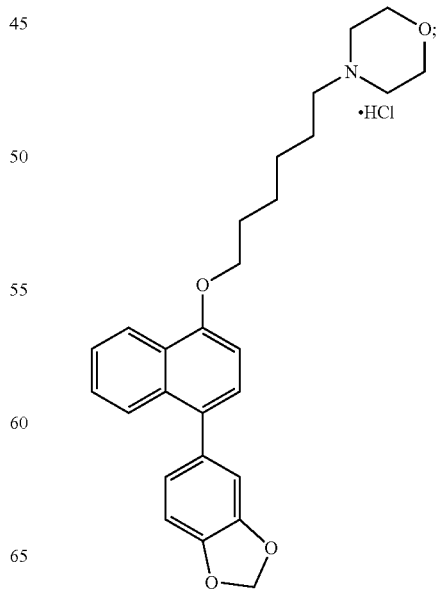

-continued
Formula VIII
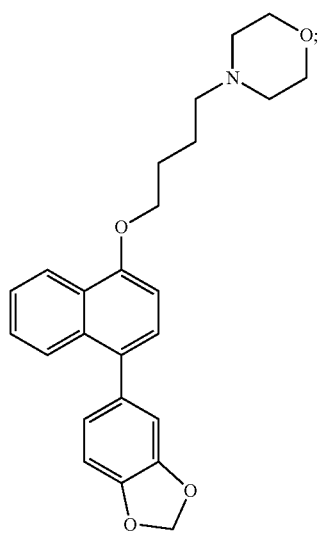
Formula X
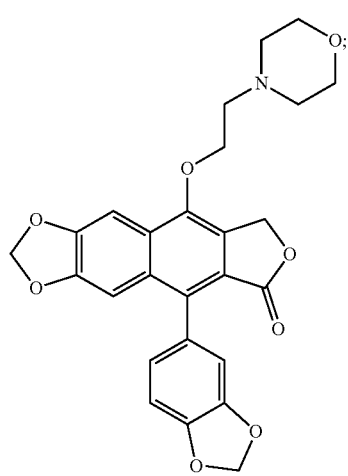
Formula XI
Formula XII
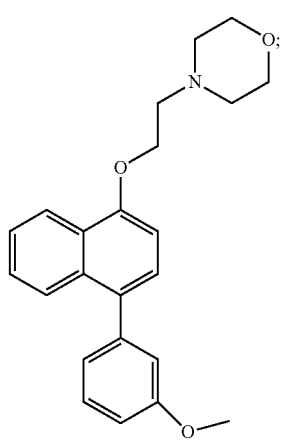
Formula XIII
Formula XIV
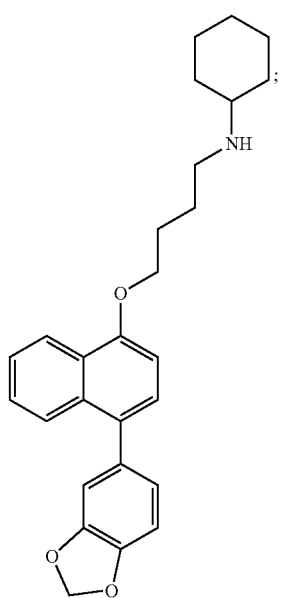

Formula XVI
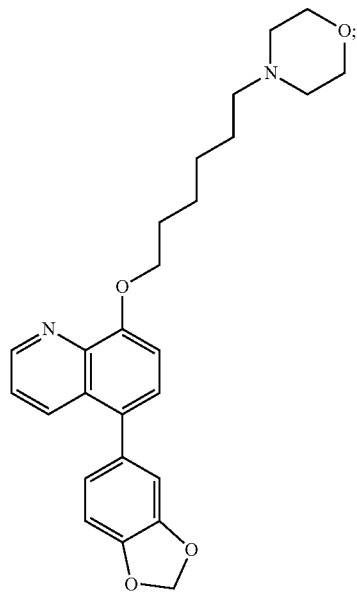
Formula XVII
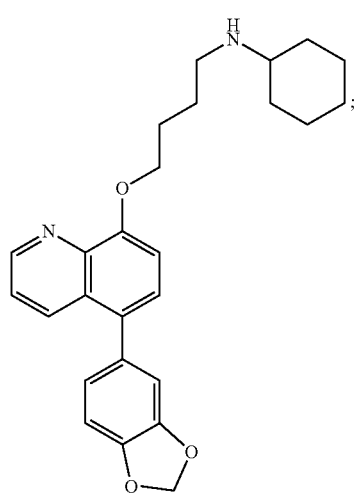
Formula XVIII
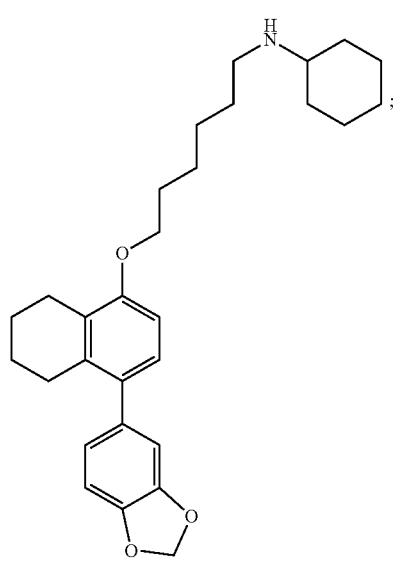
Formula XIX
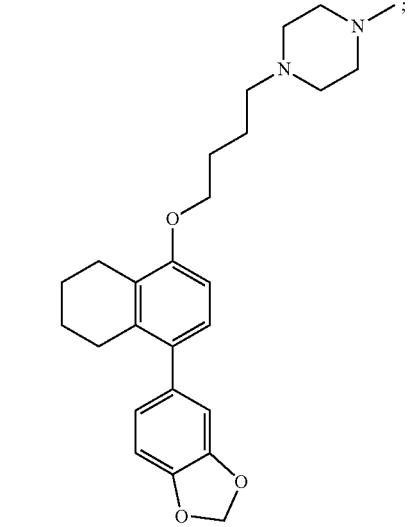
Formula XX
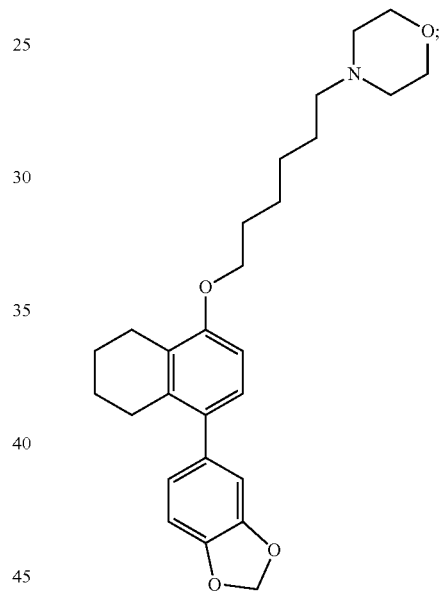
Formula XXI
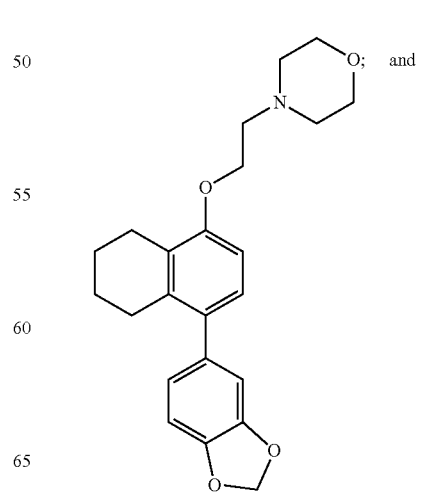
and -continued

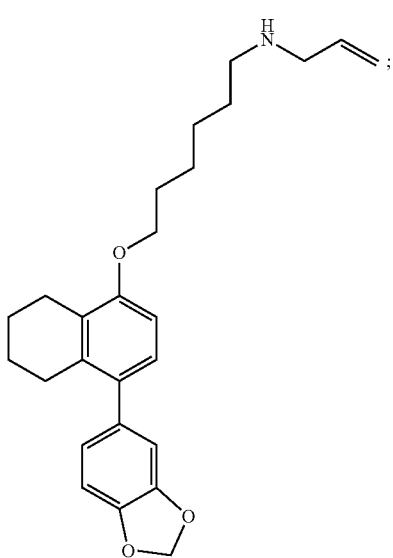

Formula XXII for use in the treatment or inhibition of uncontrolled cell growth in cancer or for use in effectively targeting cancer cells including cancer stem cells.

16. A method of treating or inhibiting uncontrolled cell growth in cancer, the method comprising administering an effective amount of any of the compounds as claimed in claim 15.

17. The compounds as claimed in claim 15, wherein the cancer is breast, prostate, brain, blood, bone marrow, liver, pancreas, skin, kidney, colon, ovary, lung, testicle, penis, thyroid, parathyroid, pituitary, thymus, retina, uvea, conjunctiva, spleen, head, neck, trachea, gall bladder, rectum, salivary gland, adrenal gland, throat, esophagus, lymph nodes, sweat glands, sebaceous glands, muscle, heart, and stomach cancer.

18. The compounds as claimed in claim 15, wherein the cancer is breast or prostate cancer.

19. The method as claimed in claim 16, wherein the cancer is breast, prostate, brain, blood, bone marrow, liver, pancreas, skin, kidney, colon, ovary, lung, testicle, penis, thyroid, parathyroid, pituitary, thymus, retina, uvea, conjunctiva, spleen, head, neck, trachea, gall bladder, rectum, salivary gland, adrenal gland, throat, esophagus, lymph nodes, sweat glands, sebaceous glands, muscle, heart, and stomach cancer.

20. The method as claimed in claim 16, wherein the cancer is breast or prostate cancer.

21. A method of treating or inhibiting uncontrolled cell growth in cancer, the method comprising administering an effective amount of the pharmaceutical composition as claimed in claim 14.

* * * * *